(12) United States Patent
Bolton et al.

(10) Patent No.: US 11,164,141 B1
(45) Date of Patent: Nov. 2, 2021

(54) SYSTEMS AND METHODS FOR SYNCHRONIZED DELIVERY

(71) Applicant: United Parcel Service of America, Inc., Atlanta, GA (US)

(72) Inventors: Chris Bolton, Woodstock, GA (US); Steven D. Brill, Alpharetta, GA (US); Matthew Collins, Milton, GA (US); Anthony Creasy, Hayesville, NC (US); Andrew Dotterweich, Milton, GA (US); Joseph Guerrisi, Sandy Springs, GA (US); Daniel Kettleson, Hamel, MN (US); Michael Mulholland, Snohomish, WA (US); Robert J. Gillen, Alpharetta, GA (US); Greg Loppatto, Atlanta, GA (US); John Hernandez, Atlanta, GA (US); Butch Butler, Atlanta, GA (US); Scott Lord, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 415 days.

(21) Appl. No.: 14/988,545

(22) Filed: Jan. 5, 2016

Related U.S. Application Data

(63) Continuation of application No. 14/988,136, filed on Jan. 5, 2016, now Pat. No. 10,706,384, which is a
(Continued)

(51) Int. Cl.
*G06Q 10/08* (2012.01)
(52) U.S. Cl.
CPC .............................. *G06Q 10/08355* (2013.01)
(58) Field of Classification Search
USPC ....................................... 705/7.11, 7.12, 7.13
See application file for complete search history.

(56) References Cited

U.S. PATENT DOCUMENTS

| 4,611,268 A | 9/1986 | Gotz et al. |
| 5,430,831 A | 7/1995 | Snellen |

(Continued)

FOREIGN PATENT DOCUMENTS

| CN | 1598850 A | 3/2005 |
| GB | 2461722 A | 1/2010 |

(Continued)

OTHER PUBLICATIONS

Min, Hokey, and Sean B Eom. "An Integrated Decision Support System for Global Logistics." International journal of physical distribution & logistics management 24.1 (1994): 29-39. Web. (Year: 1994).*

(Continued)

*Primary Examiner* — Akiba K Robinson
(74) *Attorney, Agent, or Firm* — Shook, Hardy & Bacon, L.L.P.

(57) ABSTRACT

Various embodiments provide systems and methods for facilitating synchronized delivery of shipments/items scheduled to be delivered to multiple serviceable points located nearby one another. Various embodiments identify nearby serviceable points based on an identification of serviceable points being associated with a common geographic descriptor. Accordingly, various embodiments receive shipping data for a first shipment to be delivered to a first serviceable point and a second shipment to be delivered to a second serviceable point. A first geographic descriptor is identified as associated with the first serviceable point and a second geographic descriptor is identified as associated with the second serviceable point, and a determination is made whether the first and second geographic descriptors are the same. Upon a determination that the first and second geographic descriptors are the same, an indication is provided (Continued)

that the first and second shipments are eligible for synchronized delivery.

20 Claims, 21 Drawing Sheets

Related U.S. Application Data continuation-in-part of application No. 13/828,652, filed on Mar. 14, 2013, now Pat. No. 10,163,119.

(60) Provisional application No. 61/761,915, filed on Feb. 7, 2013.

(56) References Cited

U.S. PATENT DOCUMENTS

| | | |
|---|---|---|
| 5,699,258 A | 12/1997 | Thiel |
| 6,219,653 B1 | 4/2001 | O'Neill et al. |
| 6,477,503 B1 | 11/2002 | Mankes |
| 6,606,604 B1 | 8/2003 | Dutta |
| 6,622,127 B1 | 9/2003 | Klots et al. |
| 6,701,299 B2 | 3/2004 | Kraisser et al. |
| 6,952,628 B2 | 10/2005 | Prutu |
| 7,015,824 B2 | 3/2006 | Cleveland et al. |
| 7,137,556 B1 | 11/2006 | Bonner et al. |
| 7,139,721 B2 | 11/2006 | Borders et al. |
| 7,158,948 B1 | 1/2007 | Rodriguez et al. |
| 7,177,825 B1 | 2/2007 | Borders et al. |
| 7,181,426 B2 | 2/2007 | Dutta |
| 7,233,907 B2 | 6/2007 | Young |
| 7,252,227 B2 | 8/2007 | Chase |
| 7,295,990 B1 | 11/2007 | Braumoeller et al. |
| 7,313,460 B1 | 12/2007 | Prater et al. |
| 7,363,126 B1 | 4/2008 | Zhong et al. |
| 7,509,228 B2 | 3/2009 | Bielefeld et al. |
| 7,624,024 B2 | 11/2009 | Levis et al. |
| 7,647,233 B2 | 1/2010 | Kadaba et al. |
| 7,831,439 B1 | 11/2010 | Bryar et al. |
| 7,925,524 B2 | 4/2011 | Florence |
| 7,962,422 B1 | 6/2011 | Melechko et al. |
| 8,068,930 B2 * | 11/2011 | Perez .................. B07C 3/14 |
| | | 700/2 |
| 8,073,723 B1 | 12/2011 | Bilibin et al. |
| 8,108,321 B2 | 1/2012 | Neal et al. |
| 8,306,875 B2 | 11/2012 | Schneur |
| 8,311,850 B2 | 11/2012 | Johnson et al. |
| 8,386,397 B1 | 2/2013 | Agarwal et al. |
| 8,407,151 B1 * | 3/2013 | Agarwal ............ G06Q 10/04 |
| | | 705/330 |
| 8,407,154 B1 | 3/2013 | Fallows |
| 8,429,019 B1 | 4/2013 | Yeatts et al. |
| 8,433,659 B2 | 4/2013 | Johnston et al. |
| 8,473,425 B1 | 6/2013 | Maurer et al. |
| 8,554,694 B1 | 10/2013 | Ward et al. |
| 8,572,002 B2 | 10/2013 | Kadaba |
| 8,615,473 B2 | 12/2013 | Spiegel et al. |
| RE45,160 E | 9/2014 | Ferlauto et al. |
| 8,924,312 B2 | 12/2014 | Kadaba |
| 9,020,846 B2 | 4/2015 | Siris |
| 9,047,607 B1 | 6/2015 | Curial et al. |
| 9,269,103 B1 | 2/2016 | Kumar et al. |
| 9,466,043 B1 | 10/2016 | Agarwal et al. |
| 9,552,564 B1 | 1/2017 | Martenis |
| 9,990,602 B2 | 6/2018 | Arunapuram |
| 10,127,517 B2 | 11/2018 | Carr et al. |
| 10,453,004 B2 * | 10/2019 | Davidson ......... G06Q 10/08355 |
| 2001/0029473 A1 | 10/2001 | Yamaoka et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0007353 A1 | 1/2002 | Kornacki |
| 2002/0016726 A1 | 2/2002 | Ross |
| 2002/0103724 A1 | 8/2002 | Huxter |
| 2002/0107820 A1 | 8/2002 | Huxter |
| 2002/0111914 A1 | 8/2002 | Terada et al. |
| 2002/0147654 A1 | 10/2002 | Kraisser et al. |
| 2002/0178023 A1 | 11/2002 | Bjerre et al. |
| 2003/0009361 A1 | 1/2003 | Hancock et al. |
| 2003/0036935 A1 | 2/2003 | Nel |
| 2003/0046133 A1 | 3/2003 | Morley et al. |
| 2003/0130753 A1 | 7/2003 | Grant et al. |
| 2003/0200111 A1 | 10/2003 | Damji |
| 2004/0030572 A1 | 2/2004 | Campbell et al. |
| 2004/0151068 A1 | 8/2004 | Carlsruh et al. |
| 2004/0215480 A1 | 10/2004 | Kadaba |
| 2004/0249699 A1 | 12/2004 | Laurent et al. |
| 2005/0080638 A1 | 4/2005 | Maseruka |
| 2005/0165629 A1 | 7/2005 | Bruns |
| 2005/0171738 A1 | 8/2005 | Kadaba |
| 2005/0197876 A1 | 9/2005 | Benda et al. |
| 2005/0216319 A1 | 9/2005 | Reblin |
| 2005/0267791 A1 | 12/2005 | LaVoie et al. |
| 2005/0278063 A1 * | 12/2005 | Hersh .............. G06Q 10/06311 |
| | | 700/216 |
| 2006/0041481 A1 * | 2/2006 | Stowe .................... G06Q 10/06 |
| | | 705/16 |
| 2006/0261164 A1 | 11/2006 | Bochicchio |
| 2007/0083410 A1 | 4/2007 | Hanna |
| 2008/0091342 A1 | 4/2008 | Assael |
| 2008/0235147 A1 | 9/2008 | Jensen |
| 2008/0245873 A1 | 10/2008 | Dwinell et al. |
| 2008/0275643 A1 | 11/2008 | Yaqub et al. |
| 2008/0294536 A1 | 11/2008 | Taylor et al. |
| 2008/0301009 A1 | 12/2008 | Plaster et al. |
| 2008/0306795 A1 | 12/2008 | Ho |
| 2009/0106124 A1 | 4/2009 | Yang |
| 2009/0164295 A1 | 6/2009 | Sion |
| 2009/0187489 A1 | 7/2009 | Mallick et al. |
| 2010/0004960 A1 | 1/2010 | Frankenberg et al. |
| 2010/0094769 A1 | 4/2010 | Davidson et al. |
| 2010/0100507 A1 * | 4/2010 | Davidson .............. G06Q 10/04 |
| | | 705/412 |
| 2010/0121689 A1 | 5/2010 | Wallace et al. |
| 2010/0161170 A1 | 6/2010 | Siris |
| 2010/0169000 A1 | 7/2010 | Overgoor et al. |
| 2010/0211426 A1 | 8/2010 | Mcclurg |
| 2010/0312715 A1 | 12/2010 | Esque et al. |
| 2011/0047000 A1 * | 2/2011 | Perry .................... G06Q 10/04 |
| | | 705/7.29 |
| 2011/0065458 A1 | 3/2011 | Staton et al. |
| 2011/0231334 A1 | 9/2011 | Jindel |
| 2011/0258014 A1 | 10/2011 | Evangelist et al. |
| 2011/0288958 A1 | 11/2011 | Obasanjo et al. |
| 2012/0030133 A1 | 2/2012 | Rademaker |
| 2012/0059729 A1 | 3/2012 | Roa et al. |
| 2012/0072363 A1 * | 3/2012 | Spiegel .................. G06Q 10/08 |
| | | 705/336 |
| 2012/0143882 A1 * | 6/2012 | Zheng .................... G06Q 10/08 |
| | | 707/751 |
| 2012/0150433 A1 | 6/2012 | Hulubei |
| 2012/0246090 A1 | 9/2012 | Griffith et al. |
| 2012/0284083 A1 | 11/2012 | Wu et al. |
| 2012/0303540 A1 | 11/2012 | Marcus et al. |
| 2012/0323645 A1 | 12/2012 | Spiegel et al. |
| 2013/0006739 A1 | 1/2013 | Horvitz et al. |
| 2013/0013350 A1 | 1/2013 | McCullough et al. |
| 2013/0066844 A1 | 3/2013 | Bowers et al. |
| 2013/0144428 A1 | 6/2013 | Irwin et al. |
| 2013/0151435 A1 | 6/2013 | Hocquette et al. |
| 2013/0166359 A1 | 6/2013 | Kadaba |
| 2013/0262336 A1 | 10/2013 | Wan et al. |
| 2013/0325737 A1 | 12/2013 | Smalling et al. |
| 2013/0325741 A1 | 12/2013 | Smalling et al. |
| 2014/0025464 A1 | 1/2014 | Kadaba |
| 2014/0052661 A1 | 2/2014 | Shakes et al. |
| 2014/0082505 A1 | 3/2014 | Watson et al. |
| 2014/0095350 A1 | 4/2014 | Carr et al. |
| 2014/0148944 A1 * | 5/2014 | Bailey ...................... B07C 3/00 |
| | | 700/224 |
| 2014/0149244 A1 | 5/2014 | Abhyanker |
| 2014/0188748 A1 | 7/2014 | Cavoue et al. |
| 2014/0229338 A1 | 8/2014 | Borders et al. |
| 2014/0279667 A1 | 9/2014 | Gillen |

(56) References Cited

U.S. PATENT DOCUMENTS

| | | |
|---|---|---|
| 2014/0297554 A1 | 10/2014 | Armato |
| 2014/0330741 A1 | 11/2014 | Bialynicka-Birula et al. |
| 2015/0081587 A1 | 3/2015 | Gillen |
| 2015/0120364 A1 | 4/2015 | Deshpande et al. |
| 2015/0161667 A1 | 6/2015 | Stevens et al. |
| 2015/0178678 A1 | 6/2015 | Carr et al. |
| 2015/0199644 A1 | 7/2015 | Siris |
| 2015/0227890 A1 | 8/2015 | Bednarek et al. |
| 2015/0228004 A1 | 8/2015 | Bednarek et al. |
| 2015/0248795 A1 | 9/2015 | Davidson |
| 2015/0262433 A1 | 9/2015 | Davidson |
| 2015/0269520 A1 | 9/2015 | Knapp et al. |
| 2015/0294262 A1 | 10/2015 | Nelson et al. |
| 2015/0302347 A1 | 10/2015 | Fredette |
| 2015/0356503 A1 | 12/2015 | LaVoie et al. |
| 2015/0363843 A1 | 12/2015 | Loppatto et al. |
| 2016/0071056 A1 | 3/2016 | Ellison et al. |
| 2017/0083862 A1 | 3/2017 | Loubriel |
| 2020/0229137 A1* | 7/2020 | Rubin .................. H04W 52/04 |

FOREIGN PATENT DOCUMENTS

| | | | |
|---|---|---|---|
| WO | WO 2000/068856 A2 | 11/2000 | |
| WO | WO 2001/071534 A2 | 9/2001 | |
| WO | WO 2013/134417 A1 | 9/2013 | |
| WO | 2014/032443 A1 | 3/2014 | |

OTHER PUBLICATIONS

Non-Final Rejection dated Nov. 30, 2017 for U.S. Appl. No. 13/828,652.
Final Rejection dated Dec. 19, 2017 for U.S. Appl. No. 14/988,561.
Applicant Initiated Interview Summary (PTOL-413) dated Jan. 24, 2018 for U.S. Appl. No. 14/988,561.
Applicant Initiated Interview Summary (PTOL-413) dated Jan. 24, 2018 for U.S. Appl. No. 13/828,652.
Non-Final Rejection dated Jun. 27, 2017 for U.S. Appl. No. 14/988,561.
Non-Final Rejection dated Jul. 28, 2017 for U.S. Appl. No. 14/988,527.
Final Rejection dated Jul. 26, 2017 for U.S. Appl. No. 13/828,652.
United States Patent and Trademark Office, Office Action for U.S. Appl. No. 14/988,561, dated Jul. 28, 2016, 23 pages, U.S.A.
Final Office Action received for U.S. Appl. No. 14/988,527, dated Feb. 26, 2018, 13 pages.
Final Office Action received for U.S. Appl. No. 14/664,223, dated Apr. 20, 2018, 18 pages.
Final Office Action received for U.S. Appl. No. 14/664,202, dated Apr. 20, 2018, 18 pages.
Non-Final Office Action received for U.S. Appl. No. 14/694,313, dated Apr. 3, 2018, 15 pages.
"How it Works—Cargo Sensors," General Electric Company, http://web.archive.org/web/20070307032108/http://www.trailerservices.com/veriwise/cargo.html, Mar. 7, 2007.
"Tap Your Phone, Get Stuff (Including Funding)" [online] [retrieved May 27, 2015]. Retrieved from the Internet: <URL: http://techcrunch.com/2014/04/06/tap-your-phone-get-stuff-including-funding/> (dated Apr. 6, 2014) 8 pages.
American Airlines, "American Airlines Cargo—Reservations", Aug. 5, 2013 to Sep. 19, 2015, Internet Archive <http://web.archive.org/web/20130805094248/https://www.aacargo.com/learn/reservations.html>, 4 pages.
Browning-Blas, Kristen, "Schwan's frozen-food truckers are driven to make customers' day", The Denver Post, Sep. 17, 2008, retrieved from <http://www.denverpost.com/browning/ci_10472479>, on Mar. 20, 2016, 9 pages, U.S.A.
European Patent Office, Extended European Search Report for Application No. 12735985.9, dated Aug. 27, 2015, 8 pages, Germany.
Evans, Kenneth R., et al., "Purchasing Motor Carrier Service: An Investigation of the Criteria Used by Small Manufacturing Firms", *Journal of Small Business Management*, vol. 28.1, p. 39, 1990; retrieved from Google Scholar at <https://www.questia.com/library/journal/1G1-8854587/purchasing-motor-carrier-service-an-investigation>, on Mar. 20, 2016.
International Searching Authority, International Search Report and Written Opinion for International Application No. PCT/US2012/044556, dated Jan. 15, 2013, United States Patent and Trademark Office, 19 pages, USA.
U.S. Appl. No. 13/828,652, "Systems and Methods for Synchronized Delivery", Unpublished (filed Mar. 14, 2013), (Chris Bolton, Inventor) (United Parcel Service of America, Inc., assignee).
U.S. Appl. No. 13/964,766, "Methods, Apparatuses and Computer Program Products for Generating Logistics Zones", Unpublished (filed Aug. 12, 2013), (Mark J. Davidson, Inventor) (United Parcel Service of America, Inc., assignee).
U.S. Appl. No. 14/046,172, "Methods, Apparatuses and Computer Program Products for Identifying Duplicate Travel", Unpublished (filed Oct. 4, 2013), (Mark J. Davidson, inventor) (United Parcel Service of America, Inc., assignee).
U.S. Appl. No. 14/859,766, "Systems and Methods for Reserving Space in Carrier Vehicles to Provide On Demand Delivery Services", Unpublished (filed Sep. 21, 2015), (Paul Loubriel, Inventor) (United Parcel Service of America, Inc., assignee).
U.S. Appl. No. 14/988,136, "Systems and Methods for Synchronized Delivery", Unpublished (filed Jan. 5, 2016), (Chris Bolton, Inventor) (United Parcel Service of America, Inc., assignee).
U.S. Appl. No. 14/988,527, "Systems and Methods for Synchronized Delivery", Unpublished (filed Jan. 5, 2016), (Chris Bolton, Inventor) (United Parcel Service of America, Inc., assignee).
U.S. Appl. No. 14/988,536, "Systems and Methods for Synchronized Delivery", Unpublished (filed Jan. 5, 2016), (Chris Bolton, Inventor) (United Parcel Service of America, Inc., assignee).
U.S. Appl. No. 14/988,552, "Systems and Methods for Synchronized Delivery", Unpublished (filed Jan. 5, 2016), (Chris Bolton, Inventor) (United Parcel Service of America, Inc., assignee).
U.S. Appl. No. 14/988,561, "Systems and Methods for Synchronized Delivery", Unpublished (filed Jan. 5, 2016), (Chris Bolton, Inventor) (United Parcel Service of America, Inc., assignee).
United States Patent and Trademark Office, Office Action for U.S. Appl. No. 13/828,652, dated Feb. 10, 2015, 25 pages, USA.
United States Patent and Trademark Office, Office Action for U.S. Appl. No. 13/828,652, dated Oct. 14, 2015, 32 pages, USA.
Wohlsen, Marcus, "How Robots and Military-Grade Algorithms Make Same-Day Delivery Possible", Wired.com, Mar. 19, 2013, 8 pages, retrieved from <http://www.wired.com/category/business/?p=76398>, on Mar. 20, 2016.
Non-Final Office Action received for U.S. Appl. No. 14/988,136, dated Aug. 28, 2018, 19 pages.
United States Patent and Trademark Office, Office Action for U.S. Appl. No. 13/828,652, dated Jan. 20, 2017, 44 pages, U.S.A.
United States Patent and Trademark Office, Office Action for U.S. Appl. No. 14/988,527, dated Nov. 17, 2016, 40 pages, U.S.A.
United States Patent and Trademark Office, Office Action for U.S. Appl. No. 14/988,561, dated Dec. 12, 2016, 33 pages, U.S.A.
United States Patent and Trademark Office, Office Action for U.S. Appl. No. 14/988,527, dated May 11, 2016, 26 pages, U.S.A.
United States Patent and Trademark Office, Office Action for U.S. Appl. No. 13/828,652, dated Mar. 17, 2016, 34 pages, U.S.A.
Non-Final Office Action received for U.S. Appl. No. 14/988,552, dated Oct. 4, 2018, 17 pages.
Notice of Allowance received for U.S. Appl. No. 14/988,527, dated Apr. 3, 2019, 16 pages.
Final Office Action received for U.S. Appl. No. 14/859,766, dated Jun. 11, 2019, 31 pages.
Final Office Action received for U.S. Appl. No. 14/988,552, dated Feb. 5, 2019, 26 pages.
Non-Final Office Action received for U.S. Appl. No. 14/664,202, dated Jan. 24, 2019, 21 pages.
Non-Final Office Action received for U.S. Appl. No. 14/859,766, dated Nov. 13, 2018, 36 pages.
Non-Final Office Action received for U.S. Appl. No. 14/664,223, dated Feb. 7, 2019, 23 pages.
Final Office Action received for U.S. Appl. No. 14/664,223, dated Sep. 11, 2019, 27 pages.

(56) References Cited

OTHER PUBLICATIONS

Non-Final Office Action received for U.S. Appl. No. 14/694,313, dated Aug. 30, 2019, 27 pages.
Non-Final Office Action received for U.S. Appl. No. 14/988,552, dated Sep. 30, 2019, 30 pages.
Non-Final Office Action received for U.S. Appl. No. 14/988,536, dated Dec. 10, 2019, 21 pages.
Final Office Action received for U.S. Appl. No. 14/988,552, dated Apr. 30, 2020, 30 pages.
Non-Final Office Action received for U.S. Appl. No. 14/859,766, dated Apr. 22, 2020, 32 pages.
Non-Final Office Action received for U.S. Appl. No. 14/664,223, dated Jun. 25, 2020, 12 pages.
Non-Final Office Action received for U.S. Appl. No. 14/694,313, dated Oct. 5, 2020, 42 pages.
Final Office Action received for U.S. Appl. No. 14/859,766, dated Dec. 18, 2020, 43 pages.
Non-Final Office Action received for U.S. Appl. No. 14/988,552, dated Mar. 19, 2021, 34 pages.
Notice of Allowance received for U.S. Appl. No. 14/859,766, dated Jun. 23, 2021, 18 pages.
What is Order Fulfillment?, eFulfillment Service; Available on internet at: <https://www.efulfillmentservice.com/2013/01/what-is-order-fulfillment/>, Jan. 15, 2013, pp. 1-12.

* cited by examiner

*Serviceable Point Profile for:*
100 Main Street
Atlanta, GA 30309

Geographic Descriptor:
Sudden Valley Neighborhood

Deliver to Front Door
Coordinates: 33.787 N, 84.388 W

Alternative indicator(s):
100 Main St.

Nearby Serviceable Point(s):
99 Main Street          102 Main Street
101 Main Street         105 First Avenue

Fig. 3

501
Assign a street segment identifier to each of a plurality of serviceable points

502
Receive item data identifying a delivery destination

503
Identify a serviceable point corresponding to the delivery destination

504
Identify a street segment identifier corresponding to the identified serviceable point

505
Identify other serviceable points having the same street segment identifier

506
Determine whether stop creator shipments are scheduled to be delivered to one or more other serviceable points having the same street segment identifier

507
Update item data to reflect a changed delivery schedule such that the item is rescheduled for delivery on the same day as one or more stop creator shipments

Fig. 6

| Sampleable Point Associated Level | Super Urban | | Urban | | Suburban | | Rural | |
|---|---|---|---|---|---|---|---|---|
| | Time | Distance | Time | Distance | Time | Distance | Time | Distance |
| Exact (Primary) | 20s | 10m | 20s | 10m | 20s | 10m | 20s | 10m |
| Car Stop (Proximity) | 30s | 25m | 30s | 50m | 60s | 100m | 60s | 400m |
| Street Level (Proximity) | 55s | 300m | 55s | 600m | 90s | 300m | 90s | 600m |

| Address | Indicator |
|---|---|
| 1 Aardvark Avenue | N |
| ... | |
| 2799 Zwanandale Lane | Y |

Fig. 15

| Address | Day 1 Indicator | Day 2 Indicator | Day 3 Indicator |
|---|---|---|---|
| 1 Aardvark Avenue | N | Y | N |
| ... | | | |
| 2799 Zwanandale Lane | Y | N | Y |

Fig. 16

SYSTEMS AND METHODS FOR SYNCHRONIZED DELIVERY

CROSS-REFERENCE TO RELATED APPLICATIONS

This application is a continuation of U.S. patent application Ser. No. 14/988,136, filed Jan. 5, 2016, which is a continuation-in-part of U.S. patent application Ser. No. 13/828,652 filed Mar. 14, 2013, which claims priority to U.S. Patent Application No. 61/761,915 filed Feb. 7, 2013, the contents of both of which are incorporated herein by reference in their entirety.

BACKGROUND

A common challenge faced by delivery companies ("carriers"; both traditional carriers and non-traditional carriers) is to increase the density of deliveries to addresses, serviceable points, areas, regions, and/or the like. Increased density not only improves efficiency of the deliveries, it also reduces fuel consumed and emissions per shipment/item. However, carriers are limited in their ability to affect the density of deliveries. Typically, carriers are forced into a reactive mode in trying to aggregate shipments/items already received from shippers/consignors. For example, U.S. Publication No. 2006/0041481 to Stowe and assigned to United Parcel Service of America, Inc. describes various methods for aggregating shipments/items within a carrier network. Needs therefore exist for systems and methods that allow carriers to proactively manage the receipt of shipments/items to facilitate more efficient delivery.

BRIEF SUMMARY

In general, embodiments of the present invention provide systems, methods, apparatus, and computer program products for identifying possible (or probable) synchronized delivery opportunities and delivery incentives.

In accordance with one aspect, a method for encouraging synchronized delivery of a prospective shipment/item is provided. The method includes the steps of: creating a plurality of address profiles using historical data, wherein each address profile identifies at least one of (a) a frequency of stops associated with an address or nearby addresses, (b) costs associated with making a stop associated with an address or nearby of addresses and (c) a reputation associated with an address or nearby addresses; receiving shipping information from a merchant, via a computer system, for a prospective shipment, wherein the shipping information includes a destination address; identifying a certain address profile associated with the destination address; applying business rules to the certain address profile to determine whether the prospective shipment/item qualifies for an incentive; and sending an indicator message to the merchant indicating whether the prospective shipment/item qualifies for an incentive based on the application of the business rules.

In another aspect, a method for encouraging synchronized delivery of a prospective shipment/item is provided. The method includes the steps of: receiving shipping information from a merchant, via a computer system, for a prospective shipment, wherein the shipping information includes a destination address; comparing the destination address to dynamic information/data relating to deliveries forecasted for delivery to the destination address or nearby address; identifying dates in which one or more stop creator shipments/items are forecasted for delivery to the destination address or nearby addresses; applying business rules to the one or more stop creator shipments/items to determine if the prospective shipment/item qualifies for an incentive; and sending an indicator message to the merchant indicating whether the prospective shipment/item qualifies for an incentive based on the application of the business rules.

In a further aspect, an apparatus including at least one processor and at least one memory including computer program code is provided. The at least one memory and the computer program code are configured to, with the processor, cause the apparatus to at least: create a plurality of address profiles using historical data, wherein each address profile identifies at least one of (a) a frequency of stops associated with an address or nearby addresses, (b) costs associated with making a stop associated with the address or nearby addresses and (c) a reputation associated with an address or nearby addresses; receive shipping information from a merchant, via a computer system, for a prospective shipment, wherein the shipping information includes a destination address; identify a certain address profile associated with the destination address; apply business rules to the certain address profile to determine whether the prospective shipment/item qualifies for an incentive; and send an indicator message to the merchant indicating whether the prospective shipment/item qualifies for an incentive based on the application of the business rules.

In another aspect, an apparatus comprising at least one processor and at least one memory including computer program code is provided. The at least one memory and the computer program code are configured to, with the processor, cause the apparatus to at least: receive shipping information from a merchant, via a computer system, for a prospective shipment, wherein the shipping information includes a destination address; compare the destination address to dynamic information/data relating to deliveries forecasted for delivery to the destination address or nearby address; identify dates in which one or more stop creator shipments/items are forecasted for delivery to the destination address or nearby addresses; apply business rules to the one or more stop creator shipments/items to determine if the prospective shipment/item qualifies for an incentive; and send an indicator message to the merchant indicating whether the prospective shipment/item qualifies for an incentive based on the application of the business rules.

Various embodiments are directed to a computer-implemented method. The computer-implemented method may comprise: defining a geofence surrounding a geographic area that comprises a plurality of serviceable points, the plurality of serviceable points comprising a first serviceable point; associating the geofence with a record for the first serviceable point, the record for the first serviceable point comprising (a) a physical address for the first serviceable point and (b) a geocode for the first serviceable point; receiving first electronic shipping data indicating that a first shipment is to be delivered to the first serviceable point; and responsive to receiving first electronic shipping data indicating that the first shipment is to be delivered to the first serviceable point, determining whether a second shipment is to be delivered to a second serviceable point of the plurality of serviceable points surrounded by the geofence. Moreover, in various embodiments, (a) the record for the first serviceable point further comprises a physical address for each of the plurality of serviceable points and (b) determining whether a second shipment is to be delivered to a second serviceable point within the geofence further comprises searching a plurality of shipment records to determine whether at least one of the plurality shipment records comprises a physical address that corresponds to a physical address for one of the plurality of serviceable points. In various embodiments, the geofence is defined surrounding a common ingress and egress point. Moreover, in various embodiments, the method additionally comprises determining whether the second serviceable point is an excluded serviceable point. Various embodiments additionally comprise providing an indication of the synchronized delivery for the first serviceable point and the second serviceable point and/or electronically modifying the second electronic shipping data for the second shipment to modify the delivery service level for the second shipment. In various embodiments, the method comprises providing an incentive for the synchronized delivery of the first shipment and the second shipment. In various embodiments, the first shipment is being transported by a first carrier and the second shipment is being transported by a second carrier.

The method may also comprise identifying a physical address for the second serviceable point of the plurality of serviceable points; and searching a plurality of shipment records to determine whether at least one of the plurality shipment records comprises an address that corresponds to the physical address for the second serviceable point.

In various embodiments, (a) the record for the first serviceable point further comprises a geocode for each of the plurality of serviceable points and (b) determining whether a second shipment is to be delivered to a second serviceable point within the geofence further comprises searching a plurality of shipment records to determine whether at least one of the plurality shipment records comprises a geocode that corresponds to a geocode for one of the plurality of serviceable points.

Moreover, in various embodiments, the method may additionally comprise identifying a geocode for the second serviceable point of the plurality of serviceable points; and searching a plurality of shipment records to determine whether at least one of the plurality shipment records comprises a geocode that corresponds to the geocode for the second serviceable point. In various embodiments, searching the plurality of shipment records is limited to shipment records with a particular geographic descriptor.

Yet other embodiments are directed to a system for facilitating delivery of shipments, the system comprising one or more memory storage areas; and one or more computer processors. In various embodiments, the one or more computer processors are collectively configured to: define a geofence surrounding a geographic area that comprises a plurality of serviceable points, the plurality of serviceable points comprising a first serviceable point; associate the geofence with a record for the first serviceable point, the record for the first serviceable point comprising (a) a physical address for the first serviceable point and (b) a geocode for the first serviceable point; receive first electronic shipping data indicating that a first shipment is to be delivered to the first serviceable point; and responsive to receiving first electronic shipping data indicating that the first shipment is to be delivered to the first serviceable point, determine whether a second shipment is to be delivered to a second serviceable point of the plurality of serviceable points surrounded by the geofence. Moreover, in various embodiments, (a) the record for the first serviceable point further comprises a physical address for each of the plurality of serviceable points and (b) determining whether a second shipment is to be delivered to a second serviceable point within the geofence further comprises searching a plurality of shipment records to determine whether at least one of the plurality shipment records comprises a physical address that corresponds to a physical address for one of the plurality of serviceable points. In various embodiments, the geofence is defined surrounding a common ingress and egress point. Moreover, in various embodiments, the one or more computer processors are additionally configured to determine whether the second serviceable point is an excluded serviceable point. The one or more computer processors may additionally be configured to provide an indication of the synchronized delivery for the first serviceable point and the second serviceable point and/or electronically modify the second electronic shipping data for the second shipment to modify the delivery service level for the second shipment. In various embodiments, the one or more computer processors may additionally be configured to provide an incentive for the synchronized delivery of the first shipment and the second shipment. In various embodiments, the first shipment is being transported by a first carrier and the second shipment is being transported by a second carrier.

The one or more computer processors may additionally be configured to identify a physical address for the second serviceable point of the plurality of serviceable points; and search a plurality of shipment records to determine whether at least one of the plurality shipment records comprises an address that corresponds to the physical address for the second serviceable point.

In various embodiments, (a) the record for the first serviceable point further comprises a geocode for each of the plurality of serviceable points and (b) determining whether a second shipment is to be delivered to a second serviceable point within the geofence further comprises searching a plurality of shipment records to determine whether at least one of the plurality shipment records comprises a geocode that corresponds to a geocode for one of the plurality of serviceable points.

Moreover, in various embodiments, the one or more computer processors may additionally be configured to identify a geocode for the second serviceable point of the plurality of serviceable points; and search a plurality of shipment records to determine whether at least one of the plurality shipment records comprises a geocode that corresponds to the geocode for the second serviceable point. In various embodiments, searching the plurality of shipment records is limited to shipment records with a particular geographic descriptor.

Various embodiments are directed to a computer-implemented method comprising steps for receiving first electronic shipping data indicating that a first shipment is to be delivered to a first serviceable point; and responsive to receiving the first electronic shipping data indicating that the first shipment is to be delivered to the first serviceable point, determining whether a second shipment to be delivered to a second serviceable point is available for synchronized delivery with the first shipment, by: identifying a previous distance, the previous distance associated with the first serviceable point and the second serviceable point; identifying a previous time elapsed, the previous time elapsed associated with the first serviceable point and the second serviceable point; determining whether the previous distance satisfies a configurable distance threshold, the previous time elapsed satisfies a configurable time elapsed threshold, or both; and responsive to determining that the previous distance satisfies the configurable distance threshold, the previous time elapsed satisfies the configurable time elapsed threshold, or both, providing an indication that the first shipment and the second shipment are available for synchronized delivery. In various embodiments, (a) the configurable distance threshold comprises a maximum distance between the first serviceable point and the second serviceable point and (b) the configurable time elapsed threshold comprises a maximum travel time. The configurable distance threshold may be selected from the group consisting of a walking distance, a driving distance, and walking and driving distance. In various embodiments, (a) the previous distance comprises a historical distance and (b) the previous time elapsed comprises a historical travel time. Moreover, the configurable distance threshold may comprise a maximum distance and the configurable time elapsed threshold may comprise a maximum delivery time between the first serviceable point and the second serviceable point.

In various embodiments, the previous distance may comprise a historical distance and the previous time elapsed threshold may comprise a historical delivery time between the first serviceable point and the second serviceable point. Moreover, the first serviceable point and the second serviceable point may comprise a particular geographic descriptor. In various embodiments, the method may further comprise determining whether the second serviceable point is an excluded serviceable point. Moreover, the method may further comprise electronically modifying the second electronic shipping data for the second shipment to modify the delivery service level for the second shipment. Moreover, the method may further comprise providing an incentive for the synchronized delivery of the first shipment and the second shipment. In various embodiments, the first shipment is being transported by a first carrier and the second shipment is being transported by a second carrier.

Various embodiments are directed to a system for facilitating delivery of shipments, the system comprising one or more memory storage areas; and one or more computer processors. In various embodiments, the one or more computer processors are collective configured to: receive first electronic shipping data indicating that a first shipment is to be delivered to a first serviceable point; and responsive to receiving the first electronic shipping data indicating that the first shipment is to be delivered to the first serviceable point, determine whether a second shipment to be delivered to a second serviceable point is available for synchronized delivery with the first shipment by: identifying a previous distance, the previous distance associated with the first serviceable point and the second serviceable point; identifying a previous time elapsed, the previous time elapsed associated with the first serviceable point and the second serviceable point; determining whether the previous distance satisfies a configurable distance threshold, the previous time elapsed satisfies a configurable time elapsed threshold, or both; and responsive to determining that the previous distance satisfies the configurable distance threshold, the previous time elapsed satisfies the configurable time elapsed threshold, or both, providing an indication that the first shipment and the second shipment are available for synchronized delivery.

In various embodiments, (a) the configurable distance threshold comprises a maximum distance between the first serviceable point and the second serviceable point and (b) the configurable time elapsed threshold comprises a maximum travel time. The configurable distance threshold may be selected from the group consisting of a walking distance, a driving distance, and walking and driving distance. In various embodiments, (a) the previous distance comprises a historical distance and (b) the previous time elapsed comprises a historical travel time. Moreover, the configurable distance threshold may comprise a maximum distance and the configurable time elapsed threshold may comprise a maximum delivery time between the first serviceable point and the second serviceable point.

In various embodiments, the previous distance may comprise a historical distance and the previous time elapsed threshold may comprise a historical delivery time between the first serviceable point and the second serviceable point. Moreover, the first serviceable point and the second serviceable point may comprise a particular geographic descriptor. In various embodiments, the one or more computer processors may be additionally configured to determine whether the second serviceable point is an excluded serviceable point. Moreover, the one or more computer processors may be additionally configured to electronically modify the second electronic shipping data for the second shipment to modify the delivery service level for the second shipment. Moreover, the one or more computer processors may be additionally configured to provide an incentive for the synchronized delivery of the first shipment and the second shipment. In various embodiments, the first shipment is being transported by a first carrier and the second shipment is being transported by a second carrier.

Various embodiments are directed to a computer program product comprising at least one non-transitory computer-readable storage medium having computer-readable program code portions stored therein. The computer-readable program code portions may comprise an executable portion configured to receive first electronic shipping data indicating that a first shipment is to be delivered to a first serviceable point; and an executable portion configured to, responsive to receiving the first electronic shipping data indicating that the first shipment is to be delivered to the first serviceable point, determine whether a second shipment to be delivered to a second serviceable point is available for synchronized delivery with the first shipment by: identifying a previous distance, the previous distance associated with the first serviceable point and the second serviceable point; identifying a previous time elapsed, the previous time elapsed associated with the first serviceable point and the second serviceable point; determining whether (a) the previous distance satisfies a configurable distance threshold, (b) the previous time elapsed satisfies a configurable time elapsed threshold, or (c) both; and an executable portion configured to, responsive to determining that (a) the previous distance satisfies the configurable distance threshold, (b) the previous time elapsed satisfies the configurable time elapsed threshold, or (c) both, provide an indication that the first shipment and the second shipment are available for synchronized delivery.

In various embodiments, (a) the configurable distance threshold comprises a maximum distance between the first serviceable point and the second serviceable point and (b) the configurable time elapsed threshold comprises a maximum travel time. The configurable distance threshold may be selected from the group consisting of a walking distance, a driving distance, and walking and driving distance. In various embodiments, (a) the previous distance comprises a historical distance and (b) the previous time elapsed comprises a historical travel time. Moreover, the configurable distance threshold may comprise a maximum distance and the configurable time elapsed threshold may comprise a maximum delivery time between the first serviceable point and the second serviceable point.

In various embodiments, the previous distance may comprise a historical distance and the previous time elapsed threshold may comprise a historical delivery time between the first serviceable point and the second serviceable point. Moreover, the first serviceable point and the second serviceable point may comprise a particular geographic descriptor.

In various embodiments, the computer program product may additionally comprise an executable portion configured to determine whether the second serviceable point is an excluded serviceable point. Moreover, the computer program product may additionally comprise an executable portion configured to electronically modify the second electronic shipping data for the second shipment to modify the delivery service level for the second shipment. Moreover, the computer program product may additionally comprise an executable portion configured to provide an incentive for the synchronized delivery of the first shipment and the second shipment. In various embodiments, the first shipment is being transported by a first carrier and the second shipment is being transported by a second carrier.

Various embodiments are directed to a computer-implemented method comprising: storing serviceable point data for each of a plurality of serviceable points, the serviceable point data for each serviceable point comprising data identifying a street segment identifier for the corresponding serviceable point; receiving first electronic shipping data indicating that a first shipment is to be delivered to a first serviceable point of the plurality of serviceable points; and responsive to receiving the first electronic shipping data indicating that the first shipment is to be delivered to the first serviceable point, determining whether a second shipment to be delivered to a second serviceable point is available for synchronized delivery with the first shipment by: determining whether (a) the street segment corresponding to the first serviceable point is the same as the street segment corresponding to the second serviceable point, (b) the street segment corresponding to the first serviceable point is connected to the street segment corresponding to the second serviceable point, or (c) both; and responsive to determining that (a) the street segment corresponding to the first serviceable point is the same as the street segment corresponding to the second serviceable point, (b) the street segment corresponding to the first serviceable point is connected to the street segment corresponding to the second serviceable point, or (c) both, providing an indication that the first shipment and the second shipment are available for synchronized delivery.

In various embodiments, a node connects the first serviceable point and the second serviceable point. Moreover, the first serviceable point and the second serviceable point may comprise a particular geographic descriptor. In various embodiments, the method additionally comprises determining whether the second serviceable point is an excluded serviceable point. In various embodiments, the method additionally comprises electronically modifying second electronic shipping data for the second shipment to modify the delivery service level for the second shipment. Moreover, in various embodiments, the street segment for the first serviceable point and the street segment for the second serviceable point have a common ingress and egress point. In various embodiments, the method additionally comprises providing an incentive for the synchronized delivery of the first shipment and the second shipment. Moreover, in various embodiments, the first shipment is being transported by a first carrier and the second shipment is being transported by a second carrier.

Various embodiments are directed to a system for facilitating delivery of shipments, the system comprising one or more memory storage areas; and one or more computer processors. In various embodiments, the one or more computer processors are collective configured to: store, in the one or more memory storage areas, serviceable point data for each of a plurality of serviceable points, the serviceable point data for each serviceable point comprising data identifying a street segment identifier for the corresponding serviceable point; receive first electronic shipping data indicating that a first shipment is to be delivered to a first serviceable point of the plurality of serviceable points; and responsive to receiving the first electronic shipping data indicating that the first shipment is to be delivered to the first serviceable point, determine whether a second shipment to be delivered to a second serviceable point is available for synchronized delivery with the first shipment by: determining whether (a) the street segment corresponding to the first serviceable point is the same as the street segment corresponding to the second serviceable point, (b) the street segment corresponding to the first serviceable point is connected to the street segment corresponding to the second serviceable point, or (c) both; and responsive to determining that (a) the street segment corresponding to the first serviceable point is the same as the street segment corresponding to the second serviceable point, (b) the street segment corresponding to the first serviceable point is connected to the street segment corresponding to the second serviceable point, or (c) both, provide an indication that the first shipment and the second shipment are available for synchronized delivery.

In various embodiments, a node connects the first serviceable point and the second serviceable point. Moreover, the first serviceable point and the second serviceable point may comprise a particular geographic descriptor. In various embodiments, the one or more computer processors are additionally configured to determine whether the second serviceable point is an excluded serviceable point. In various embodiments, the one or more computer processors are additionally configured to electronically modify second electronic shipping data for the second shipment to modify the delivery service level for the second shipment. Moreover, in various embodiments, the street segment for the first serviceable point and the street segment for the second serviceable point have a common ingress and egress point. In various embodiments, the one or more computer processors are additionally configured to provide an incentive for the synchronized delivery of the first shipment and the second shipment. Moreover, in various embodiments, the first shipment is being transported by a first carrier and the second shipment is being transported by a second carrier.

Various embodiments are directed to a computer program product comprising at least one non-transitory computer-readable storage medium having computer-readable program code portions stored therein. In various embodiments, the computer-readable program code portions comprise an executable portion configured to store serviceable point data for each of a plurality of serviceable points, the serviceable point data for each serviceable point comprising data identifying a street segment identifier for the corresponding serviceable point; an executable portion configured to receive first electronic shipping data indicating that a first shipment is to be delivered to a first serviceable point of the plurality of serviceable points; and an executable portion configured to, responsive to receiving the first electronic shipping data indicating that the first shipment is to be delivered to the first serviceable point, determine whether a second shipment to be delivered to a second serviceable point is available for synchronized delivery with the first shipment by: determining whether (a) the street segment corresponding to the first serviceable point is the same as the street segment corresponding to the second serviceable point, (b) the street segment corresponding to the first serviceable point is connected to the street segment corresponding to the second serviceable point, or (c) both; and an executable portion configured to, responsive to determining that (a) the street segment corresponding to the first serviceable point is the same as the street segment corresponding to the second serviceable point, (b) the street segment corresponding to the first serviceable point is connected to the street segment corresponding to the second serviceable point, or (c) both, provide an indication that the first shipment and the second shipment are available for synchronized delivery.

In various embodiments, a node connects the first serviceable point and the second serviceable point. Moreover, the first serviceable point and the second serviceable point may comprise a particular geographic descriptor. In various embodiments, the computer program product additionally comprises an executable portion configured to determine whether the second serviceable point is an excluded serviceable point. In various embodiments, the computer program product additionally comprises an executable portion configured to electronically modify second electronic shipping data for the second shipment to modify the delivery service level for the second shipment. Moreover, in various embodiments, the street segment for the first serviceable point and the street segment for the second serviceable point have a common ingress and egress point. In various embodiments, the computer program product additionally comprises an executable portion configured to provide an incentive for the synchronized delivery of the first shipment and the second shipment. Moreover, in various embodiments, the first shipment is being transported by a first carrier and the second shipment is being transported by a second carrier.

Various embodiments are directed to a computer-implemented method comprising: receiving first electronic shipping data indicating that a first shipment is to be delivered to a first serviceable point; receiving second electronic shipping data indicating that a second shipment is to be delivered to a second serviceable point; identifying (a) a first geographic descriptor for the first serviceable point from the first electronic shipping data and (b) a second geographic descriptor for the second serviceable point from the second electronic shipping data; determining whether the first geographic descriptor and the second geographic descriptor are the same; and responsive to determining that the first geographic descriptor and the second geographic descriptor are the same, providing an indication that the first shipment and the second shipment are available for synchronized delivery.

In various embodiments, the method further comprises determining whether the second serviceable point is an excluded serviceable point. Moreover, in various embodiments, the method comprises electronically modifying the second electronic shipping data for the second shipment to modify the delivery service level for the second shipment. In various embodiments, the method comprises providing an incentive for the synchronized delivery of the first shipment and the second shipment. Moreover, in various embodiments, the method comprises, responsive to determining that the first geographic descriptor and the second geographic descriptor are not the same, providing an indication that the first shipment and the second shipment are not available for synchronized delivery. In various embodiments, the first geographic descriptor is selected from the group consisting of a zip code, a street name, a neighborhood name, and a geographic area. Moreover, in various embodiments, the first shipment is being transported by a first carrier and the second shipment is being transported by a second carrier.

Various embodiments are directed to a system for facilitating delivery of shipments, the system comprising one or more memory storage areas; and one or more computer processors. In various embodiments, the one or more computer processors are collective configured to: receive first electronic shipping data indicating that a first shipment is to be delivered to a first serviceable point; receive second electronic shipping data indicating that a second shipment is to be delivered to a second serviceable point; identify (a) a first geographic descriptor for the first serviceable point from the first electronic shipping data and (b) a second geographic descriptor for the second serviceable point from the second electronic shipping data; determine whether the first geographic descriptor and the second geographic descriptor are the same; and responsive to determining that the first geographic descriptor and the second geographic descriptor are the same, provide an indication that the first shipment and the second shipment are available for synchronized delivery.

In various embodiments, the computer program products are additionally configured to determine whether the second serviceable point is an excluded serviceable point. Moreover, in various embodiments, the computer program products are additionally configured to electronically modify the second electronic shipping data for the second shipment to modify the delivery service level for the second shipment. In various embodiments, the computer program products are additionally configured to provide an incentive for the synchronized delivery of the first shipment and the second shipment. Moreover, in various embodiments, the computer program products are additionally configured to, responsive to determining that the first geographic descriptor and the second geographic descriptor are not the same, provide an indication that the first shipment and the second shipment are not available for synchronized delivery. In various embodiments, the first geographic descriptor is selected from the group consisting of a zip code, a street name, a neighborhood name, and a geographic area. Moreover, in various embodiments, the first shipment is being transported by a first carrier and the second shipment is being transported by a second carrier.

Various embodiments are directed to a computer program product comprising at least one non-transitory computer-readable storage medium having computer-readable program code portions stored therein. In various embodiments, the computer-readable program code portions comprises: an executable portion configured to receive first electronic shipping data indicating that a first shipment is to be delivered to a first serviceable point; an executable portion configured to receive second electronic shipping data indicating that a second shipment is to be delivered to a second serviceable point; an executable portion configured to identify (a) a first geographic descriptor for the first serviceable point from the first electronic shipping data and (b) a second geographic descriptor for the second serviceable point from the second electronic shipping data; an executable portion configured to determine whether the first geographic descriptor and the second geographic descriptor are the same; and an executable portion configured to, responsive to determining that the first geographic descriptor and the second geographic descriptor are the same, provide an indication that the first shipment and the second shipment are available for synchronized delivery.

In various embodiments, the computer program product additionally comprises an executable portion configured to determine whether the second serviceable point is an excluded serviceable point. Moreover, in various embodiments, the computer program product additionally comprises an executable portion configured to electronically modify the second electronic shipping data for the second shipment to modify the delivery service level for the second shipment. In various embodiments, the computer program product additionally comprises an executable portion configured to provide an incentive for the synchronized delivery of the first shipment and the second shipment. Moreover, in various embodiments, the computer program product additionally comprises an executable portion configured to, responsive to determining that the first geographic descriptor and the second geographic descriptor are not the same, provide an indication that the first shipment and the second shipment are not available for synchronized delivery. In various embodiments, the first geographic descriptor is selected from the group consisting of a zip code, a street name, a neighborhood name, and a geographic area. Moreover, in various embodiments, the first shipment is being transported by a first carrier and the second shipment is being transported by a second carrier.

Various embodiments are directed to a computer implemented method comprising: storing a record for a first serviceable point, wherein the record comprises (a) data identifying the first serviceable point and (b) data identifying a second serviceable point; receiving first electronic shipping data indicating that a first shipment is to be delivered to the first serviceable point within a configurable time period; and responsive to receiving the first electronic shipping data, accessing the record for the first serviceable point to retrieve the data identifying the second serviceable point; searching a plurality of shipment records to determine whether a second shipment is to be delivered to the second serviceable point within the configurable time period; responsive to determining that a second shipment is to be delivered to the second serviceable point within the configurable time period, providing an indication that the first shipment and the second shipment are available for synchronized delivery.

In various embodiments, the data identifying the second serviceable point comprises a geocode for the second serviceable point, and searching the plurality of shipment records comprises determining whether at least one of the plurality of shipment records comprises a geocode that corresponds to the geocode for the second serviceable point. In various embodiments, the data identifying the second serviceable point comprises a physical address for the second serviceable point, and searching the plurality of shipment records comprises determining whether at least one of the plurality shipment records comprises a physical address that corresponds to the physical address for the second serviceable point. Moreover, in various embodiments, the data identifying the first serviceable point and the data identifying the second serviceable point comprise a common geographic descriptor and searching the plurality of shipment records comprises determining whether at least one of the plurality shipment records comprises the common geographic descriptor. In various embodiments, the data identifying the second serviceable point comprises a street segment identifier for the second serviceable point, and searching the plurality of shipment records comprises determining whether at least one of the plurality shipment records comprises a street segment identifier that corresponds to the identifier for the second serviceable point. In various embodiments, the first serviceable point and the second serviceable point are within (a) a configurable distance from one another, (b) a configurable time from one another, or (c) both. Moreover, in various embodiments, the method additionally comprises determining whether the second serviceable point is an excluded serviceable point. Searching the plurality of shipment records may be limited to shipment records with a particular geographic descriptor. Moreover, in various embodiments, the first shipment is being transported by a first carrier and the second shipment is being transported by a second carrier.

Various embodiments are directed to a system for facilitating delivery of shipments, the system comprising one or more memory storage areas; and one or more computer processors. In various embodiments, the one or more computer processors are collective configured to: store, in the one or more memory storage areas, a record for a first serviceable point, wherein the record comprises (a) data identifying the first serviceable point and (b) data identifying a second serviceable point; receive first electronic shipping data indicating that a first shipment is to be delivered to the first serviceable point within a configurable time period; and responsive to receiving the first electronic shipping data, access the record for the first serviceable point to retrieve the data identifying the second serviceable point; search a plurality of shipment records to determine whether a second shipment is to be delivered to the second serviceable point within the configurable time period; responsive to determining that a second shipment is to be delivered to the second serviceable point within the configurable time period, provide an indication that the first shipment and the second shipment are available for synchronized delivery.

In various embodiments, the data identifying the second serviceable point comprises a geocode for the second serviceable point, and searching the plurality of shipment records comprises determining whether at least one of the plurality of shipment records comprises a geocode that corresponds to the geocode for the second serviceable point. In various embodiments, the data identifying the second serviceable point comprises a physical address for the second serviceable point, and searching the plurality of shipment records comprises determining whether at least one of the plurality shipment records comprises a physical address that corresponds to the physical address for the second serviceable point. Moreover, in various embodiments, the data identifying the first serviceable point and the data identifying the second serviceable point comprise a common geographic descriptor and searching the plurality of shipment records comprises determining whether at least one of the plurality shipment records comprises the common geographic descriptor. In various embodiments, the data identifying the second serviceable point comprises a street segment identifier for the second serviceable point, and searching the plurality of shipment records comprises determining whether at least one of the plurality shipment records comprises a street segment identifier that corresponds to the identifier for the second serviceable point. In various embodiments, the first serviceable point and the second serviceable point are within (a) a configurable distance from one another, (b) a configurable time from one another, or (c) both. Moreover, in various embodiments, the computer processors are additionally configured to determine whether the second serviceable point is an excluded serviceable point. Searching the plurality of shipment records may be limited to shipment records with a particular geographic descriptor. Moreover, in various embodiments, the first shipment is being transported by a first carrier and the second shipment is being transported by a second carrier.

Various embodiments are directed to a computer program product comprising at least one non-transitory computer-readable storage medium having computer-readable program code portions stored therein. The computer-readable program code portions may comprise: an executable portion configured to store a record for a first serviceable point, wherein the record comprises (a) data identifying the first serviceable point and (b) data identifying a second serviceable point; an executable portion configured to receive first electronic shipping data indicating that a first shipment is to be delivered to the first serviceable point within a configurable time period; and an executable portion configured to, responsive to receiving the first electronic shipping data, access the record for the first serviceable point to retrieve the data identifying the second serviceable point; an executable portion configured to search a plurality of shipment records to determine whether a second shipment is to be delivered to the second serviceable point within the configurable time period; and an executable portion configured to, responsive to determining that a second shipment is to be delivered to the second serviceable point within the configurable time period, provide an indication that the first shipment and the second shipment are available for synchronized delivery.

In various embodiments, the data identifying the second serviceable point comprises a geocode for the second serviceable point, and searching the plurality of shipment records comprises determining whether at least one of the plurality of shipment records comprises a geocode that corresponds to the geocode for the second serviceable point. In various embodiments, the data identifying the second serviceable point comprises a physical address for the second serviceable point, and searching the plurality of shipment records comprises determining whether at least one of the plurality shipment records comprises a physical address that corresponds to the physical address for the second serviceable point. Moreover, in various embodiments, the data identifying the first serviceable point and the data identifying the second serviceable point comprise a common geographic descriptor and searching the plurality of shipment records comprises determining whether at least one of the plurality shipment records comprises the common geographic descriptor. In various embodiments, the data identifying the second serviceable point comprises a street segment identifier for the second serviceable point, and searching the plurality of shipment records comprises determining whether at least one of the plurality shipment records comprises a street segment identifier that corresponds to the identifier for the second serviceable point. In various embodiments, the first serviceable point and the second serviceable point are within (a) a configurable distance from one another, (b) a configurable time from one another, or (c) both. Moreover, in various embodiments, the computer program product additionally comprises an executable portion configured to determine whether the second serviceable point is an excluded serviceable point. Searching the plurality of shipment records may be limited to shipment records with a particular geographic descriptor. Moreover, in various embodiments, the first shipment is being transported by a first carrier and the second shipment is being transported by a second carrier.

Various embodiments are directed to a computer-implemented method comprising: storing serviceable point data for each of a plurality of serviceable points, the serviceable point data for each serviceable point comprising data identifying a serviceable point cluster; receiving first electronic shipping data indicating that a first shipment is to be delivered to a first serviceable point associated with a particular serviceable point cluster; and responsive to receiving the first electronic shipping data indicating that the first shipment is to be delivered to the first serviceable point, determining whether a second shipment to be delivered to a second serviceable point associated with the particular serviceable point cluster is available for synchronized delivery with the first shipment; wherein determining whether deliveries to the second serviceable point are available for synchronized delivery with shipments to be delivered to the first serviceable point is determined at least in part by: identifying a delivery activity frequency occurring within the serviceable point cluster; and determining whether the delivery activity frequency occurring within the serviceable point cluster satisfies a configurable frequency threshold; and responsive to determining that the delivery activity frequency occurring within the serviceable point cluster satisfies the configurable frequency threshold, providing an indication that the first shipment and the second shipment are available for synchronized delivery.

In various embodiments, each serviceable point cluster is indicative of a geographic descriptor, and wherein the first serviceable point and the second serviceable point are associated with a common geographic descriptor. Moreover, in various embodiments, each serviceable point cluster is indicative of a street segment identifier, and wherein the first serviceable point and the second serviceable point are associated with a common street segment identifier. In certain embodiments, each serviceable point cluster comprises a plurality of serviceable points encompassed within a geofenced area, and wherein the first serviceable point and the second serviceable point are located within a common geofenced area. Moreover, in various embodiments, the first serviceable point and the second serviceable point are within (a) a configurable distance from one another, (b) a configurable time from one another, or (c) both. The delivery activity frequency occurring within the serviceable point cluster may be determined based at least in part on historical data indicative of the average number of deliveries made to serviceable points within the serviceable point cluster over a configurable time period. Moreover, in various embodiments, the configurable threshold is a maximum average number of deliveries made to serviceable points within the serviceable point cluster over the configurable time period. In certain embodiments, the delivery activity frequency occurring within the serviceable point cluster is determined based at least in part on historical data indicative of the average number of times a delivery vehicle traverses at least a portion of the serviceable point cluster over a configurable time period. Moreover, in various embodiments, the configurable threshold is a maximum average number of times a delivery vehicle traverses at least a portion of the serviceable point cluster over the configurable time period. Moreover, the first shipment may be transported by a first carrier and the second shipment may be transported by a second carrier.

Various embodiments are directed to a system for facilitating delivery of shipments, the system comprising: one or more memory storage areas; and one or more computer processors. In various embodiments, the one or more computer processors are collective configured to store, in the one or more memory storage areas, serviceable point data for each of a plurality of serviceable points, the serviceable point data for each serviceable point comprising data identifying a serviceable point cluster; receive first electronic shipping data indicating that a first shipment is to be delivered to a first serviceable point associated with a particular serviceable point cluster; and responsive to receiving the first electronic shipping data indicating that the first shipment is to be delivered to the first serviceable point, determine whether a second shipment to be delivered to a second serviceable point associated with the particular serviceable point cluster is available for synchronized delivery with the first shipment; wherein determining whether deliveries to the second serviceable point are available for synchronized delivery with shipments to be delivered to the first serviceable point is determined at least in part by: identifying a delivery activity frequency occurring within the serviceable point cluster; and determining whether the delivery activity frequency occurring within the serviceable point cluster satisfies a configurable frequency threshold; and responsive to determining that the delivery activity frequency occurring within the serviceable point cluster satisfies the configurable frequency threshold, provide an indication that the first shipment and the second shipment are available for synchronized delivery.

In various embodiments, each serviceable point cluster is indicative of a geographic descriptor, and wherein the first serviceable point and the second serviceable point are associated with a common geographic descriptor. Moreover, in various embodiments, each serviceable point cluster is indicative of a street segment identifier, and wherein the first serviceable point and the second serviceable point are associated with a common street segment identifier. In certain embodiments, each serviceable point cluster comprises a plurality of serviceable points encompassed within a geofenced area, and wherein the first serviceable point and the second serviceable point are located within a common geofenced area. Moreover, in various embodiments, the first serviceable point and the second serviceable point are within (a) a configurable distance from one another, (b) a configurable time from one another, or (c) both. The delivery activity frequency occurring within the serviceable point cluster may be determined based at least in part on historical data indicative of the average number of deliveries made to serviceable points within the serviceable point cluster over a configurable time period. Moreover, in various embodiments, the configurable threshold is a maximum average number of deliveries made to serviceable points within the serviceable point cluster over the configurable time period. In certain embodiments, the delivery activity frequency occurring within the serviceable point cluster is determined based at least in part on historical data indicative of the average number of times a delivery vehicle traverses at least a portion of the serviceable point cluster over a configurable time period. Moreover, in various embodiments, the configurable threshold is a maximum average number of times a delivery vehicle traverses at least a portion of the serviceable point cluster over the configurable time period. Moreover, the first shipment may be transported by a first carrier and the second shipment may be transported by a second carrier.

Various embodiments are directed to a computer program product comprising at least one non-transitory computer-readable storage medium having computer-readable program code portions stored therein, the computer-readable program code portions comprising: an executable portion configured to store serviceable point data for each of a plurality of serviceable points, the serviceable point data for each serviceable point comprising data identifying a serviceable point cluster; an executable portion configured to receive first electronic shipping data indicating that a first shipment is to be delivered to a first serviceable point associated with a particular serviceable point cluster; and an executable portion configured to, responsive to receiving the first electronic shipping data indicating that the first shipment is to be delivered to the first serviceable point, determine whether a second shipment to be delivered to a second serviceable point associated with the particular serviceable point cluster is available for synchronized delivery with the first shipment; wherein determining whether deliveries to the second serviceable point are available for synchronized delivery with shipments to be delivered to the first serviceable point is determined at least in part by: identifying a delivery activity frequency occurring within the serviceable point cluster; and determining whether the delivery activity frequency occurring within the serviceable point cluster satisfies a configurable frequency threshold; and an executable portion configured to, responsive to determining that the delivery activity frequency occurring within the serviceable point cluster satisfies the configurable frequency threshold, provide an indication that the first shipment and the second shipment are available for synchronized delivery.

In various embodiments, each serviceable point cluster is indicative of a geographic descriptor, and wherein the first serviceable point and the second serviceable point are associated with a common geographic descriptor. Moreover, in various embodiments, each serviceable point cluster is indicative of a street segment identifier, and wherein the first serviceable point and the second serviceable point are associated with a common street segment identifier. In certain embodiments, each serviceable point cluster comprises a plurality of serviceable points encompassed within a geofenced area, and wherein the first serviceable point and the second serviceable point are located within a common geofenced area. Moreover, in various embodiments, the first serviceable point and the second serviceable point are within (a) a configurable distance from one another, (b) a configurable time from one another, or (c) both. The delivery activity frequency occurring within the serviceable point cluster may be determined based at least in part on historical data indicative of the average number of deliveries made to serviceable points within the serviceable point cluster over a configurable time period. Moreover, in various embodiments, the configurable threshold is a maximum average number of deliveries made to serviceable points within the serviceable point cluster over the configurable time period. In certain embodiments, the delivery activity frequency occurring within the serviceable point cluster is determined based at least in part on historical data indicative of the average number of times a delivery vehicle traverses at least a portion of the serviceable point cluster over a configurable time period. Moreover, in various embodiments, the configurable threshold is a maximum average number of times a delivery vehicle traverses at least a portion of the serviceable point cluster over the configurable time period. Moreover, the first shipment may be transported by a first carrier and the second shipment may be transported by a second carrier.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a graphical representation of an example of a serviceable point profile in accordance with certain embodiments of the present invention;

FIG. 6 is a flow chart of an example method for identifying nearby addresses along a common street segment in accordance with certain embodiments of the present invention;

FIG. 9 is an example information/data set for determining serviceable point nearness determinations for various geotypes in accordance with certain embodiments of the present invention;

FIG. 12 is an example user interface illustrating customer preferences in accordance with certain embodiments of the present invention;

FIG. 13 is an example user interface illustrating shipment/item information/data in accordance with certain embodiments of the present invention;

FIG. 15 is a table illustrating the types of information/data that may be stored in a historic incentive database in accordance with certain embodiments of the present invention;

FIG. 16 is a table illustrating the types of information/data that may be stored in a dynamic incentive database in accordance with certain embodiments of the present invention;

DETAILED DESCRIPTION

Figure 1:
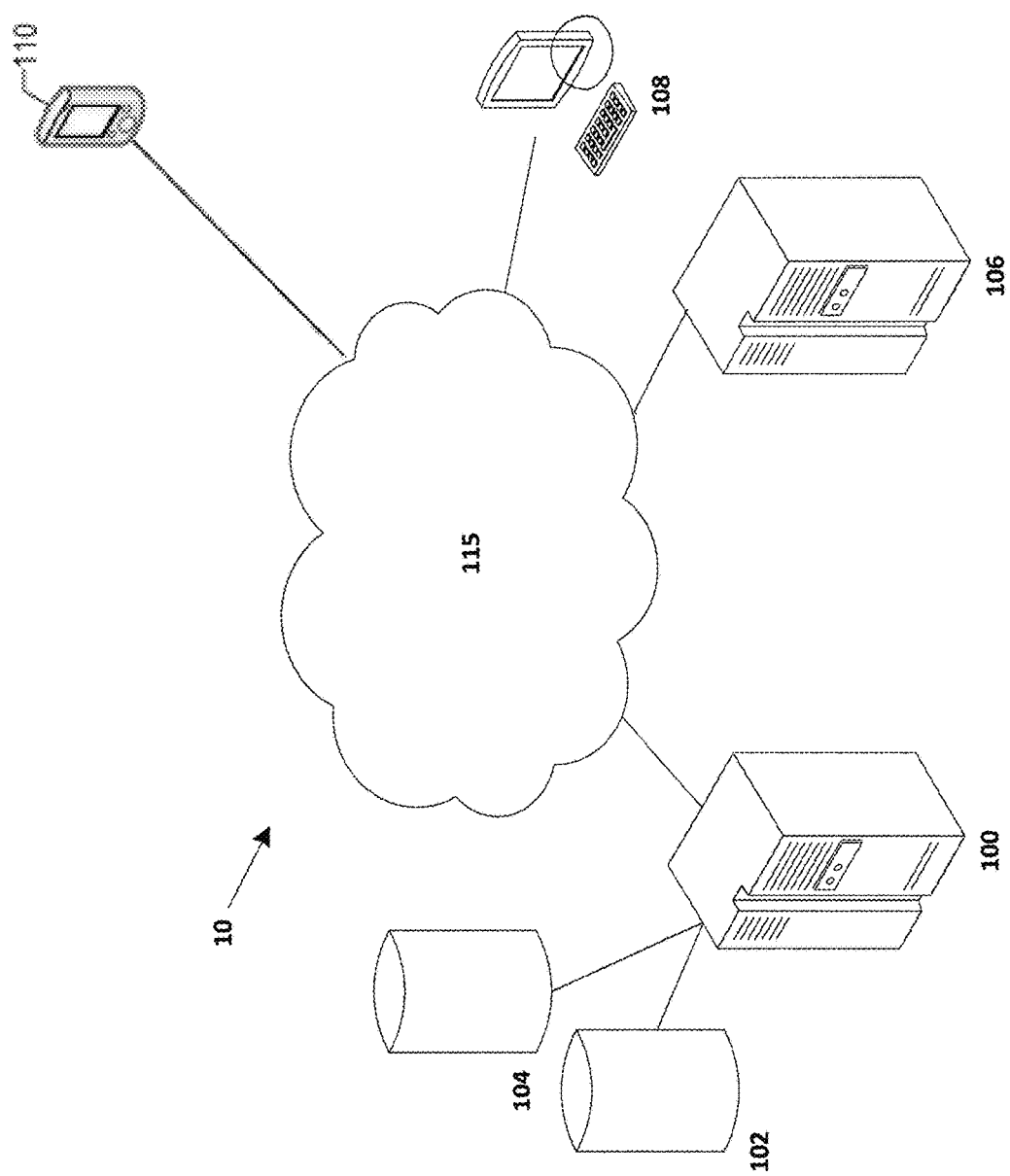
FIG. 1 is a schematic diagram of a system that may be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Generally, embodiments of the present invention provide systems and methods that propose indicators to shippers/consignors to facilitate efficient delivery of items. The indicator could be a price incentive, yes/no acceptance of a shipment, alternative service levels, delivery dates, hold for additional shipping density options and the like. The shippers/consignors may be merchants (online or brick-and-mortar), component suppliers, individuals or any other entity seeking to ship an item. To facilitate understanding, aspects of various embodiments of the present invention will be described in the context of an online merchant. However, it should be understood that concepts described herein could be used to facilitate synchronized delivery for any type of shipping entity or transport mode.

In various embodiments, an online merchant may receive an order and/or a cost inquiry from a customer (e.g., a consignee and/or a purchaser of an order shipped from the merchant) for the purchase and delivery of one or more items. As a result, the online merchant may need to determine a shipping cost for delivery of the item to the customer. In various embodiments, the online merchant may also use the shipping cost information received from multiple carriers to determine which carrier to use for the delivery. To determine the shipping costs, the online merchant may send the destination address and a promised delivery date or range of dates to a carrier and request an associated cost for the delivery. In some embodiments, different combinations of information/data may be sent such as service levels, weight of the shipment, size of the shipment, and the like. As will be recognized, a shipment/item may be a parcel or group of parcels, a shipment/item or group of shipments/items, a box, a crate, a drum, a box strapped to a pallet, and/or the like. The carrier may be a common carrier, a contract carrier or a private carrier.

In other embodiments, the online merchant may communicate with a third party as opposed to a carrier. The third party may then perform the various analyses describe herein with respect to the carrier.

In various embodiments, the carrier may analyze historical information/data related to some or all of the addresses serviced by the carrier to determine whether an incentive may be provided to encourage further deliveries to particular addresses. Characteristics of the address' delivery history considered in determining whether to provide an incentive may include the number of deliveries received by (or picked up from) the particular address or nearby addresses, the typical days of the delivery, the type of location (e.g., residential or commercial), scheduled pickups, whether signatures are typically required for delivery versus driver release, the number of claims, and/or the frequency of missed delivery events at the particular address. The incentives may be based at least in part on the probability that the new shipment/item can be synchronized with other deliveries to the same address or a nearby address. Other considerations may include characteristics of the shipper/consignor and/or characteristics of the shipment/item itself (e.g., size, weight, number of shipments/items, special handling requirements, etc.).

In some embodiments, the carrier may analyze dynamic information/data relating to shipments/items that are forecasted (e.g., shipments/items with a forecasted delivery date, a scheduled shipment, a planned delivery) to be delivered to the address or nearby addresses. This information/data is sometimes referred to as shipment/item level detail ("PLD")

data, which may be updated as the shipment/item is received and transported through a carrier's network to a destination address. In various embodiments, the dynamic information/data includes information/data for forecasted shipments/items and may include a ship date, an origin address, destination address, service level, a forecasted delivery date, a unique identifier and exception information. Using this information, a carrier may determine whether the new shipment/item delivery (e.g., tagalong shipment) could be synchronized with one or more shipments/items already forecasted for delivery to the address or nearby addresses (e.g., stop creator shipment, which is the reason for the initial stop). If this is the case, the carrier may offer an incentive to the online merchant to provide the shipment/item according to certain criteria such that the deliveries of the tagalong shipment/item and the stop creator shipment(s) can be synchronized. This synchronization may reduce fuel consumed and carbon emissions versus a non-synchronized delivery. Furthermore, the customer's experience may also be enhanced because the customer can receive a single delivery with multiple shipments/items versus multiple shipments/items on possibly different days, at different times and/or by different carriers.

As noted, the carrier may communicate to the online merchant that a delivery incentive is available for the particular address. In various embodiments, the carrier may communicate an incentive for delivery according to a particular delivery date. Under this scenario, the online merchant could independently identify a fulfillment center and use time-in-transit information/data to calculate an actual tender date to the carrier. In various embodiments, the online merchant may receive the incentive if the deliveries were synchronized and/or the online merchant tenders the shipment/item with sufficient time to synchronize the shipments. In other embodiments, the carrier may provide a tender date (or range of dates) for one or more origin addresses (e.g., fulfillment centers or drop-ship locations). The proposed origin addresses could be based on proximity of one or more particular fulfillment centers to the destination address, routing parameters, time-in-transit, consignee alternative delivery locations, environmental considerations, sensor based information/data such as telematics information/data and the like. Under this scenario, the online merchant may receive the incentive if the shipment/item was tendered on a date identified by the carrier for the appropriate fulfillment center.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system architecture that can be used in conjunction with various embodiments of the present invention. The system 10 of FIG. 1 may comprise one or more carrier servers 100, one or more historical information/data repositories 102, one or more PLD information/data repositories 104, one or more online merchant servers 106, one or more networks 115, and/or one or more customer computing devices 108. Each of the components of the system 10 may be in electronic communication with (directly or indirectly), for example, one another over the same or different wireless or wired networks including, for example, a wired or wireless Personal Area Network (PAN), Local Area Network (LAN), Metropolitan Area Network (MAN), Wide Area Network (WAN), cellular network, or the like.

It should be noted that other system architectures are contemplated that may be used to practice various aspects of the invention. Thus, the system architecture provided in FIG. 1 is for illustrative purposes only and should not be construed to limit the scope of the invention. Further, while FIG. 1 illustrates certain system entities as separate, standalone entities, the various embodiments are not limited to this particular architecture.

a. Exemplary Carrier Server

Figure 2:
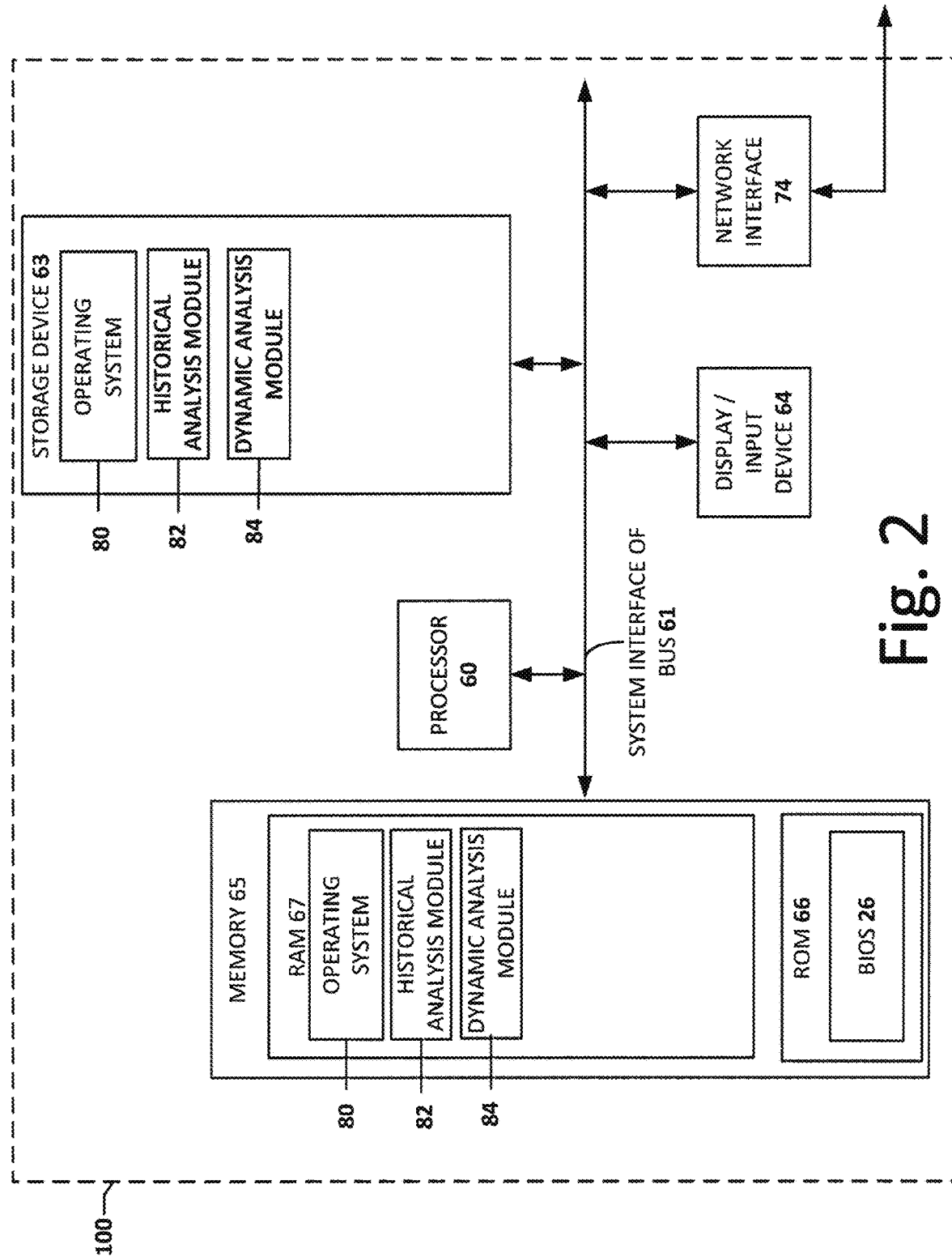
FIG. 2 is a schematic diagram of a carrier server in accordance with certain embodiments of the present invention.

FIG. 2 provides a schematic of a carrier server 100 according to one embodiment of the present invention. In general, the term "server" may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. As will be understood from this figure, in one embodiment, the carrier server 100 may include a processor 60 that communicates with other elements within the carrier server 100 via a system interface or bus 61. The processor 60 may be embodied in a number of different ways. For example, the processor 60 may be embodied as one or more processing elements, one or more microprocessors with accompanying digital signal processors, one or more processors without accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention when configured accordingly. A display device/input device 64 for receiving and displaying information/data may also be included in or associated with the carrier server 100. The display device/input device 64 may be, for example, a keyboard or pointing device that is used in combination with a monitor. The carrier server 100 may further include transitory and non-transitory memory 65, which may include both random access memory (RAM) 67 and read only memory (ROM) 66. The carrier server's ROM 66 may be used to store a basic input/output system (BIOS) 26 containing the basic routines that help to transfer information to the different elements within the carrier server 100.

In addition, in one embodiment, the carrier server 100 may include at least one storage device 63, such as a hard disk drive, a CD drive, a DVD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 63 may be connected to the system bus 61 by an appropriate interface.

Furthermore, a number of executable instructions, applications, scripts, program modules, and/or the like may be stored by the various storage devices 63 and/or within RAM 67. Such executable instructions, applications, scripts, program modules, and/or the like may include an operating system 80, a historical analysis module 82 and a dynamic analysis module 84. As discussed in greater detail below, the historical analysis module 82 and the dynamic analysis module 84 may control certain aspects of the operation of the carrier server 100 with the assistance of the processor 60 and operating system 80, although its functionality need not be modularized. In addition to the program modules, the carrier server 100 may store and/or be in communication with one or more databases.

Also located within and/or associated with the carrier server 100, in one embodiment, is a network interface 74 for interfacing with various computing entities. This communication may be via the same or different wired or wireless networks (or a combination of wired and wireless networks), as discussed above. For instance, the communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), and/or any other wired transmission protocol. Similarly, the carrier server 100 may be configured to communicate via wireless external communication networks using any of a variety of protocols, such as 802.11, GSM, EDGE, GPRS, UMTS, CDMA2000, WCDMA, TD-SCDMA, LTE, E-UTRAN, Wi-Fi, WiMAX, UWB, NAMPS, TACS and/or any other wireless protocol.

It will be appreciated that one or more of the carrier server's 100 components may be located remotely from other carrier server 100 components. Furthermore, one or more of the components may be combined and additional components performing functions described herein may be included in the carrier server 100. It should be noted that the one or more of the carrier servers 100 may be operated by a carrier, a third party or certain tasks may be performed by carrier servers operated by the carrier while other tasks are performed by carrier servers operated by a third party.

b. Exemplary Customer Computing Device

The customer computing devices 108 may each include one or more components that are functionally similar to those of the carrier server 100. For example, in one embodiment, each of the customer computing devices may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments. The term "computing device" is used generically to refer to any computer, computing device, desktop, notebook computer, laptop computer, distributed system, carrier system, gateway, switch, or other processing device adapted to perform the functions described herein.

c. Exemplary Online Merchant Server

Various embodiments may include an online merchant server that provides an order processing system (e.g., retail website, online catalog, online store front, etc.) The components of the online merchant server may include one or more components that are functionally similar to those of the carrier server 100. For example, in one embodiment, each of the customer computing devices may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments. The term "server" is used generically to refer to any computer, computing device, desktop, notebook or laptop, distributed system, carrier system, gateway, switch, or other processing device adapted to perform the functions described herein.

d. Exemplary Mobile Device

The mobile device 110 may each include one or more components that are functionally similar to those of the carrier server 100. For example, in one embodiment, each of the mobile devices may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments. The terms "device" and "computing device" are used in this regard generically to refer to any computer, computing device, desktop, notebook computer, laptop computer, distributed system, carrier system, gateway, switch, or other processing device adapted to perform the functions described herein.

e. Exemplary Serviceable Points

In one embodiment, a serviceable point, serviceable point addresses, and/or similar words used herein interchangeably may be any identifiable location, such as one or more physical addresses, lockers, access points, delivery locations, parking locations, sidewalks, highways, trails, alleys, paths, walkways, streets, street segments, entrance or exit ramps, roads, longitude and latitude points, geocodes, zip codes, area codes, cities, counties, states, provinces, countries, stops (e.g., pick up stops, delivery stops, vehicle visits, stops) geofenced areas, geographic areas, landmarks, buildings, bridges, and/or other identifiable locations. For example, a serviceable point may be a residential location, such as one or more homes, one or more mobile homes, one or more apartments, one or more apartment buildings, one or more condominiums, one or more townhomes, one or more points at such locations, and/or the like. The serviceable point may also be any specific location at a residential location (e.g., front door of a residence, side door of a residence, and/or the like). A serviceable point may also be a commercial location, such as one or more stores in a mall, one or more office buildings, one or more office parks, one or more offices of an apartment complex, one or more garages, one or more lockers or access points, one or more warehouses, one or more restaurants, one or more stores, one or more retail locations, one or more points at such locations, and/or the like. The serviceable point may also be any specific location at a commercial location, e.g., (e.g., front door of a commercial location, dock of a commercial location, and/or the like). A serviceable point may be one or more streets, one or more street segments, one or more zones, one or more areas, one or more latitude and/or longitude points (e.g., 33.7869128,−84.3875602), one or more geocodes, and/or the like. A serviceable point may be any identifiable location. As will be recognized, a variety of approaches and techniques can be used to adapt to various needs and circumstances.

In certain embodiments, serviceable points can be represented digitally in geographical maps as map information/data. Map information/data may include boundary, location, and attribute information/data corresponding to the map elements. As will be recognized, the map information/data can be stored using a variety of formats, layers, and/or the like—including shapefiles, ArcMaps, geodatabases, coverages, imagery, rasters, computer-aided drafting (CAD) files, other storage formats, and/or the like. For instance, an appropriate computing entity may store/record map information/data as a part of a digital map, e.g., as part of a feature layer, raster layer, service layer, icons/graphics layer, geoprocessing layer, basemap layer, satellite layer, street network layer, points of interest layer, serviceable point layer, and/or the like. The term digital map is intended to include any map that can electronically display geographic areas.

As will be recognized, serviceable points need not correspond to one or more addresses. For instance, a serviceable point can be a geocode, such as a longitude and latitude (e.g., the recorded location of a vehicle stop). The term geocode encompasses one or more latitudes, longitudes, altitudes, headings or directions, and/or other location information/data. Further, serviceable points can be represented in digital maps as being accessible by one or more street networks or street segments of a street network. A "street network" is collection of street segments that comprise navigable, traversable, travelable, and/or similar words used herein interchangeably roads, streets, highways, paths, trails, walkways, entrance and exit ramps, bridges, sidewalks, alleys, and/or the like that can be used to access serviceable points. Similarly, map elements, street networks, and/or the like can be represented in digital maps as navigable/traversable/travelable segments or points for traveling to and/or from serviceable points.

In one embodiment, a particular serviceable point may be the average or mean of one or more geocode samples collected (e.g., longitude and latitude information/data) for a single serviceable point for a serviceable address, such as the average of multiple known parking points or the average of multiple known front door points. In another embodiment, a particular serviceable point may be the average or mean of one or more geocode samples collected (e.g., longitude and latitude information/data) for multiple serviceable points for the serviceable address, such as the average of multiple known parking points combined with multiple known front door points or the average of all known serviceable points. As will be recognized, a variety of approaches and techniques can be used to determine and use serviceable address references points and their corresponding reference geocodes to adapt to various needs and circumstances.

In one embodiment, an appropriate computing entity can store information/data associated with each map element in an object or other information/data structure. The object or information/data structure may comprise a variety of information/data associated with each map element, such as a consignee/recipient name, pickup or delivery identifier, street name, street number, street prefix, street suffix, street type, city, state, province, territory, country, postal code, residential or commercial indicator, street classification, directionals (e.g., one way <specific to which way> or both ways), longitude and latitude, geocode, location identifier, and/or the like. Similarly, the appropriate computing entity can store information/data associated with each street segment of the street network in an object or other information/data structure. The object or information/data structure may comprise a variety of information/data associated with each street segment, such as a street segment identifier, street name, street number range, street prefix, street suffix, street type, city, state, province, territory, country, postal code, street classification, directionals (e.g., one way <specific to which way> or both ways), longitude and latitude points defining the street segment, speed limits of one or more portions of the street segment, and/or the like. For example, in one embodiment, a map element may be represented by and/or associated with a longitude and latitude, a geocode, a nearest street segment, an address, and/or the like. Similarly, street segments of street networks may be represented by or associated with a street name, a segment identifier, a connecting node, an address or address range, a series of longitude and latitude coordinates, and/or the like that define the overall shape and location of the street segment. As will be recognized, a variety of other approaches and techniques can be used to adapt to various needs and circumstances.

In one embodiment, the appropriate computing entity may store digital maps. In another embodiment, the mapping/routing computing may be in communication with or associated with one or more mapping websites/servers/providers/databases (including providers such as maps.google.com, bing.com/maps/, mapquest.com, Tele Atlas®, NAVTEQ®, and/or the like) that provide map information/data of digital maps to a variety of users and/or entities. Using the digital maps, an appropriate computing entity can provide map information/data, for example, about map elements (e.g., their locations, attributes, and/or the like) and/or their corresponding street networks based on map information/data. An appropriate computing entity (e.g., the carrier servers 100 or the one or more mapping websites/servers/providers/databases) can also provide map information/data, for example, about the geographic areas, regions, groupings, routes, paths, regions, and/or similar words used herein interchangeably about the different locations on the street networks. For instance, the map information/data may include a route for delivering one or more items to different locations, the most efficient order for delivering items to the locations, directions for traveling to and/or from the serviceable points, the estimated distance for traveling to and/or from the serviceable points, the expected time for traveling to and/or from the serviceable points, and/or the like. The map information/data may also include other information/data about map elements and/or traveling to and from serviceable points, such as current estimated speeds for associated street segments, historical speeds for associated street segments, nearest street segments, posted speed limits for associated street segments, interpolated locations of serviceable points, reverse geocoded locations of serviceable points, latitude and longitude points of serviceable points, distances between various locations, directions, stop orders, and/or the like.

In one embodiment, the appropriate computing entity can identify, retrieve, determine, and/or similar words used herein interchangeably map information/data associated with serviceable points, map elements, street networks, routes, paths, and/or the like. For example, the carrier server 100 can identify the map elements by address, address portions (e.g., street number, street name, type, and/or the like), latitude and longitude points, routes, paths, geographic areas, location identifiers, and/or the like. Table 1 below shows a textual view of eighteen map elements, each associated with a route, a stop, an address, a city, a state, a longitude and latitude, and/or the like.

TABLE 1

| Route: Stop | Address | City | State |
| --- | --- | --- | --- |
| 10A: S1 | 1 STREET ADDRESS | ANYTOWN | GEORGIA |
| 10A: S2 | 2 STREET ADDRESS | ANYTOWN | GEORGIA |
| 10A: S3 | 3 STREET ADDRESS | ANYTOWN | GEORGIA |
| 10A: S4 | 4 STREET ADDRESS | ANYTOWN | GEORGIA |
| 10A: S6 | 5 STREET ADDRESS | ANYTOWN | GEORGIA |
| 10A: S6 | 6 STREET ADDRESS | ANYTOWN | GEORGIA |
| 11C: S1 | 7 STREET ADDRESS | ANYTOWN | GEORGIA |
| 11C: S2 | 8 STREET ADDRESS | ANYTOWN | GEORGIA |
| 11C: S3 | 9 STREET ADDRESS | ANYTOWN | GEORGIA |
| 11C: S4 | 10 STREET ADDRESS | ANYTOWN | GEORGIA |
| 11C: S6 | 11 STREET ADDRESS | ANYTOWN | GEORGIA |
| 11C: S6 | 12 STREET ADDRESS | ANYTOWN | GEORGIA |
| 13B: S1 | 13 STREET ADDRESS | ANYTOWN | GEORGIA |
| 13B: S2 | 14 STREET ADDRESS | ANYTOWN | GEORGIA |
| 13B: S3 | 15 STREET ADDRESS | ANYTOWN | GEORGIA |
| 13B: S4 | 16 STREET ADDRESS | ANYTOWN | GEORGIA |
| 13B: S6 | 17 STREET ADDRESS | ANYTOWN | GEORGIA |
| 13B: S6 | 18 STREET ADDRESS | ANYTOWN | GEORGIA |

The appropriate computing entity can also identify the interpolated or reverse geocoded locations on the street networks for one or more of the locations, for instance. And, the carrier server 100 can reverse geocode the latitude and longitude points of the locations if available, such as the location of 1 Street Address, Anytown, GA being located at 33.7869128, −84.3875602. As will be recognized, a variety of other techniques and approaches can be used to adapt to various needs and circumstances.

f. Exemplary Shipment/Item

In one embodiment, a shipment/item may be any tangible and/or physical object. In one embodiment, an shipment/item may be or be enclosed in one or more packages, envelopes, parcels, bags, goods, products, containers, loads, crates, items banded together, vehicle parts, pallets, drums, the like, and/or similar words used herein interchangeably. In one embodiment, each shipment/item may include and/or be associated with an item/shipment identifier, such as an alphanumeric identifier. Such item/shipment identifiers may be represented as text, barcodes, tags, character strings, Aztec Codes, MaxiCodes, information/data Matrices, Quick Response (QR) Codes, electronic representations, and/or the like. A unique item/shipment identifier (e.g., 123456789) may be used by the carrier to identify and track the shipment/item as it moves through the carrier's transportation network. Further, such item/shipment identifiers can be affixed to shipments/items by, for example, using a sticker (e.g., label) with the unique item/shipment identifier printed thereon (in human and/or machine readable form) or an RFID tag with the unique item/shipment identifier stored therein. Such items may be referred to as "connected" shipments/items and/or "non-connected" shipments/items.

In one embodiment, connected shipments/items include the ability to determine their locations and/or communicate with various computing entities. This may include the shipment/item being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected shipments/items may include one or more components that are functionally similar to those of the carrier server 100 and/or the mobile device 110 as described herein. For example, in one embodiment, each connected shipment/item may include one or more processing elements, one or more display device/input devices (e.g., including user interfaces), volatile and non-volatile storage or memory, and/or one or more communications interfaces. In this regard, in some example embodiments, an shipment/item may communicate send "to" address information/data, received "from" address information/data, unique identifier codes, location information/data, status information/data, and/or various other information/data.

In one embodiment, non-connected shipments/items do not typically include the ability to determine their locations and/or might not be able communicate with various computing entities or are not designated to do so by the carrier. The location of non-connected shipments/items can be determined with the aid of other appropriate computing entities. For example, non-connected shipments/items can be scanned (e.g., affixed barcodes, RFID tags, and/or the like) or have the containers or vehicles in which they are located scanned or located. As will be recognized, an actual scan or location determination of a shipment/item is not necessarily required to determine the location of a shipment/item. That is, a scanning operation might not actually be performed on a label affixed directly to a shipment/item or location determination might not be made specifically for or by a shipment/item. For example, a label on a larger container housing many shipments/items can be scanned, and by association, the location of the shipments/items housed within the container are considered to be located in the container at the scanned location. Similarly, the location of a vehicle transporting many shipments/items can be determined, and by association, the location of the shipments/items being transported by the vehicle are considered to be located in the vehicle 100 at the determined location. These can be referred to as "logical" scans/determinations or "virtual" scans/determinations. Thus, the location of the shipments/items is based on the assumption they are within the container or vehicle, despite the fact that one or more of such shipments/items might not actually be there.

III. Exemplary System Operation

Various embodiments provide systems and methods for facilitating synchronized delivery of shipments/items in coordination the same or nearby serviceable points. In this way, a more efficient delivery of the shipment/item may be achieved. Synchronized delivery may be coordinated entirely by a single entity (e.g., by a carrier, via the carrier server 100), or it may be coordinated by multiple entities, such as a carrier and a shipper, a carrier and a consignee, and/or a carrier, a shipper, and a consignee. The carrier may provide encouragement or incentives to one or more entities to facilitate synchronized delivery or may simply effect synchronized pick-ups, deliveries, visits, and/or the like for network optimization. The encouragement or incentive may be in the form of a decrease in shipping cost for the particular shipment, a general shipping discount for selecting a threshold number of incentivized shipments, or some other incentive schedule. In some embodiments, the incentives may not be financially based and instead may be reductions in emissions, fuel consumption, improved customer experience (e.g., multiple deliveries at the same time versus separate deliveries) and the like. Of course, any combination of incentives may be provided both financial and otherwise.

As noted, the improved efficiency may be facilitated by synchronizing the delivery of new shipments/items (e.g., tagalong shipments) with shipments/items already en route to or near the destination serviceable point of the new shipment/item (e.g., stop creator shipments). In some embodiments, incentives are provided to encourage delivery to or near serviceable points for which shipments/items may not have been received but that historically receive shipments/items at a threshold frequency. Thus, the carrier may anticipate receiving shipments/items for the new shipment's destination serviceable point or serviceable points nearby and in turn provide incentives base on the probability of synchronized shipments. A nearby serviceable point may be a serviceable point within a certain distance threshold and/or have some other similarities with the provided address such as being on the same street, same neighborhood, same building, along the dispatched route, or the like. Nearby serviceable points may be identified according to any of a variety of methodologies. Examples of such methodologies are described in greater detail herein. Other characteristics of the shipment/item may also be used to incentivize a delivery, deny an incentive or alter an incentive for a particular shipment/item such as routing parameters (e.g., lane densities, telematics data), consignee or shipper/consignor reputation, parking availability, cost of the delivery, safety concerns, carbon footprint, security, and the like. Thresholds may be assigned for the various characteristics to determine whether an incentive is available. Additionally, characteristics may be combined in any fashion to arrive at an incentive.

In various embodiments, the one or more carrier servers 100 analyzes information regarding some or all of the serviceable points serviced by the carrier to determine if an incentive should be provide for the particular serviceable point and under what conditions. In some embodiments, the analysis focuses on historical information/data associated with the serviceable point to ascertain characteristics of past deliveries to that serviceable point and/or nearby serviceable points to determine whether delivery to that serviceable point should be encouraged by an incentive. In other embodiments, dynamic information/data regarding shipments/items forecasted for delivery (e.g., shipments/items with a forecasted delivery date, scheduled shipment) to serviceable points served by the carrier may be analyzed to determine if further deliveries to particular serviceable points should be incentivized. The incentive determinations, whether based on historical data, dynamic information/data or a combination of historical and dynamic data, may relate to the ability to synchronize the delivery of a new shipment/item (e.g., tagalong shipment) with a shipment(s) anticipated or already forecasted for delivery to a particular serviceable point or nearby serviceable point (e.g., stop creator shipment(s)).

As noted, synchronized delivery may be provided without any specific interaction by a shipper/consignor and/or a recipient/consignee of a shipment/item, and thus incentives need not be provided by a carrier in order to provide synchronized delivery. Synchronized delivery may accordingly be provided for one or more shipments/items by determining whether the shipment/item is eligible for synchronized delivery, and upon a determination that the shipment/item is eligible for synchronized delivery modifying the delivery schedule for the shipment/item such that the shipment/item is delivered according to a synchronized delivery schedule. In various embodiments, a determination of whether a particular shipment/item is eligible for synchronized delivery may utilize the same and/or similar criteria as determining whether an incentive may be offered for a particular shipment/item.

a. Establishing a Serviceable Point Profile/Record

As noted above, the one or more carrier servers 100 analyze information regarding some or all of the serviceable points serviced by the carrier to determine whether synchronized delivery services are available for the particular serviceable point, and/or whether a particular shipment/item is eligible for synchronized visit (e.g., delivery, pick-up, and/or the like), and under what conditions. The determination of whether synchronized delivery is available for the particular serviceable point and/or whether a particular shipment/item is eligible for synchronized visit (e.g., delivery, pick-up, and/or the like) may be based at least in part on whether any stop creator shipments/items are en route to the same or nearby serviceable points. Accordingly, information/data identifying nearby serviceable points for each serviceable point may be stored in a serviceable point profile, record, cluster, grouping, and/or similar words used herein interchangeably corresponding to each serviceable point comprising information/data as illustrated in FIG. 3.

In various embodiments, a serviceable point profile corresponding to each of one or more (e.g., all) serviceable points serviced by the carrier may be created and stored in a serviceable point management database in electronic communication with the carrier servers 100. Each serviceable point profile stored within the serviceable point management database may comprise information/data identifying one or more preferred serviceable point indicators (e.g., delivery address indicators indicative of a physical address associated with the serviceable point) for the corresponding serviceable point, as well as information/data indicating possible alternative serviceable point indicators for the corresponding serviceable point, as shown in FIG. 3. Moreover, in various embodiments, each serviceable point profile additionally comprises a geocode for each of the plurality of serviceable points. Such data, including the information/data indicating the preferred serviceable point indicators and/or the alternative serviceable point indicators, may be utilized by the carrier servers 100 to match a particular serviceable point indicator provided on a shipment/item received by the carrier to one or more appropriate serviceable point profiles.

Moreover, as illustrated in FIG. 3, each serviceable point profile may comprise information/data indicating one or more nearby serviceable points that may be utilized to determine whether a particular shipment/item is eligible for synchronized delivery. The nearby serviceable points to be associated with a particular serviceable point profile may be identified based at least in part on historical, real-time, and/or predictive information/data (e.g., historical information/data indicative of the distance between addresses and/or the elapsed time between deliveries to multiple addresses). The methodology for identifying nearby serviceable points are described in greater detail herein. In various embodiments, upon receipt of information/data indicating that a shipment/item is scheduled to be delivered to a particular destination serviceable point, the one or more carrier servers 100 may be configured to determine whether any stop creator shipments/items are scheduled to be (e.g., based on shipment/item information/data about shipments/items in the carriers' transportation and logistics network) or expected to be (e.g., based on historical data) delivered to any of the nearby serviceable points identified in a serviceable point profile corresponding to the particular destination serviceable point. Accordingly, the one or more carrier servers 100 may first identify the corresponding serviceable point profile (e.g., stored within the one or more serviceable point management databases) for the particular destination serviceable point. In various embodiments, identifying an appropriate serviceable point profile for a particular shipment/item may comprise steps for obtaining information/data indicative of a destination for a shipment/item (e.g., by querying a shipment/item level detail database, by scanning an indicia on the package, and/or by receiving user input). Upon identifying the destination for the shipment/item, the serviceable point management database may be queried to identify a serviceable point profile corresponding to the destination of the shipment/item.

The one or more carrier servers 100 may then retrieve information/data indicative of one or more nearby addresses stored in association with the serviceable point profile corresponding to the particular destination serviceable point, and may determine whether any stop creator shipments/items are scheduled (e.g., en route) to be delivered to one or more of the nearby serviceable points. For example, the one or more carrier servers 100 may query one or more shipment/item level detail databases storing information/data corresponding to scheduled shipments/items to determine whether any stop creator shipments/items are scheduled to be delivered to any of the nearby serviceable points. Referring again to FIG. 3, upon identifying the serviceable point profile corresponding to a shipment/item to be delivered to 100 Main Street, Atlanta, Ga. 30309, the one or more carrier servers 100 may be configured to search (e.g., query a shipment/item level detail database) for stop creator shipments scheduled to be delivered to one or more of 99 Main Street, 101 Main Street, 102 Main Street, and/or 105 First Avenue.

As yet another example, the serviceable point profile corresponding to the particular destination serviceable point may indicate whether any stop creator shipments/items are scheduled to be delivered to one or more of the identified nearby serviceable points. For example, the serviceable point management database may be updated (e.g., continuously, periodically, and/or the like) with dynamic information/data indicative of shipments/items scheduled to be delivered to nearby serviceable points. Referring to FIG. 3, the serviceable point profile may comprise information/data indicating that a shipment/item is scheduled to be delivered to 99 Main Street on November 10.

Such inquiries may be limited based on the dates and/or times that other deliveries are scheduled to be delivered to the serviceable point or nearby serviceable points. As described herein, synchronized delivery may only be available if one or more stop creator shipments/items are scheduled to be delivered within a predefined period of time and/or a predefined date range of the scheduled delivery of an additional shipment/item. Accordingly, upon determining an estimated date and/or time of delivery of a shipment/item, the one or more carrier servers 100 may determine whether any stop creator shipments/items are scheduled to be delivered to the same or nearby serviceable points within a predefined time period before and/or after the estimated date and/or time of delivery of the shipment/item. For example, the carrier servers 100 may be configured to search for potential stop creator shipments/items scheduled to be delivered two days before, the day before, the day of, two days following, and/or the day following the estimated date of delivery of the shipment/item. In various embodiments, the length and/or size of the time window during which stop creator shipments/items may be utilized to synchronize delivery of a particular shipment/item may vary depending on characteristics of the shipment/item. For example, the carrier server 100 may be configured to determine an appropriate time window for permitting synchronized delivery for a particular shipment/item and to then search for potential stop creator shipments/items scheduled to be delivered to the same or nearby serviceable points that are scheduled to be delivered within the appropriate time window.

Moreover, in various embodiments, the particular destination serviceable point may be considered a nearby serviceable point in association with one or more serviceable point profiles corresponding to other serviceable points. Accordingly, upon receipt of information/data indicating that the shipment/item is scheduled to be delivered to the particular destination serviceable point, this information/data may be associated with the one or more other serviceable point profiles for which the particular destination serviceable point is considered a nearby serviceable point. Thus, the one or more carrier servers 100 may be configured to utilize the information/data indicative of the shipment/item scheduled to be delivered to the particular destination serviceable point in determining whether any incentives may be offered for shipments/items scheduled to be delivered to any of the other serviceable points.

b. Identifying Nearby Serviceable Points

As discussed herein, synchronized delivery may be available for multiple shipments/items to the same serviceable point or to nearby serviceable points (e.g., implemented by the carrier alone or by multiple entities). Synchronization of deliveries to the same serviceable point and/or nearby serviceable points may permit the carrier to reduce the number of delivery stops made by one or more carrier vehicles operated by a vehicle operator (e.g., by allowing the vehicle operator to deliver two or more shipments/items during a single delivery stop) and/or to reduce the distance driven by the one or more carrier vehicles in delivering the shipments/items (e.g., by synchronizing delivery of two or more shipments/items to a remote region, such that a carrier vehicle need only travel to the remote region once to make two or more deliveries). Accordingly, the amount of time and/or resources expended by the carrier in delivering shipments/items may be conserved by synchronizing delivery of a plurality of shipments, and accordingly the carrier may determine and offer one or more incentives (e.g., to shippers/consignors and/or consignees) to encourage synchronization of shipments.

As discussed herein, delivery of shipments/items scheduled to be delivered to nearby serviceable points may be synchronized by first identifying shipments/items scheduled to be delivered to nearby serviceable points, and then rescheduling delivery of one or more of the identified shipments/items such that delivery of at least a portion of the identified shipments/items occurs on the same day (e.g., along the same vehicle route). Deliveries scheduled to nearby serviceable points may be identified as deliveries occurring at a single car stop (e.g., deliveries to multiple serviceable points that may occur without the driver needing to move the delivery vehicle), along a single street, along a single street segment, on a nearby street and/or street segment, within a single proximity zone/area (e.g., bound by a geofence), having a common geographic descriptor/attribute (e.g., same neighborhood, same company, same campus, same apartment complex, and/or the like), and/or the like.

1. Synchronizing Delivery of Nearby Shipments/items to be Delivered within a Proximity Zone Shipments/items scheduled to be delivered within a single geographical area or proximity zone/area may be eligible for synchronized delivery to minimize the distance travelled by a delivery vehicle. As discussed herein, a proximity zone/area may be defined as an area within a defined geofence (e.g., defined based at least in part on user input and/or automatically). Accordingly, upon receiving a shipment/item to be delivered to a particular destination serviceable point, the carrier server 100 may be configured to search for and identify one or more stop creator shipments/items scheduled to be delivered to one or more serviceable points located within a proximity zone/area encompassing the destination serviceable point for the shipment/item. Upon identifying such a stop creator shipment, the carrier server 100 may be configured to update the shipment/item information/data for the shipment/item to facilitate synchronized delivery of the shipment/item with the stop-creator shipment/item and/or to contact the shipper/consignor of the shipment/item to indicate that the shipment/item may be eligible for an incentive if the shipper/consignor facilitates synchronized delivery. In various embodiments, the carrier server 100 modifies information/data indicative of an estimated delivery date for the shipment/item to correspond to the estimated delivery date of the stop creator shipment. Moreover, in various embodiments, the carrier server 100 may modify information/data indicative of a shipping service level such that the shipment/item is available for delivery on the same day as the stop creator shipment. For example, the carrier server 100 may be configured to expedite shipment (e.g., by upgrading a delivery service level for the shipment/item) and/or to hold the shipment/item at a particular location such that delivery of the particular shipment/item may be synchronized with the stop-creator shipment/item. As specific example, the carrier server 100 may modify the shipment/item information/data to reflect a changed service level from SurePost to Ground, from Ground to 2nd Day Air, from 2nd Day Air to Next Day Air, from 2nd Day Air to Ground, and/or the like. Thus, the delivery service level can be changed from a first delivery service level with which it was originally shipped to a second delivery service level (after the item has been shipped but) prior to the first delivery attempt of the item. In one embodiment, this may allow for the item to be delivered earlier or later than initially indicated (e.g., both date and time). In various embodiments, upon modifying the information/data indicative of a changed delivery service level, the carrier server 100 may be configured to generate a flag to be associated with the shipment/item information/data to identify those shipments/items having a changed delivery service level. Information/data indicative of this logical flag may be provided to carrier personnel interacting with the shipment/item (e.g., by displaying information on a display of a mobile device carried by the personnel after scanning or otherwise identifying the shipment/item. In various embodiments, modifying a service level of a shipment/item may require the application of a new label and/or other shipment identified onto the physical shipment/item, and accordingly the logical flag may comprise an indication that the new label or shipment identified should be applied to the shipment/item.

Figure 4:
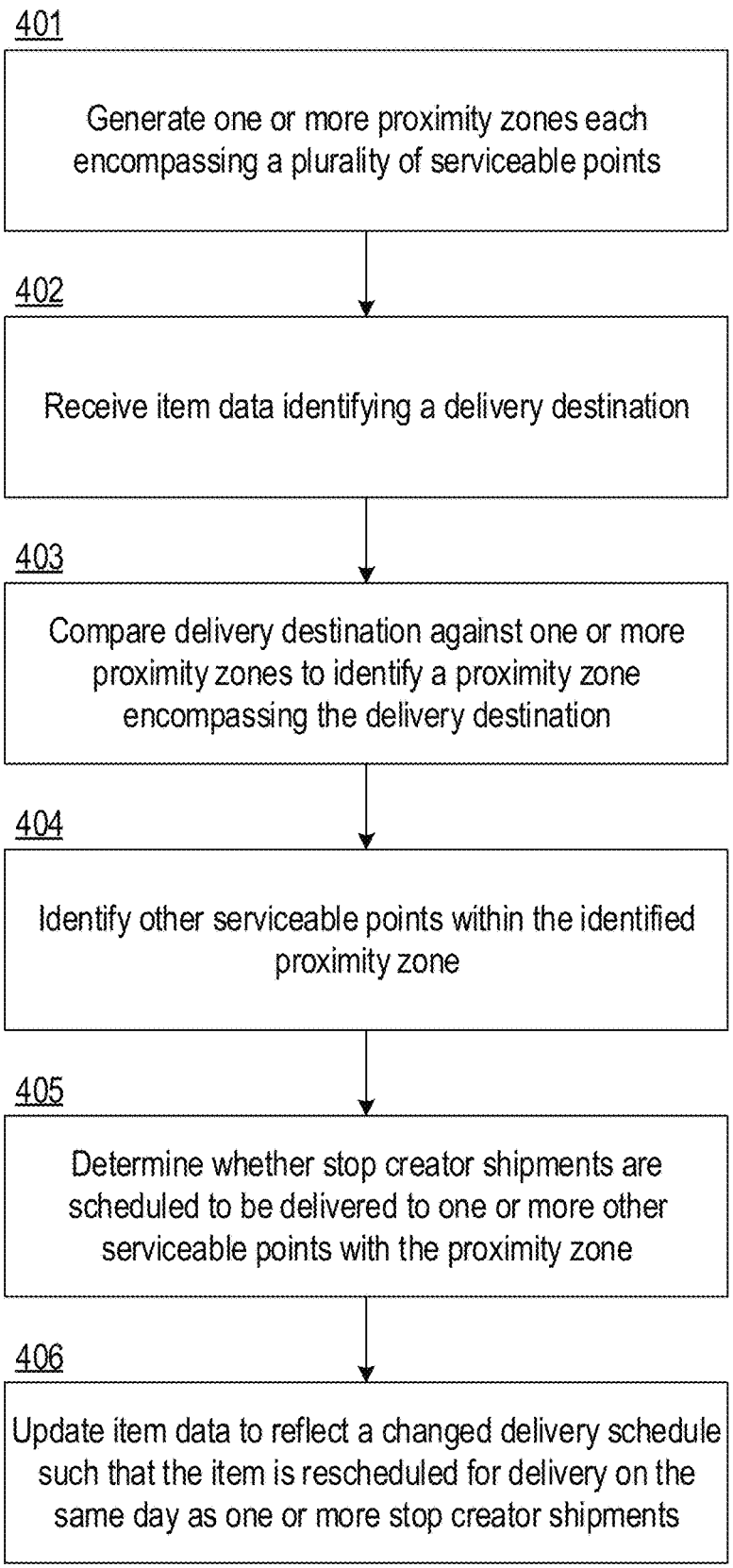
FIG. 4 is a flow chart of an example method for identifying nearby addresses within a common proximity zone/area in accordance with certain embodiments of the present invention.

FIG. 4 is a flow chart illustrating example steps for synchronizing delivery of shipments/items scheduled to be delivered to serviceable points within a common proximity zone. As illustrated in FIG. 4, the carrier server 100 may be configured to generate one or more proximity zones/areas encompassing a plurality of serviceable points at Block 401. In various embodiments, the proximity zones/areas may be defined relative to defined geofence boundaries (e.g., defined based at least in part on user input and/or automatically) and may collectively encompass the entirety of the delivery service area of the carrier, however in certain embodiments the proximity zones/areas may encompass only a subset of the delivery service area of the carrier. information/data indicative of the one or more proximity zones/areas, including information/data indicative of the serviceable points encompassed by the proximity zones/areas, and/or information/data indicative of the one or more geofence boundaries is stored, for example, in a database. Moreover, in various embodiments the proximity zones/areas may overlap, such that certain serviceable points may be encompassed by multiple proximity zones/areas. For example, serviceable points within a particular geographical area having a single entrance/ingress and exit/egress point may be clustered into a single proximity zone/area. Additional examples and discussion regarding the process for generating a proximity zone/area are provided herein.

After generating one or more proximity zones/areas, as represented at Block 402, the carrier server 100 receives shipment/item information/data corresponding to a particular shipment/item that is scheduled to be delivered to a destination serviceable point. In various embodiments, the shipment/item information/data at least identifies the destination serviceable point, and may additionally identify an estimated delivery date, a service level, and/or other information/data corresponding to the shipment/item. In various embodiments, in response to receiving shipment/item information/data corresponding to a particular shipment/item, the carrier server 100 may be configured to determine whether a stop creator shipment is to be delivered to a second serviceable point within the proximity zone/area. As indicated at Block 403, the carrier server 100 may then compare the destination serviceable points against the plurality of proximity zones/areas to identify one or more proximity zones/areas encompassing the destination serviceable points. Upon identifying one or more proximity zones/areas encompassing the destination serviceable point, the carrier server 100 retrieves information/data indicative of the identity of other serviceable points encompassed by the proximity zone/area from the database as indicated at Block 404. The serviceable points within the same proximity zone/area as the destination serviceable point may be considered nearby, such that shipments/items scheduled to be delivered to addresses within the same proximity zone/area may be eligible for synchronized delivery. As discussed herein, the carrier server 100 may be configured to identify nearby serviceable points within the same proximity zone/area in real time and/or after receiving information/data indicative of a shipment/item scheduled to be delivered to a particular destination serviceable point, or information/data indicative of nearby serviceable points, including those serviceable points within the same proximity zone/area as the destination serviceable point, may be stored in a serviceable point profile associated with the destination serviceable point. In the latter embodiments, the process indicated by Blocks 401-404 may be provided only once (and/or each time proximity zones/areas and/or serviceable points change) when initially populating information/data within the serviceable point profile database. However, in embodiments in which the identification of nearby addresses occurs each time shipment/item information/data is received, the entirety of the process indicated by FIG. 4 may be provided each time a shipment/item is received.

In various embodiments, the carrier server 100 may be configured to store data indicative of a plurality of serviceable points within a single proximity zone/area in association with one or more cluster profiles. Each cluster profile may be stored (e.g., in a database in communication with the carrier server 100) and may comprise data identifying those serviceable points within a common proximity zone. For example, all those serviceable points determined to be within a single proximity zone may be identified to be within a single cluster associated with a corresponding cluster profile. In such embodiments, upon receipt of shipping information corresponding to one or more shipments/items, the carrier server 100 may be configured to compare the destination serviceable point associated with the shipment/item against data stored in association with one or more cluster profiles to identify other serviceable points associated with a common cluster as the destination serviceable point. Upon identifying a cluster comprising the destination serviceable point, the carrier server 100 may identify other serviceable points associated with the cluster, and may determine whether stop creator shipments/items are scheduled to be delivered to these other serviceable points, as described herein.

Referring again to FIG. 4, upon identifying the serviceable points encompassed by the identified proximity zones/areas, the carrier server 100 determines whether stop creator shipments are scheduled to be delivered to any of the serviceable points located within the identified proximity zone/area, as indicated at Block 405. The carrier server 100 may review information/data stored in association with a serviceable point profile to determine whether stop creator shipments are scheduled to be delivered to nearby serviceable points (e.g., serviceable points within the identified proximity zone), and/or the carrier server 100 may review information/data stored in a shipment/item level detail database comprising information/data indicative of active and/or anticipated shipments/items, in order to identify potential stop creator shipments. In various embodiments, stop creator shipments may be identified as scheduled to be delivered to the same or nearby addresses as the shipment/item within a window of time relative to the initial estimated delivery date of the shipment item. For example, stop creator shipments may be identified as scheduled to be delivered less than or equal to 2 days before and/or 2 days after the estimated delivery date of the shipment/item.

Upon identifying one or more stop creator shipments scheduled to be delivered to nearby addresses within the same proximity zone/area, the carrier server 100 may be configured to facilitate synchronized delivery of the shipment/item with one or more of the stop creator shipments. As indicated at Block 406, the carrier server 100 may be configured to update shipment/item information/data corresponding to the shipment/item to reflect a new estimated delivery date corresponding to one or more of the stop creator shipments. In various embodiments, the carrier server 100 may determine that modifying the estimated delivery date of a shipment/item may additionally require modifying the service level for the shipment/item in order to ensure that the shipment/item is available for delivery on the same day as the one or more stop creator shipments. Accordingly, the carrier server 100 may be configured to modify the service level associated with the shipment/item in order to expedite or slow the transportation of the shipment/item from its origin to the destination serviceable point. As noted previously, modifying the service level associated with the shipment/item may additionally comprise modifying the shipment/item information/data to indicate the changed delivery service level. Moreover, as previously indicated, modifying the estimated delivery date and/or the service level associated with the shipment/item may additionally comprise generating a logical flag to be associated with the shipment/item information/data indicative of the changed delivery date and/or service level. As noted herein, the logical flags (or other indicia) stored in association with the shipment/item information/data may cause one or more computing devices (e.g., a handheld computing device) to generate an alert (e.g., an audible alert and/or a visual alert displayed via a graphical display) for carrier personnel indicative of the changed delivery date and/or service level, such that the personnel are made aware that the shipment/item has special and/or modified handling instructions. For example, upon the personnel scanning a shipment/item indicia located on the shipment/item with a handheld computing device, the handheld computing device may generate the alert to inform the personnel of modified handling instructions associated with the updated delivery date and/or service level.

In various embodiments, the proximity zone/area for a particular serviceable point can be based on the classification for the geographic area surrounding the serviceable point and be used to determine whether items/shipments/items are being or have been delivered to the appropriate serviceable point.

Figure 5:
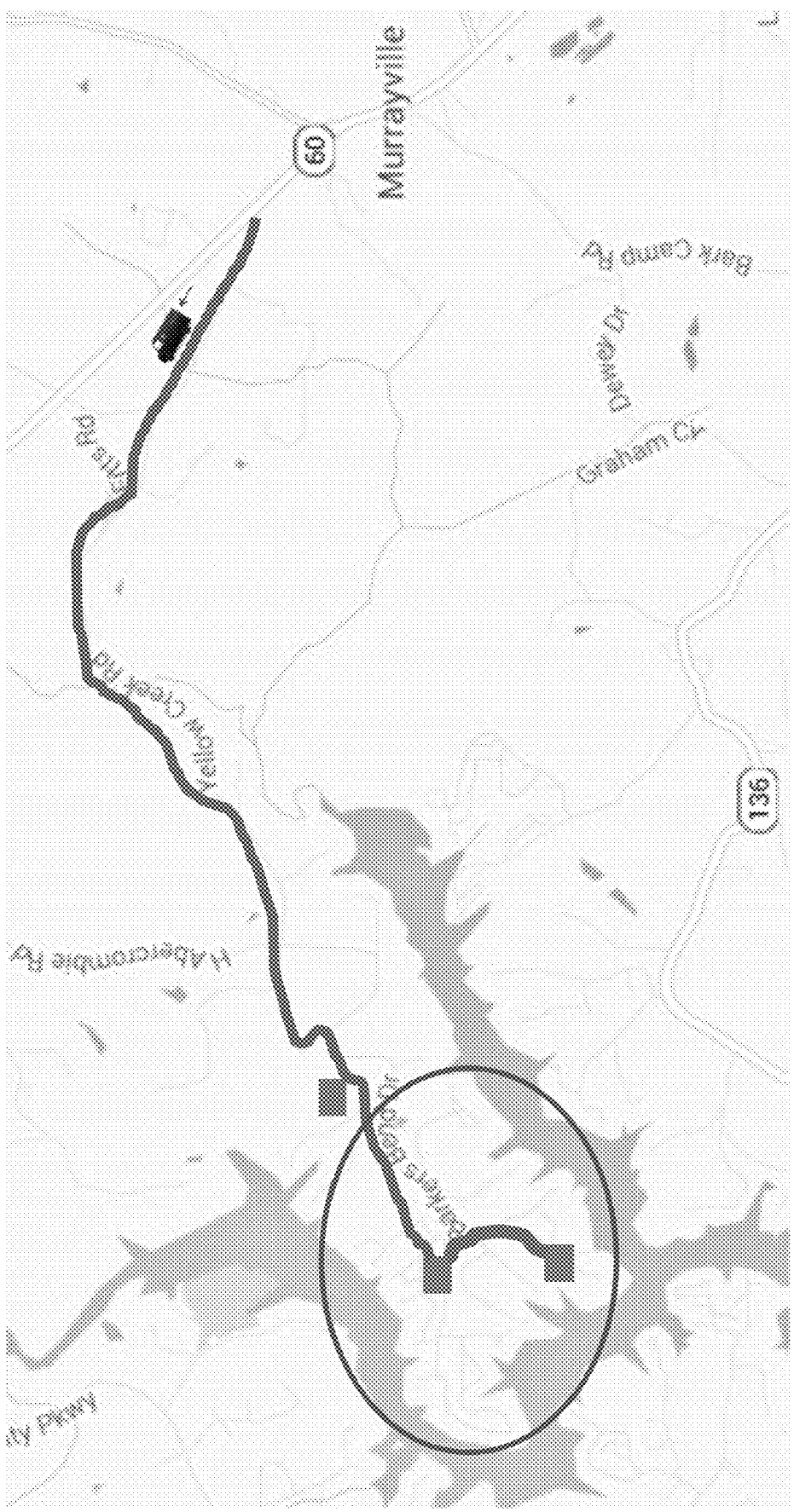
FIG. 5 is a graphical representation of a proximate area displayed on a graphical map in accordance with certain embodiments of the present invention.

As discussed herein, a proximity zone/area may be defined to encompass a geographical area comprising a plurality of serviceable points. FIG. 5 shows an example proximity zone/area defined around serviceable points located in a subdivision having only a single entrance/ingress and exit/egress point (e.g., street). Proximity zones/areas around serviceable points in a geographical area having a single entrance/ingress and exit/egress point may be identified by the carrier server 100 based on historical information/data indicative of historical delivery vehicle travel paths. As discussed herein, delivery vehicles may comprise a location determining device (e.g., a GPS device) configured to record and relay the paths traveled by the corresponding vehicle. This travel information/data may be stored in a database, and analyzed by the carrier server 100 in order to identify one or more clusters/groupings of serviceable points that may be grouped within a common proximity zone. In various embodiments, the travel information/data indicative of the vehicle travel path may not itself indicate that the vehicle traveled along one or more streets, however, the carrier server 100 may be configured to associate various segments of a vehicle travel path with one or more individual streets and/or street segments by identifying streets and/or street segments nearby (e.g., within a predetermined distance) of the determined locations of the vehicle as the vehicle travelled along the vehicle travel path. The carrier server 100 may thereby correlate the vehicle travel path to one or more street segments such that the vehicle travel path indicates the series of streets and/or street segments actually travelled by the delivery vehicle. By associating the vehicle travel path with one or more street segments, the carrier server 100 may identify periods of time in which the delivery vehicle traveled along a previously travelled street segment, for example, in a direction opposite the original travel segment along that same street segment. For example, the carrier server 100 may identify periods of time in which a vehicle travels along a street to deliver one or more packages to serviceable points within a particular geographical area, and then travels along the same street to exit the particular geographical area. Accordingly, the carrier server 100 may utilize this data, which itself is indicative of duplicative travel segments, to identify geographical areas having a single entrance/ingress and exit/egress point. In various embodiments, the carrier server 100 may determine that all serviceable points visited by carrier personnel (e.g., all delivery stops and/or all pickup stops) are within the proximity zone having the single entrance/ingress and exit/egress point. In various embodiments, the serviceable points within the proximity zone having the single entrance/ingress and exit/egress point may be identified based on historical data representing vehicle travel paths occurring over several days. In such embodiments, the carrier server 100 may be configured to identify vehicle travel paths occurring on one or more days in which the corresponding vehicle travels along the duplicative travel path to visit one or more serviceable points between trips along the duplicative travel path. Based upon the identified travel paths, the carrier server 100 may be configured to identify all those serviceable points visited within the proximity zone having the single entrance/ingress and exit/egress point. The carrier server 100 may be configured to determine that all of the identified serviceable points 100 are within the proximity zone having the single entrance/ingress and exit/egress point. Example methodologies for individually identifying duplicate travel segments are described in commonly owned U.S. patent application Ser. No. 14/046,172 filed on Oct. 4, 2013 and entitled "Methods, Apparatuses, and Computer Program Products for Identifying Duplicate Travel," which is incorporated herein by reference in its entirety.

As discussed herein, the carrier server 100 may be configured to identify nearby serviceable points within the same proximity zone/area (e.g., within a proximity zone having a single entrance/ingress and exit/egress point and/or a single entrance/ingress and exit/egress point used by carrier vehicles) in real time and/or after receiving information/data indicative of a shipment/item scheduled to be delivered to a particular destination serviceable point, or information/data indicative of nearby serviceable points, including those serviceable points within the same proximity zone/area as the destination serviceable point, may be stored in a serviceable point profile associated with the destination serviceable point.

The example proximity zone/area shown in FIG. 5 can define an area or zone surrounding the serviceable point within which any other serviceable point is considered a nearby serviceable point. For example, proximity zones/areas may be defined around particular neighborhoods, subdivisions, street segments, towns, cities, and/or the like. As noted above, the proximity zones/areas may be generated automatically, for example, by the carrier server 100, however the proximity zones/areas may be generated based at least in part on user input. For example, a user may identify a particular geographical area to be considered a proximity zone/area, for example, by defining a plurality of GPS coordinates to collectively enclose a geographical area, by drawing a two-dimensional shape on a graphically displayed map to enclose a proximity zone/area, and/or the like. And as noted, the configuration of proximity zones/areas may vary based on the corresponding classification for the geographic area of the serviceable address: super urban, urban, suburban, rural, super rural, and/or the like. As shown in FIG. 5, the proximity zone/area may be substantially circular. However, in other embodiments, a non-circular shaped proximity zone/area could be used if logistically appropriate. For example, proximity zones/areas may be any shape including, but not limited to, a circle, a square, a rectangle, a polygon, an irregular shape, and/or the like. Accordingly, any combination of shapes and sizes may be used in accordance with embodiments of the present invention. Different shapes can be achieved by, for example, defining appropriate metrics in association with the reference geocode assigned to or associated with the current delivery address. A proximity zone/area may be defined based on latitude and longitude coordinates of the center, as well as the radius, of a serviceable point (e.g., around the corresponding reference geocode). Alternatively, the proximity zone/area may be defined, for example, by the latitude and longitude coordinates associated with serviceable point (e.g., around the corresponding reference geocode).

Moreover, proximity zones/areas may vary based on the corresponding classification for the geographic area. For example, geographic areas may be classified as super urban, urban, suburban, rural, super rural, and/or the like. In one embodiment, a proximity zone/area may be a specific number of feet, meters, yards, miles, and/or other distance/tolerance from a serviceable point based on the classification. For example, a proximity zone/area may be defined around a single neighborhood, a portion of a neighborhood, a town, a city, a zip code, and/or the like.

In another embodiment, the proximity zone/area may be a distance/tolerance calculation from a serviceable point (e.g., ±0.01, ±0.01 of 33.78691262, −84.38756068). As will be recognized, one or more proximity zones/areas can be defined for a particular serviceable point. Thus, a serviceable point may be associated with one or more proximity zones/areas to adapt to various needs and circumstances.

2. Synchronizing Delivery of Nearby Shipments/items along a Common or Nearby Street Segment Shipments/items scheduled to be delivered along a common street segment and/or along proximate street segments (e.g., intersecting street segments) may be synchronized and/or identified as good candidates for synchronization. As noted, proximity zones/areas may be defined to encompass single street segments. Shipments/items scheduled to be delivered along a common street segment may be identified with reference to one or more particular street segment identifiers associated with one or more addresses that are indicative of a corresponding street segment. Each street segment identifier may be associated with an identified length of a particular street (e.g., between defined cross streets, including a particular set of addresses, between defined GPS coordinates, extending from a defined point for a defined length, and/or the like). For example, shipments/items scheduled to be delivered along a common city block, to multiple addresses within an address number block along a street or intersecting streets (e.g., any address between 1100 Main Street and 1449 Main Street), and/or the like. Street segments may be identified with reference street segment identifiers in response to user input and/or automatically. In various embodiments, streets determined to satisfy predefined criteria (e.g., streets within a predefined geographical area, streets having a length satisfying a predefined length threshold, streets satisfying a threshold number of deliverable addresses, streets identified based on user input, and/or the like) may be segmented into a plurality of street segments that may be associated with respective street segment identifiers.

In various embodiments, identifying shipments/items scheduled to be delivered to serviceable points along a common street segment may be identified via a methodology similar to that described above in reference to FIG. 4 for identifying shipments scheduled to be delivered to serviceable points within a proximity zone. In such embodiments, a cluster/grouping of serviceable points located along a particular street segment may be clustered into a particular proximity zone/area, and shipments scheduled to be delivered to addresses within the proximity zone/area encompassing the particular street segment may be identified as potentially eligible for synchronized delivery.

With reference to FIG. 6, serviceable points may be associated with particular street segment identifiers, and these street segment identifiers may be utilized to identify shipments/items scheduled to be delivered to nearby serviceable points. For example, the serviceable point profiles stored in the serviceable point profile management database may comprise information/data indicative of a particular street segment identifier, such that serviceable points sharing a common street segment identifier may be indicated as nearby such that shipments/items scheduled to be delivered to serviceable points sharing the common street segment identifier may be eligible for synchronized delivery. As shown in FIG. 6, the carrier server 100 may be configured to assign a street segment identifier to each of a plurality of serviceable points, as indicated at Block 501. For example, the street segment identifier may be one or more characters (e.g., alphanumeric characters) symbols, strings of characters and/or symbols, and/or the like. The street segment identifiers may additionally be associated with and/or form a part of map data defining data regarding various streets, street segments, points of interest, and/or the like. Accordingly, the street segment identifiers may be associated with portions of the map data comprising data about the corresponding street segment. For example, the map data may comprise data indicative of various attributes of each of a plurality of street segments. For example, for each street segment, the map data may comprise data indicative of the shape of the street segment (e.g., straight, curved, single-lane, two-lane, divided, including a center left-turn lane, and/or the like), length of the segment (e.g., ¼ mile, 1 mile, and/or the like), address range for the segment (e.g., between 1000 Main St. and 1204 Main St.), direction of the segment (e.g., Single direction heading North; Bi-directional heading East-West), connecting cross streets (e.g., nodes) within the street segment (e.g., First Street and Second Street intersect Main Street), and/or the like. Accordingly, based at least in part on the map data, serviceable points to be associated with each street segment may be identified.

As non-limiting examples, all serviceable points along a particular street between two waterways, between two bridges, within a particular county, city, town, property zone (e.g., residential, commercial, industrial, and/or the like), and/or the like may be assigned a common street segment identifier. In various embodiments, the street segment identifier may be stored as a portion of the information/data stored in association with serviceable point profiles.

Item information/data may then be received by the carrier server 100, as indicated at Block 502, corresponding to a particular shipment/item that is scheduled to be delivered to a destination serviceable point. In various embodiments, the shipment/item information/data at least identifies the destination serviceable point, and may additionally identify an estimated delivery date, a service level, and/or other information/data corresponding to the shipment/item. The carrier server 100 may then identify a serviceable point profile corresponding to the destination location for the shipment/item, as indicated at Block 503 of FIG. 6, and may identify a street segment identifier stored in association with the serviceable point profile as shown at Block 504.

Upon identifying the street segment identifier corresponding to the destination location of the shipment/item, the carrier server 100 may identify additional serviceable points having the same street segment identifier, as indicated at Block 505. For example, the carrier server 100 may query the serviceable point profile management database to identify serviceable point profiles comprising information/data indicative of the same street segment identifier.

The serviceable points identified as having the same street segment identifier as the destination serviceable point may be considered nearby, such that shipments/items scheduled to be delivered to addresses having the same street segment identifier may be eligible for synchronized delivery. As discussed herein, the carrier server 100 may be configured to identify nearby serviceable points (e.g., along the same street segment and/or along intersecting streets) in real time and/or after receiving information/data indicative of a shipment/item scheduled to be delivered to a particular destination serviceable point, or information/data indicative of nearby serviceable points, including those serviceable points along the same street segment identifier, may be stored in a serviceable point profile associated with the destination serviceable point. In the latter embodiments, the process indicated by Blocks 501-505 may be provided only once (and/or each time street segment identifiers and/or serviceable points change) when initially populating information/data within the serviceable point profile database. However, in embodiments in which the identification of nearby addresses occurs each time shipment/item information/data is received, the entirety of the process indicated by FIG. 6 may be provided each time a shipment/item is received.

In various embodiments, the carrier server 100 may be configured to store data indicative of a plurality of serviceable points associated with a single street segment and/or intersecting street segments in association with one or more cluster profiles. Each cluster profile may be stored (e.g., in a database in communication with the carrier server 100) and may comprise data identifying those serviceable points along a common street segment. For example, all those serviceable points determined to be along a single street segment may be identified to be within a single cluster associated with a corresponding cluster profile. In such embodiments, upon receipt of shipping information corresponding to one or more shipments/items, the carrier server 100 may be configured to compare the destination serviceable point associated with the shipment/item against data stored in association with one or more cluster profiles to identify other serviceable points associated with a common cluster as the destination serviceable point. Upon identifying a cluster comprising the destination serviceable point, the carrier server 100 may identify other serviceable points associated with the cluster, and may determine whether stop creator shipments/items are scheduled to be delivered to these other serviceable points, as described herein.

Referring again to FIG. 6, upon identifying the serviceable points sharing an identified street segment identifier, the carrier server 100 determines whether stop creator shipments are scheduled to be delivered to any of the serviceable points located along the same street segment, as indicated at Block 506. The carrier server 100 may review information/data stored in association with a serviceable point profile to determine whether stop creator shipments are scheduled to be delivered to nearby serviceable points (e.g., serviceable points along the same street segment), and/or the carrier server 100 may review information/data stored in a shipment/item level detail database comprising information/data indicative of active and/or anticipated shipments/items, in order to identify potential stop creator shipments. As noted herein, stop creator shipments may be identified as scheduled to be delivered to the same or nearby addresses as the shipment/item within a window of time relative to the initial estimated delivery date of the shipment/item. For example, stop creator shipments may be identified as scheduled to be delivered less than or equal to 2 days before and/or 2 days after the estimated delivery date of the shipment/item.

Upon identifying one or more stop creator shipments scheduled to be delivered to nearby addresses along the same street segment, the carrier server 100 may be configured to facilitate synchronized delivery of the shipment/item with one or more of the stop creator shipments. As indicated at Block 507, the carrier server 100 may be configured to update shipment/item information/data corresponding to the shipment/item to reflect a new estimated delivery date corresponding to one or more of the stop creator shipments. In various embodiments, the carrier server 100 may determine that modifying the estimated delivery date of a shipment/item may additionally require modifying the service level for the shipment/item in order to ensure that the shipment/item is available for delivery on the same day as the one or more stop creator shipments. Accordingly, the carrier server 100 may be configured to modify the service level associated with the shipment/item in order to expedite or slow the transportation of the shipment/item from its origin to the destination serviceable point. As noted previously, modifying the service level associated with the shipment/item may additionally comprise modifying the shipment/item information/data to indicate the changed delivery service level. Moreover, as previously indicated, modifying the estimated delivery date and/or the service level associated with the shipment/item may additionally comprise generating a logical flag to be associated with the shipment/item information/data indicative of the changed delivery date and/or service level. As noted herein, the logical flags (or other indicia) stored in association with the shipment/item information/data may cause one or more computing devices (e.g., a handheld computing device) to generate an alert (e.g., an audible alert and/or a visual alert displayed via a graphical display) for carrier personnel indicative of the changed delivery date and/or service level, such that the personnel are made aware that the shipment/item has special and/or modified handling instructions. For example, upon the personnel scanning a shipment/item indicia located on the shipment/item with a handheld computing device, the handheld computing device may generate the alert to inform the personnel of modified handling instructions associated with the updated delivery date and/or service level.

As indicated above, information/data identifying a particular street segment may comprise information/data defining a geofence around a particular street segment, information/data identifying a plurality of serviceable points (e.g., a consecutive range of addresses) associated with the particular street segment; and/or the like. As a non-limiting example with reference to FIG. 7, a street segment may be defined as the portion of Main St. extending between First St. and Second St., and accordingly may encompass the serviceable points associated with residences 1000e-1000g. Accordingly, the serviceable points associated with the residences 1000e-1000g may be associated with corresponding serviceable point profiles comprising information/data indicating that the addresses are associated with street segment identifier "A-1." As yet another example, the serviceable points associated with the particular street segment may be a range of addresses on a particular street (e.g., addresses 1100 Main St. to 1400 Main St.). Each street segment may thus be associated with a plurality of addresses existing along a particular street.

In various embodiments, street segments may be associated with serviceable points along a particular street, as well as serviceable points along cross streets intersecting the particular street. For example, serviceable points existing along cross streets that intersect the particular street may be identified as being a part of a particular street segment. In various embodiments, street intersections existing within an identified range of serviceable points within a particular street segment (e.g., intersections existing between 1100 Main St. and 1400 Main St.) may be assigned a node identifier. The node identifier may then be associated with one or more serviceable points along the corresponding cross street. Thus, the information/data identifying the particular street segment may identify all serviceable points along the particular street segment, all nodes along the particular street segment, and all serviceable points associated with the identified nodes.

In various embodiments, serviceable points may be associated with a particular node based on distance and/or travel time to the serviceable point from the node. For example, serviceable points within a particular distance of the node (e.g., based on GPS coordinates of the node and of the serviceable point; based on historical information/data identifying the location of a delivery stop; based on the distance along the road between the node and the serviceable point; and/or the like) may be identified as being associated with the node. The particular distance may be determined based on user input received at the carrier server 100.

In various embodiments, serviceable points may be associated with a particular node based on the travel time between the node and each serviceable point. For example, serviceable points having a travel time of less than a predefined threshold value may be associated with the node. Similar to the methodology described herein for determining an estimated travel time between nearby addresses, the travel time between a node and a particular serviceable point on a cross street may be determined with reference to historical data.

In various embodiments, all serviceable points existing on a cross street intersecting a particular street within a particular street segment may be identified as being associated with the particular street segment (e.g., a short and/or dead end street that intersects the particular street may have all of the serviceable points existing thereon associated with the particular street segment).

Accordingly, in various embodiments, upon determining that a shipment/item is scheduled to be delivered to a particular serviceable point associated with a particular street segment, the carrier server 100 may be configured to search for additional shipments/items (e.g., stop creator shipments) scheduled to be delivered to serviceable points along the particular street segment. Upon identifying such a stop creator shipment, the carrier server 100 may be configured to update the shipment/item information/data for the shipment/item to facilitate synchronized delivery of the shipment/item with the stop-creator shipment/item. For example, the carrier server 100 may be configured to expedite shipment/item (e.g., by upgrading a delivery service level for the shipment/item) and/or to hold the shipment/item at a particular location such that delivery of the particular shipment/item may be synchronized with the stop-creator shipment/item.

3. Synchronizing Delivery of Nearby Shipments/items having a Common Geographic Descriptor/Attribute Shipments/items scheduled to be delivered to delivery serviceable points sharing a common geographic descriptor/attribute may be synchronized. For example, serviceable points having a common geographic descriptor/attribute may be serviceable points within the same neighborhood (e.g., a residential neighborhood), serviceable points within the same campus (e.g., an academic campus, a corporate campus, and/or the like), addresses within the building complex (e.g., townhome complex, apartment complex, office complex, condominium complex, and/or the like), serviceable points located at a particular landmark (e.g., addresses within a particular building), serviceable points within a particular zip code or zip code plus four, serviceable points within a particular city/town, and/or the like. In various embodiments, a proximity zone/area may be configured to encompass all those addresses sharing a common geographic descriptor/attribute.

In various embodiments, serviceable points information/data stored in a serviceable point database for a particular serviceable point may comprise information/data indicative of a particular geographic descriptor associated with the serviceable point. For example, address information/data associated with one or more serviceable points in the serviceable point database may be indicative of the name of the neighborhood in which the serviceable point is located.

Upon receiving a shipment/item scheduled to be delivered within a particular geographical area having a particular geographical descriptor, the carrier server 100 may be configured to search for one or more additional shipments/items (e.g., stop creator shipments) scheduled to be delivered to one or more serviceable points associated with the same geographical descriptor (e.g., within the same neighborhood). Upon identifying such a stop creator shipment, the carrier server 100 may be configured to update the shipment/item information/data for the shipment/item to facilitate synchronized delivery of the shipment/item with the stop-creator shipment/item. For example, the carrier server 100 may be configured to expedite shipment (e.g., by upgrading a delivery service level for the shipment/item) and/or to hold the shipment/item at a particular location such that delivery of the particular shipment/item may be synchronized with the stop-creator shipment/item.

Figure 8A:
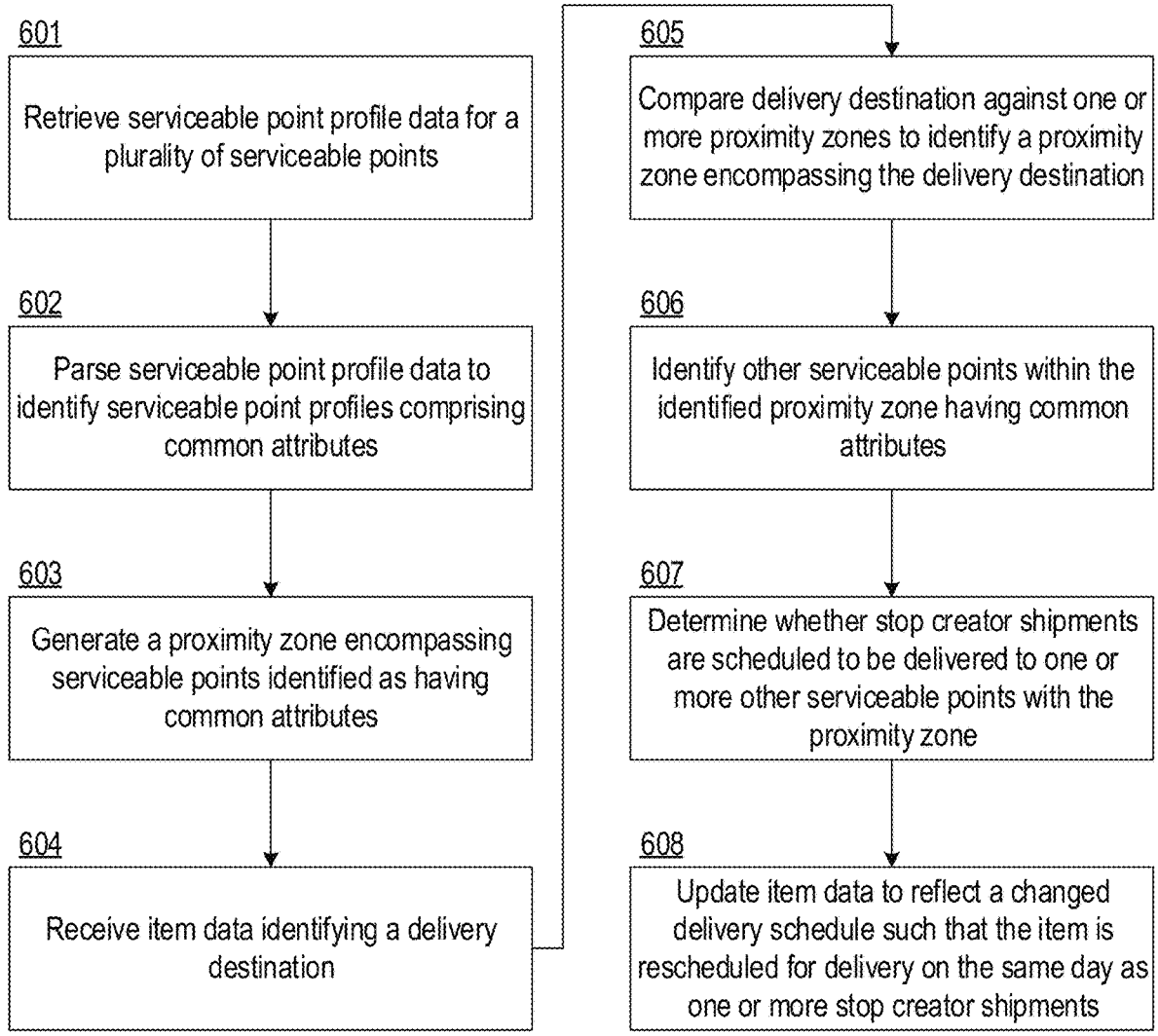
FIGS. 8A-8B are flow charts of example methods for identifying nearby serviceable points sharing common attributes in accordance with certain embodiments of the present invention.
Figure 8B:
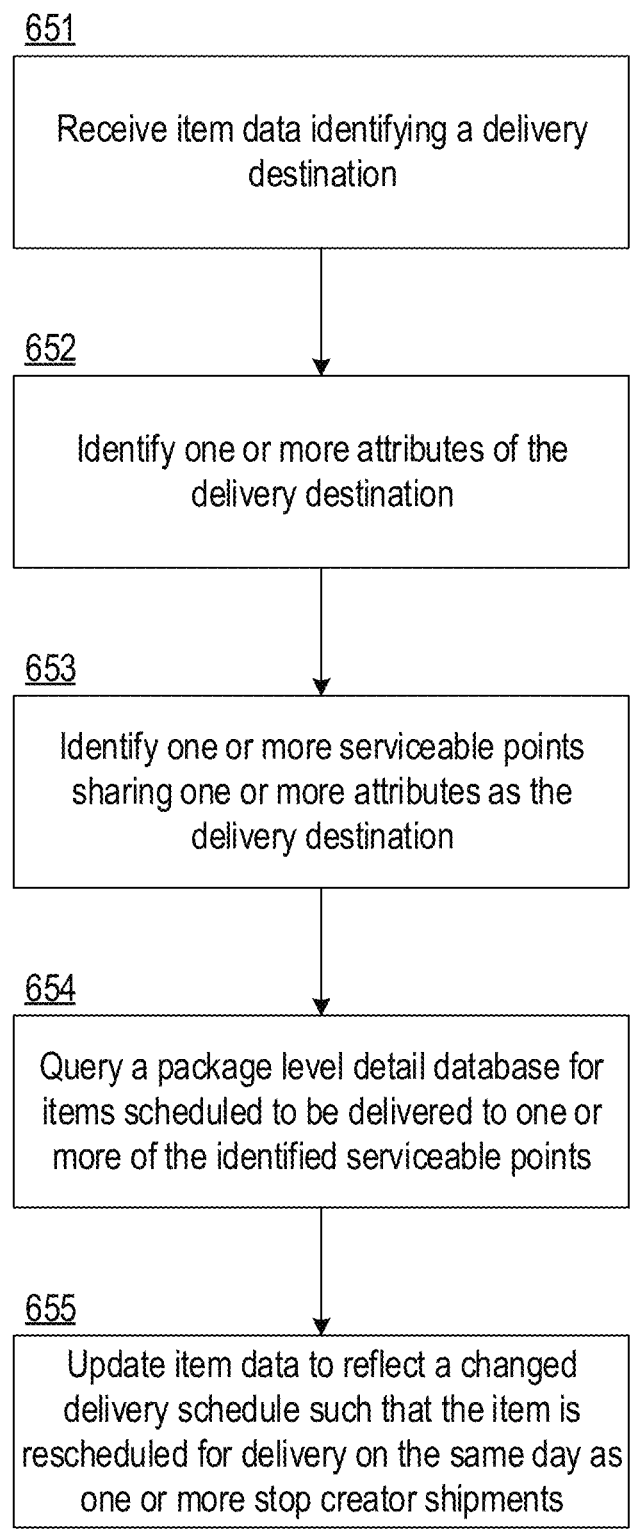

In various embodiments, identifying serviceable points sharing a common geographic descriptor may be identified via a methodology similar to that described above in reference to FIG. 4 for identifying shipments scheduled to be delivered to serviceable points within a proximity zone/area and/or to serviceable points sharing a common street segment identifier with the destination location for the shipment/item. In various embodiments, a cluster/grouping of serviceable points located within a particular geographic area having a common geographic descriptor (e.g., a neighborhood) may be clustered into a proximity zone/area, and shipments scheduled to be delivered to addresses within the proximity zone/area encompassing the particular geographic descriptor may be identified as potentially eligible for synchronized delivery. Moreover, serviceable points within a geographic area having a common geographic descriptor may be associated with a geographic descriptor identifier, which may be stored in association with the serviceable point profiles corresponding to the serviceable points within the identified geographical area. In such embodiments, identifying shipments scheduled to be delivered to serviceable points sharing a common geographical descriptor identifier may be identified as potentially eligible for synchronized delivery. FIGS. 8A-8B illustrate two example processes for synchronizing delivery of items to destinations having common geographic descriptors.

With reference to FIG. 8A, synchronized delivery of items to be delivered to a common geographical area may be synchronized by first clustering serviceable points sharing common attributes (e.g., common street name, common street segment, common neighborhood identifier, common campus identifier, and/or the like) into a single proximity zone/area, and then identifying items scheduled to be delivered to the serviceable points within the generated proximity zone. Accordingly, the carrier server 100 may retrieve serviceable point profile information/data corresponding to a plurality of serviceable points, as indicated at Block 601. As discussed previously, the serviceable point profile information/data may comprise information/data particular to each serviceable point, including an address, a preferred delivery location at the address, nearby serviceable point identifiers, geographic descriptor data, and/or the like. The serviceable point profile information/data may be stored in a serviceable point profile management database, and accordingly retrieving the serviceable point profile information/data may comprise retrieving the serviceable point profile information/data from the serviceable point profile management database.

Upon receipt of the serviceable point profile information/data for the plurality of serviceable points, the carrier server 100 is configured to parse the serviceable point profile information/data for each of the serviceable points, as indicated at Block 602. In various embodiments, parsing the serviceable point profile information/data may comprise identifying separately recited attributes of each serviceable point as indicated in the associated serviceable point profile data. For example, parsing the serviceable point profile information/data may comprise individually identifying the street name, the city, the state, the zip code, a geographical descriptor (e.g., a neighborhood identifier), and/or the like for each serviceable point. The carrier server 100 may then cluster/grouping serviceable points having common geographic descriptors together. For example, the carrier server 100 may cluster/grouping all serviceable points associated with the "Sudden Valley Neighborhood" geographic descriptor. In various embodiments, the carrier server 100 may be configured to only cluster/grouping those serviceable points having a plurality of common geographic descriptors, in order to minimize the number of incorrect clusters/groupings. For example, the carrier server 100 may identify a neighborhood named "Sudden Valley" in Atlanta, Ga., and another neighborhood named "Sudden Valley" proximate Los Angeles, Calif. Thus, the carrier server 100 may be configured to cluster/grouping serviceable points in the Sudden Valley neighborhood in Atlanta, Ga. separately from those serviceable points in the Sudden Valley neighborhood proximate Los Angeles, Calif. by clustering serviceable points having two or more attributes in common (e.g., geographic descriptor, and zip code).

The carrier server 100 may additionally be configured to generate one or more proximity zones/areas encompassing serviceable points of a particular cluster, as indicated at Block 603. Thus, serviceable points having common attributes may be grouped into a single proximity zone. The carrier server 100 may then be configured to update the serviceable point profile information/data to reflect the proximity zone/area in which each serviceable point is grouped.

The process of synchronizing delivery of items delivered to serviceable points sharing a common geographic descriptor may then proceed similarly to the methods described in reference to FIG. 4. Accordingly, as shown at Block 604, the carrier server 100 may receive shipment/item information/data corresponding to a particular shipment/item that is scheduled to be delivered to a destination serviceable point. In various embodiments, the shipment/item information/data at least identifies the destination serviceable point, and may additionally identify an estimated delivery date, a service level, and/or other information/data corresponding to the shipment/item. As indicated at Block 605, the carrier server 100 may then compare the destination serviceable point against the plurality of proximity zones/areas to identify one or more proximity zones/areas encompassing the destination serviceable point. For example, the carrier server 100 may be configured to identify a corresponding serviceable point profile associated with the destination serviceable point, and may then identify an applicable proximity zone/area based on the serviceable point profile information/data associated with the destination serviceable point.

Upon identifying one or more proximity zones/areas encompassing the destination serviceable point, the carrier server 100 retrieves information/data indicative of the identity of other serviceable points encompassed by the proximity zone/area from the database as indicated at Block 606. The serviceable points within the same proximity zone/area as the destination serviceable point may be considered nearby, such that shipments/items scheduled to be delivered to addresses within the same proximity zone/area may be eligible for synchronized delivery. As discussed herein, the carrier server 100 may be configured to identify nearby serviceable points within the same proximity zone/area in real time and/or after receiving information/data indicative of a shipment/item scheduled to be delivered to a particular destination serviceable point, or information/data indicative of nearby addresses, including those addresses within the same proximity zone/area as the destination serviceable point, may be stored in a serviceable point profile associated with the destination serviceable point Referring again to FIG. 8A, upon identifying the serviceable points encompassed by the identified proximity zones/areas, the carrier server 100 determines whether stop creator shipments are scheduled to be delivered to any of the serviceable points located within the identified proximity zone/area, as indicated at Block 607. The carrier server 100 may review information/data stored in association with a serviceable point profile to determine whether stop creator shipments are scheduled to be delivered to nearby serviceable points (e.g., serviceable points within the identified proximity zone), and/or the carrier server 100 may review information/data stored in a shipment/item level detail database comprising information/data indicative of active and/or anticipated shipments/items, in order to identify potential stop creator shipments. In various embodiments, stop creator shipments may be identified as scheduled to be delivered to the same or nearby addresses as the shipment/item within a window of time relative to the initial estimated delivery date of the shipment item. For example, stop creator shipments may be identified as scheduled to be delivered less than or equal to 2 days before and/or 2 days after the estimated delivery date of the shipment/item.

Upon identifying one or more stop creator shipments scheduled to be delivered to nearby addresses within the same proximity zone/area, the carrier server 100 may be configured to facilitate synchronized delivery of the shipment/item with one or more of the stop creator shipments. As indicated at Block 608, the carrier server 100 may be configured to update shipment/item information/data corresponding to the shipment/item to reflect a new estimated delivery date corresponding to one or more of the stop creator shipments. In various embodiments, the carrier server 100 may determine that modifying the estimated delivery date of a shipment/item may additionally require modifying the service level for the shipment/item in order to ensure that the shipment/item is available for delivery on the same day as the one or more stop creator shipments. Accordingly, the carrier server 100 may be configured to modify the service level associated with the shipment/item in order to expedite or slow the transportation of the shipment/item from its origin to the destination serviceable point. As noted previously, modifying the service level associated with the shipment/item may additionally comprise modifying the shipment/item information/data to indicate the changed delivery service level. Moreover, as previously indicated, modifying the estimated delivery date and/or the service level associated with the shipment/item may additionally comprise generating a logical flag to be associated with the shipment/item information/data indicative of the changed delivery date and/or service level. As noted herein, the logical flags (or other indicia) stored in association with the shipment/item information/data may cause one or more computing devices (e.g., a handheld computing device) to generate an alert (e.g., an audible alert and/or a visual alert displayed via a graphical display) for carrier personnel indicative of the changed delivery date and/or service level, such that the personnel are made aware that the shipment/item has special and/or modified handling instructions. For example, upon the personnel scanning a shipment/item indicia located on the shipment/item with a handheld computing device, the handheld computing device may generate the alert to inform the personnel of modified handling instructions associated with the updated delivery date and/or service level.

As discussed herein, the carrier server 100 may be configured to identify nearby serviceable points sharing a common geographic descriptor in real time and/or after receiving information/data indicative of a shipment/item scheduled to be delivered to a particular destination serviceable point, or information/data indicative of nearby serviceable points, including those serviceable points sharing the common geographic descriptor as the destination serviceable point, may be stored in a serviceable point profile associated with the destination serviceable point. In the latter embodiments, the process indicated by Blocks 601-603 may be provided once (and/or each time proximity zones/areas and/or serviceable points change) when initially populating information/data within the serviceable point profile database. However, in embodiments in which the identification of nearby addresses occurs each time shipment/item information/data is received, the entirety of the process indicated by FIG. 8A may be provided each time a shipment/item is received.

In various embodiments, the carrier server 100 may be configured to store data indicative of a plurality of serviceable points sharing a common geographic descriptor in association with one or more cluster profiles. Each cluster profile may be stored (e.g., in a database in communication with the carrier server 100) and may comprise data identifying those serviceable points sharing a common geographic descriptor. For example, all those serviceable points determined to be within a single proximity zone may be identified to be within a single cluster associated with a corresponding cluster profile. In such embodiments, upon receipt of shipping information corresponding to one or more shipments/items, the carrier server 100 may be configured to compare the destination serviceable point associated with the shipment/item against data stored in association with one or more cluster profiles to identify other serviceable points associated with a common cluster as the destination serviceable point. Upon identifying a cluster comprising the destination serviceable point, the carrier server 100 may identify other serviceable points associated with the cluster, and may determine whether stop creator shipments/items are scheduled to be delivered to these other serviceable points, as described herein.

FIG. 8B illustrates a flow chart illustrating an alternative method for facilitating synchronized delivery of items to be delivered to serviceable points having a common geographic descriptor. As shown in FIG. 8B, the process may begin as indicated at Block 651 when the carrier server 100 receives shipment/item information/data corresponding to a particular shipment/item that is scheduled to be delivered to a destination serviceable point. In various embodiments, the shipment/item information/data at least identifies the destination serviceable point, and may additionally identify an estimated delivery date, a service level, and/or other information/data corresponding to the shipment/item. The carrier server 100 may then identify one or more attributes of the delivery destination, as indicated at Block 652. In various embodiments, identifying one or more attributes of the delivery destination may comprise parsing the shipment/item information/data to separately identify various attributes of the delivery destination, such as the street, the city, the state, the zip code, and/or the like. Moreover, in various embodiments, identifying attributes of the delivery destination may additionally comprise identifying a serviceable point profile corresponding to the delivery destination, which may itself comprise information/data identifying additional attributes of the destination location, such as a neighborhood, campus, building, and/or the like encompassing the delivery destination.

The carrier server 100 may then identify one or more additional serviceable points sharing at least one common attribute with the destination location, as indicated at Block 653. For example, the carrier server 100 may be configured to query a serviceable point profile management database to identify serviceable point profiles comprising information/data indicative of one or more attributes shared with the destination location. In various embodiments, the carrier server 100 may be configured to identify particular serviceable points as sharing common attributes with the destination location when the identified serviceable point profiles share two or more attributes with the delivery destination. Thus, as discussed herein, the carrier server 100 may be configured to ensure that the identified serviceable points are indeed nearby and share common geographic attributes. By requiring serviceable points to share two or more attributes with the delivery destination, the carrier server 100 may minimize the opportunity for incorrectly matching serviceable points that may, for example, be encompassed by separate neighborhoods spaced apart by an extended distance but sharing a same common neighborhood name.

As shown at Block 654, the carrier server 100 may then identify one or more stop creator shipments/items scheduled to be delivered to one or more of the identified serviceable points sharing one or more attributes with the destination location. The carrier server 100 may review information/data stored in association with a serviceable point profile to determine whether stop creator shipments are scheduled to be delivered to nearby serviceable points (e.g., serviceable points within the identified proximity zone), and/or the carrier server 100 may review information/data stored in a shipment/item level detail database comprising information/data indicative of active and/or anticipated shipments/items, in order to identify potential stop creator shipments. In various embodiments, stop creator shipments may be identified as scheduled to be delivered to the same or nearby addresses as the shipment/item within a window of time relative to the initial estimated delivery date of the shipment item. For example, stop creator shipments may be identified as scheduled to be delivered less than or equal to 2 days before and/or 2 days after the estimated delivery date of the shipment/item.

Upon identifying one or more stop creator shipments scheduled to be delivered to nearby addresses within the same proximity zone/area, the carrier server 100 may be configured to facilitate synchronized delivery of the shipment/item with one or more of the stop creator shipments. As indicated at Block 655, the carrier server 100 may be configured to update shipment/item information/data corresponding to the shipment/item to reflect a new estimated delivery date corresponding to one or more of the stop creator shipments. In various embodiments, the carrier server 100 may determine that modifying the estimated delivery date of a shipment/item may additionally require modifying the service level for the shipment/item in order to ensure that the shipment/item is available for delivery on the same day as the one or more stop creator shipments. Accordingly, the carrier server 100 may be configured to modify the service level associated with the shipment/item in order to expedite or slow the transportation of the shipment/item from its origin to the destination serviceable point. As noted previously, modifying the service level associated with the shipment/item may additionally comprise modifying the shipment/item information/data to indicate the changed delivery service level. Moreover, as previously indicated, modifying the estimated delivery date and/or the service level associated with the shipment/item may additionally comprise generating a logical flag to be associated with the shipment/item information/data indicative of the changed delivery date and/or service level. As noted herein, the logical flags (or other indicia) stored in association with the shipment/item information/data may cause one or more computing devices (e.g., a handheld computing device) to generate an alert (e.g., an audible alert and/or a visual alert displayed via a graphical display) for carrier personnel indicative of the changed delivery date and/or service level, such that the personnel are made aware that the shipment/item has special and/or modified handling instructions. For example, upon the personnel scanning a shipment/item indicia located on the shipment/item with a handheld computing device, the handheld computing device may generate the alert to inform the personnel of modified handling instructions associated with the updated delivery date and/or service level.

As discussed herein, the carrier server 100 may be configured to identify nearby serviceable points sharing one or more attributes in real time and/or after receiving information/data indicative of a shipment/item scheduled to be delivered to a particular destination serviceable point, or information/data indicative of nearby serviceable points, including those serviceable points sharing one or more attributes as the destination serviceable point, may be stored in a serviceable point profile associated with the destination serviceable point. In the latter embodiments, the process indicated by Blocks 651-653 may be provided only once (and/or each time proximity zones/areas and/or serviceable points change) when initially populating information/data within the serviceable point profile database. However, in embodiments in which the identification of nearby addresses occurs each time shipment/item information/data is received, the entirety of the process indicated by FIG. 8B may be provided each time a shipment/item is received.

In various embodiments, the carrier server 100 may be configured to store data indicative of a plurality of serviceable points within a single proximity zone/area in association with one or more cluster profiles. Each cluster profile may be stored (e.g., in a database in communication with the carrier server 100) and may comprise data identifying those serviceable points sharing one or more attributes. For example, all those serviceable points determined to share one or more attributes may be identified to be within a single cluster associated with a corresponding cluster profile. In such embodiments, upon receipt of shipping information corresponding to one or more shipments/items, the carrier server 100 may be configured to compare the destination serviceable point associated with the shipment/item against data stored in association with one or more cluster profiles to identify other serviceable points associated with a common cluster as the destination serviceable point. Upon identifying a cluster comprising the destination serviceable point, the carrier server 100 may identify other serviceable points associated with the cluster, and may determine whether stop creator shipments/items are scheduled to be delivered to these other serviceable points, as described herein.

4. Synchronizing Delivery of Nearby Shipments/Items Identified Based on Time and/or Distance between Service Points Shipments/items scheduled to be delivered to serviceable points satisfying predefined delivery time and/or delivery distance criteria/thresholds may be synchronized to minimize the amount of time spent by carrier personnel in delivering the shipments. Such relationships may be identified based on historical, real-time or predictive information/data regarding the time and/or distance between deliveries made to the plurality of serviceable points. For example, shipments/items scheduled to be delivered to serviceable points positioned in sufficient proximity that the vehicle operator need not move the vehicle between deliveries (such that the delivery operator walks between service points to make the multiple deliveries) may be identified as being within a car stop proximity. As yet another example, shipments/items scheduled to be delivered along a particular street, area of a street, and/or the like may be synchronized in order to increase the delivery density in a particular area.

In various embodiments, the carrier server 100 may be configured to identify elapsed time and/or elapsed distance between consecutive delivery stops based on historical, real-time and/or predictive data. The historical information/data may comprise, inter alia, service information/data indicative of one or more service dynamics of a particular vehicle operator for one or more delivery dates occurring historically. In various embodiments, the delivery information/data may be generated based at least in part on user input received by a mobile device 110 carried by the delivery vehicle operator. As non-limiting examples, the service information/data may be indicative of user input received by a mobile device 110 indicative of the occurrence of one or more events of interest. As non-limiting examples, the one or more events of interest may comprise: (a) that a delivery stop has commenced, (b) that a delivery stop has ended, (c) that a particular delivery stop is a pickup, delivery, or both, (d) that a particular bill of lading and its associated freight or shipments/items have been picked up or delivered, (e) the number of units picked up or delivered at a stop, (f) the weight of shipments/items or freight picked up or delivered at a stop, (g) that a lunch or break period has commenced, (h) that a lunch or break period has ended, (i) that a particular delay has been encountered, (j) that a particular delay has ended, (k) that a driver has begun a work day and is on the clock, (l) that a driver has ended a work day and is off the clock, (m) that the vehicle has moved out of a geo-fenced area associated with its home shipping hub (e.g., as indicated by a GPS sensor), (n) that the vehicle has moved into a geo-fenced area associated with its home shipping hub, (o) that the vehicle has moved into a geo-fenced area associated with a delivery area assigned to vehicle and its driver, and (p) that the vehicle has moved out of a geo-fenced area associated with a delivery area assigned to vehicle and its driver. Additional detail regarding the information/data that may be stored as service information/data is provided in U.S. patent application Ser. No. 14/711,806, filed May 14, 2015, the entire contents of which is incorporated herein by reference in its entirety.

In various embodiments, the service information/data may be stored in association with contextual information/data indicative of inter alia, the location and the time at which the corresponding user input was received. Accordingly, based upon the inclusion of the service information/data and the associated contextual data, the historical information/data comprises information/data indicative of the location and time at which shipments/items were delivered to various serviceable points during one or more historical delivery routes. Because the actual routes traversed, and the actual destination serviceable points actually visited by a particular delivery vehicle operator may vary each day, the historical, real-time, and/or predictive information/data may be indicative of the time and/or distance traveled between various combinations of destination serviceable points. For example, the historical information/data may indicate that on Dec. 2, 2013, a delivery vehicle operator delivered a first shipment/item to 123 Main St. Atlanta, Ga. 30309 at 1:12:03 PM and at a first geo-position and subsequently delivered a second shipment/item to 125 Main St. Atlanta, Ga. 30309 at 1:13:15 PM at a second geo-position; and the historical information/data may indicate that on Dec. 14, 2013, a delivery vehicle operator delivered a third shipment/item to 123 Main St. Atlanta, Ga. 30309 at 1:17:04 PM at the first geo-position and subsequently delivered a fourth shipment/item to 124 Main St. Atlanta, Ga. 30309 at 1:19:33 PM at a third geo-position. The historical information/data may be indicative of historical delivery route information/data for a given period of time (e.g., the most recent 6 months, between Jan. 1, 2012 and Dec. 31, 2012, and/or the like), and accordingly may include duplicate combinations of delivery stops. Accordingly, the historical information/data may be indicative of an average time and/or an average distance between delivery stops for various combinations of delivery stops. Thus, the average amount of time between various nearby delivery stops and the average distance between various nearby delivery stops may be identified based on the historical data.

Serviceable points may be clustered and/or considered nearby according to one or more thresholds, including time, distance, or time and distance. In some implementations, the one or more thresholds may be based on the distance between serviceable points, the travel times between serviceable points, the time elapsed between deliveries for serviceable points, and/or the distance and time between serviceable points.

In one embodiment, a configurable distance threshold may be a configurable threshold indicating a configurable distance threshold between serviceable points, below which serviceable points may be considered nearby. The distance between two serviceable points may be determined using a variety of techniques and approaches. For example, in one embodiment, the distance between two serviceable points can be determined based on longitude and latitude coordinates, for example of the two serviceable points. In turn, the determined differences between the longitude and latitude coordinates may be used to determine whether the two serviceable points satisfy the configurable distance threshold based on travel distance. In other implementations, the map information/data and/or telematics information/data can be used to make similar determinations.

In another embodiment, the distance between two serviceable points can be determined from telematics information/data (e.g., odometer or hubometer information/data collected while a delivery vehicle and/or delivery vehicle operator traveled from the first point to the second point) and/or map information/data (e.g., routing through a street network). For instance, a vehicle may include a plurality of vehicle sensors, readers, cameras, and/or the like configured for generating and/or collecting telematics information/data indicative of various vehicle dynamics, such as engine ignition, engine speed, vehicle speed, vehicle location, and the status of various vehicle components. The vehicle sensors may be controlled by the telematics device, which may be positioned on or within the vehicle. In controlling the various vehicle sensors, the telematics device is able to capture and store telematics information/data from the various vehicle sensors according to a programmed logic and associate the captured telematics information/data with contextual information/data (e.g., date, time, location). The carrier server 100 can determine the distance traveled between two or more serviceable points (e.g., stops) based on telematics information/data collected by the vehicle. In one embodiment, the carrier server 100 determines the distance by first identifying telematics information/data that indicates the distance traveled by a delivery vehicle (e.g., odometer reading) that was captured (a) at the start of a first stop (e.g., when the vehicle's engine was turned off, when the vehicle slowed to a stop immediately prior to the start of the stop, and/or the like) or (b) at the end of the first stop (e.g., when the vehicle's engine was started, when the vehicle accelerated from standstill, and/or the like). Then, the carrier server 100 can identify telematics information/data that indicates the distance traveled by the vehicle either to the next stop (e.g., when the vehicle's engine was turned off again, when the vehicle slowed to a stop immediately prior to the start of the next stop, and/or the like) or from the previous stop (e.g., when the vehicle's engine was started again, when the vehicle accelerated from standstill, and/or the like). The carrier server 100 may then determine the distance traveled by the vehicle between the stops and store the result (e.g., 3 miles). In other embodiments, the carrier server 100 may similarly determine traveled distances and/or the travel time for stops using the GPS-based techniques, map information/data, and/or the like.

Additionally or alternatively, a threshold time may be a configurable threshold indicating a configurable travel time threshold between serviceable points or a configurable time elapsed threshold between deliveries for serviceable points, satisfying which serviceable points may be clustered and considered nearby. In one implementation, the travel time between serviceable points can be determined from map information/data. In another implementation, the travel time between serviceable points may be determined using telematics information/data and/or information/data provided delivery vehicle drivers and/or delivery personnel operating mobile devices 110 while delivering items to serviceable points. For example, a delivery vehicle driver may provide updates to carrier server 100 indicating delivery completion at each serviceable point. For example, a driver may use a mobile devices 110 in communication with the carrier server 100 to provide an update indicating that the driver completed deliveries at a particular serviceable point. In one implementation, the carrier computing entity 100 may automatically determine that a driver completed a delivery at a first serviceable point based on the driver recording a stop complete event via his mobile devices 110. Additionally, this can be determined based on telematics information/data indicating that a vehicle's engine has started or that the vehicle has moved or accelerated from the first serviceable point after stopping for a threshold period of time. The carrier server 100 may then determine that the driver arrives at the next serviceable point (time to stop (tts)). The time to stop can include walking time, driving time, combinations thereof, and/or the like. For example, the driver may use a mobile device 110 in communication with carrier server 100 to provide an update indicating that the driver started or completed deliveries at a particular serviceable point. Additionally, the telematics information/data can indicate that a vehicle's engine has stopped or turned off at the next serviceable point. The travel time from the first serviceable point to the next serviceable point is then determined by the difference in the time between when the stop at the first serviceable point was completed and the stop at the next serviceable point began. That is, the carrier computing entity 100 may determine the travel time (e.g., walking time, driving time, combinations thereof, and/or the like) between two serviceable points (e.g., for pick-ups or deliveries). In turn, the travel time between the serviceable points may be used to determine whether the two serviceable points satisfy the configurable travel time threshold based on the travel time between serviceable points.

Figure 7:
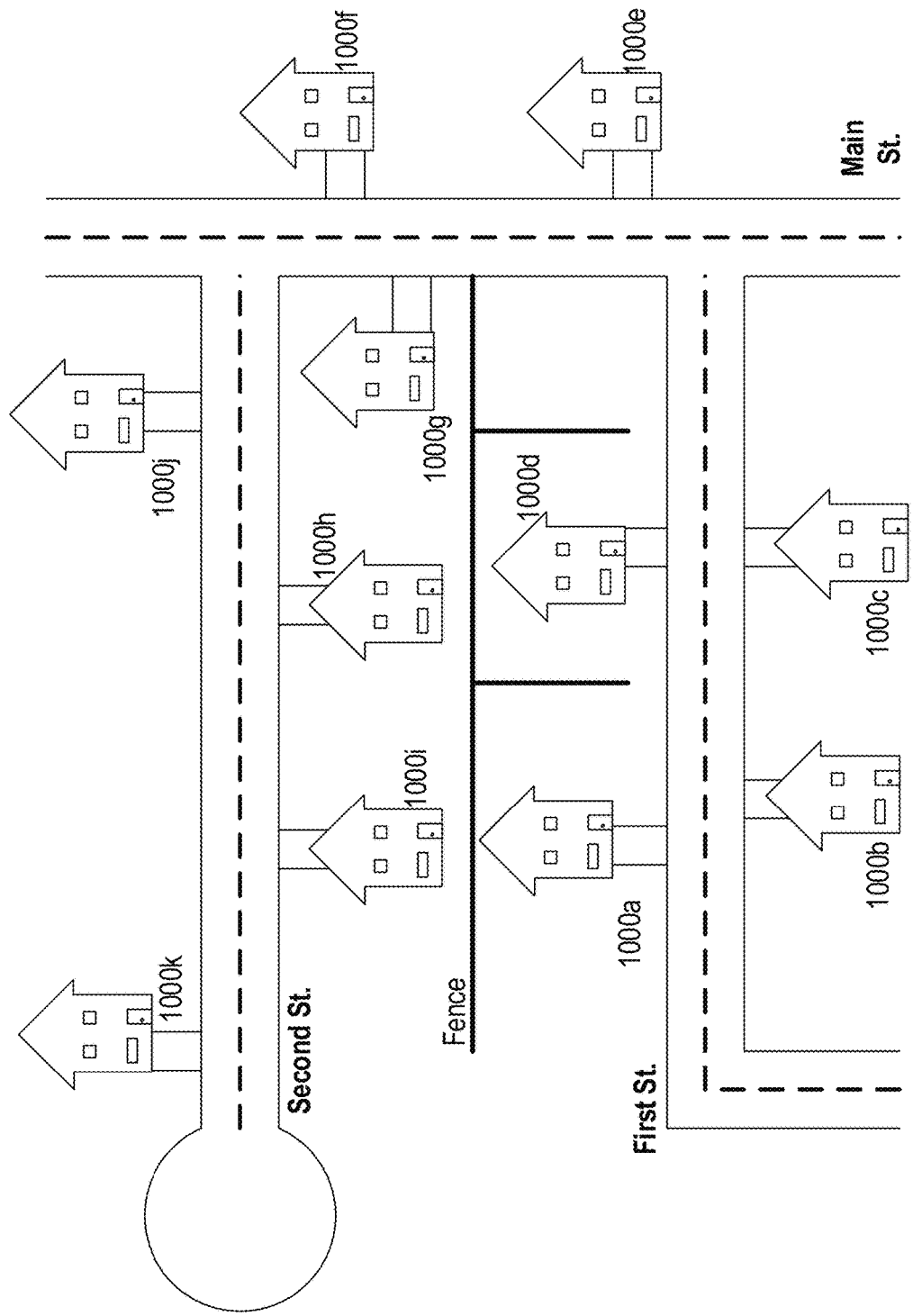
FIG. 7 is a schematic representation of various nearby serviceable point determinations in accordance with certain embodiments of the present invention.

For example, with reference to FIG. 7, the carrier server 100 may be configured to utilize historical information/data comprising information/data collected from one or more telematics devices on a vehicle and/or a user computing device carried by a delivery vehicle driver in determining which of the illustrated residences should be considered nearby. With reference to the illustrated embodiment of FIG. 7, the historical information/data may indicate that the serviceable points associated with residence 1000a and 1000d are approximately 100 meters apart, and thereby may determine that this distance is greater than a predefined threshold distance for associating addresses, and accordingly may indicate that these addresses are not considered nearby. However, the historical information/data may indicate that the serviceable points associated with residences 1000a and 1000b are only 20 meters apart, and accordingly may associate these addresses as nearby. Similarly, the historical information/data may indicate that the serviceable points associated with residences 1000d and 1000c are only 15 meters apart, and accordingly may indicate that these addresses are also considered nearby. Moreover, the historical information/data may indicate that, on average, the travel time between service points associated with residences 1000d and 1000c is approximately 35 seconds.

However, the historical information/data may indicate that the service points between 1000d and 1000h is only 35 meters, but may indicate that, on average, the travel time between 1000d and 1000h is 5 minutes, thus indicating that these serviceable points may not be considered nearby. Because a delivery vehicle operator is unable to walk over the fence separating residences 1000d and 1000h, these addresses are not considered nearby. As yet another example, the historical information/data may indicate that the travel time between addresses 1000j and 1000k may only be 55 seconds, but the distance between the serviceable points associated with these two addresses may be 400 meters, and accordingly the carrier server 100 may be configured to indicate that these two addresses are not considered nearby. Such examples were described in terms of distances that may be walked between various addresses to facilitate making a single "car stop" to deliver shipments/items to multiple serviceable points, however it should be understood that other distances and time considerations may be utilized to establish nearby addresses. For example, serviceable points associated with residences 1000i and 1000k may be determined to be 100 meters apart with an average travel time of 1:30 seconds therebetween, however the carrier server 100 may be configured such that these distances and travel times are within a predefined threshold indicating that these addresses are nearby.

The carrier server 100 can make these determinations on an area, route, stop, or driver basis. The carrier server 100 may receive some or all of the following for each serviceable point, stop, or other events of interest: the route number (e.g., 10A, 11C, 13B, the stop number (e.g., S1, S 2, S 3), the type of stop (e.g., delivery or "DL," pickup or "PU," return to building or "RTB," and/or the like), the distance from the previous stop (e.g., 0.5 miles), the distance to the next stop, the time when the driver begins the stop (e.g., 10:44:00), the time when the driver completes the stop (e.g., 10:54:00), the total time elapsed while executing the stop (e.g., 10.00 minutes), the time elapsed (e.g., walking time, driving time, combinations thereof, and/or the like) traveling from the previous stop (e.g., 2.00 minutes), the total time elapsed traveling from the previous stop and executing the current stop (e.g., 6.00 minutes), the amount of time the driver was on the property of a shipping hub during the time-to-stop period (e.g., 23.63 minutes), the amount of non-travel time to stop occurring between the completion of the previous stop and the beginning of the current stop (e.g., 5.85 minutes), the amount of pure travel time occurring between the completion of the previous stop and the beginning of the current stop (e.g., 45.37 minutes), the amount of lunch time occurring between the completion of the previous stop and beginning of the current stop (e.g., 30.00 minutes), the amount of driver-coded delay time occurring between the completion of the previous stop and the beginning of the current stop (e.g., 1.50 minutes), the total number of units, such as freight or shipments/items, picked up or delivered at the current stop (e.g., 3 units), and the total weight of freight or shipments/items picked up or delivered at the current stop. These features are described in greater detail in U.S. application Ser. No. 14/716,160, which is hereby incorporated herein in its entirety by reference.

In some implementations, the carrier computing entity 100 may receive shipment/item delivery information/data. In some implementations, the carrier computing entity 100 may receive updated shipment/item delivery information/data frequently. For example, carrier computing entity 100 may receive shipment/item delivery information/data updates hourly, daily, weekly, and/or monthly. In some implementations, the carrier server 100 may also receive information/data associated with serviceable points. For example, the carrier computing entity 100 may receive serviceable point information/data including street addresses, variation of the street addresses, residential commercial status, and consignee/recipient names for the addresses. For example, the address 123 SW 1st St, Suite 1A may be a variation of the address 123 Southwest 1st Street, Ste. 1A. In some implementations, an address may associated with one or more serviceable points. For example, Apt 1 and Apt 2 of 123 Main Street may be two different serviceable points located at the same address (123 Main Street). Similarly, in some implementations, a serviceable point may be associated with multiple street addresses. For example, 456 Central Avenue, Suite 1A and Suite 2A may share a single mailroom for deliveries. The above information/data may be used to establish or update established serviceable points. With the serviceable points established, relationships among the serviceable points can be established if they satisfy configurable time, distance, and/or time and distance thresholds. One or more serviceable points may be associated with one or more other serviceable points indicated as nearby serviceable points (e.g., as information/data stored in association with one or more serviceable point profiles).

In some implementations, the carrier server 100 may receive and/or fetch information/data specifying the distance and/or travel time (e.g., walking time, driving time, combinations thereof, and/or the like) between serviceable points. In some implementations, the carrier server 100 may match vehicle stops with serviceable point information/data. In one embodiment, the carrier server 100 may associate serviceable points with one another based the distances (e.g., GPS distance, map distance, actual traversed distance) between the serviceable points. Then, the carrier server 100 may determine whether the distance between two serviceable points satisfies a configurable distance threshold (e.g., 0.2 miles). For the pairings satisfying a configurable distance threshold, the carrier server 100 may determine whether the configurable travel time threshold (and/or configurable time elapsed between deliveries threshold) for the pairings is satisfied. In one embodiment, the carrier server 100 then associates serviceable points with one another based on the serviceable points satisfying the configurable distance threshold and the configurable travel time threshold (e.g., by storing information/data indicating that each serviceable point is considered a nearby serviceable point for the other in the corresponding serviceable point profiles). As will be recognized, additional thresholds associated with the information/data above may also be required for identifying one or more addresses as nearby addresses. However, in other embodiments, only the configurable distance threshold or the configurable travel time threshold (and/or configurable time elapsed between deliveries threshold) need be satisfied to associate serviceable points. As will be recognized, the configurable thresholds may be adjusted based on various information/data. For example, in response to determining that a driver had over a threshold number of deliveries (e.g., 19) and/or that the deliveries included shipments/items over a threshold weight (e.g., 100 lbs.), the carrier server 100 may adjust (e.g., relax or increase) the configurable travel time threshold (and/or configurable time elapsed between deliveries threshold).

In one embodiment, when two or more serviceable points are associated with each other, each serviceable point is considered a nearby serviceable point for the other. In such embodiments, the serviceable point profile may be associated with a single serviceable point (as described herein) and one or more child serviceable points may be considered nearby. The serviceable point corresponding to the serviceable point profile may be the center or the top level of a cluster/group for the serviceable point. For each serviceable point, depending on the embodiment, child serviceable points in the cluster/group satisfy the corresponding thresholds—the configurable distance threshold, the configurable travel time threshold (and/or configurable time elapsed between deliveries threshold), combinations thereof, and/or the like. information/data identifying serviceable points satisfying the corresponding thresholds are included in the serviceable point profile. As will be recognized, a given serviceable point may be a child in one serviceable point profile and may be associated with another serviceable point profile corresponding to the serviceable point. Similarly, a single serviceable point may be a child of multiple serviceable point profiles corresponding to different serviceable points. For example, in response to the carrier server 100 determining that 125 Main Street satisfies the time and distance thresholds of both the 123 Main Street and 126 Main Street serviceable point profiles, 125 Main Street may be associated as a child in each of the 123 Main Street and 126 Main Street serviceable point profile.

The process of associating one or more child serviceable points with a particular serviceable point profile may begin with receiving information/data associated with a first serviceable point and a second serviceable point. For example, the information/data may specify a location of the first serviceable point and the second serviceable point. In some implementations, the information/data may specify addresses, geocodes (e.g., longitudes and latitudes), street segments, street nodes, geographic coordinates, and/or spatial reference information/data associated with the first and second serviceable points. Geocoding (sometimes called forward geocoding) uses a description of a location, most typically a serviceable point or a name, to find geographic coordinates from spatial reference information/data such as building polygons, land parcels, street addresses, postal codes (e.g. ZIP codes). Geocodes may be associated with different geographical locations having different population densities, traffic densities, accessibility, road or street quality, and/or the like. Information/data may be stored in association with different geocodes. In one implementation, information/data may be stored in association with specific geocodes associated with a location and/or a geofence surrounding the location. For example, information/data specifying population and traffic density for the city of "Chicago" may be stored in association with geocodes for the city of "Chicago" and/or geofences surrounding the city of "Chicago" or surrounding a portion of the city of "Chicago." In some implementations, a geographical location type is stored in association with geocodes. For example, in one implementation, the geographical locations types may be super-rural, rural, suburban, urban and super-urban. These geographical types specify different traffic and population densities. For example, the urban and super-urban geographical location types may be respectively associated with cities having dense and very dense traffic and population. Similarly, the rural and super-rural geographical location types may be associated with a light and a very light density of population and traffic. Finally, the suburban geographical location type may be associated with an average density of traffic and population. In some implementations, the type of geographical location may be more granular. For example, some embodiments may have more than 5 types (e.g., 11 types) of geographical locations each specifying a measure of population and traffic density. In other implementations, the geographical locations types may be less granular (e.g., 2 types).

The process may continue with determining the geocodes and geographic location types with the corresponding serviceable points. In some implementations, the carrier server 100 may determine a geocode for the first serviceable point and a geocode the second serviceable point by simply accessing the received information/data. In some implementations, the carrier server 100 may access a database to determine a geocode for the first serviceable point and a geocode second serviceable point based on the first serviceable point and second serviceable point.

The process may continue with identifying, based on the determined geocodes, a geographic location type, a configurable distance threshold, and a configurable travel time threshold for identifying a serviceable point as nearby another serviceable point. For example, the carrier server 100 may determine based on a geocode for the location including the first and second serviceable points, that the location is a "rural" location. Similarly, the carrier server 100 may determine based on a geocode for the location including the first and second serviceable point, that the location is an "urban" location. The carrier server 100 may then access information/data specifying nearby grouping thresholds. For example, the carrier server 100 may access information/data shown in FIG. 9. The information/data may specify one or more thresholds for different areas based on geocodes. In some implementations, the thresholds include at least one threshold specifying a configurable distance threshold for clustering/grouping. In some implementations, the thresholds include at least one threshold specifying a configurable travel time threshold (and/or configurable time elapsed between deliveries threshold) for clustering/grouping. The thresholds may include a configurable travel time threshold for each travel method and/or configurable time elapsed between deliveries threshold. For example, one threshold may be for walking. A different threshold may be for driving.

With reference to FIG. 9, the "exact" (primary) serviceable point association level depicts thresholds set to a level where the delivery address location is essentially the serviceable point. The "vehicle stop" level depicts thresholds that are set for the situation where a delivery vehicle is parked and the driver is walking around to multiple proximate delivery serviceable points. Finally, the "Street Level" thresholds are for a delivery driver that may drive between serviceable points to make deliveries. For example, for a "vehicle stop" case at a "rural" area, the configurable travel time threshold (and/or configurable time elapsed between deliveries threshold) may be 60 seconds, and the configurable distance threshold may be 400 meters. However, for a "vehicle stop" case at an "urban" area, the configurable travel time threshold (and/or configurable time elapsed between deliveries threshold) may be 30 seconds, and the configurable distance threshold may be 50 meters. These thresholds may be customized for different types of geocodes and locations. FIG. 9 shows 4 different types of exemplary geographic location types. In some implementations, the type of serviceable points may be more granular. These thresholds may be customized to account for various population densities that impact vehicle stop distances and delivery times. For example, an apartment in Manhattan (super-urban type) will have different time and distance thresholds associated with its serviceable point cluster/group than a serviceable point for a farm in Nebraska (rural type). Similarly, the time and distance thresholds may be customized to account for the impact of the travel method associated with the delivery.

The process may in response to determining that a distance and a travel time between the first and second serviceable points satisfy the configurable time and configurable distance thresholds associate the first serviceable point and the second serviceable point such that each are considered nearby serviceable points. For example, with reference to the "urban," "vehicle stop" example above, the carrier computing entity may determine that travel time, between the first and second serviceable points, is less than 30 seconds and that the travel distance is less than 50 meters. In response to such determination the carrier computing entity may cluster/group the first and second serviceable point such that the first serviceable point is considered to be a nearby serviceable point for the second serviceable point, and vice versa. This indication may be stored as information/data associated with the serviceable point profile corresponding to each serviceable point. For example, information/data associated with the serviceable point profile corresponding to the first serviceable address may indicate that the second serviceable point is considered a nearby serviceable point, and vice versa.

In some implementations, the process may, optionally, continue with receiving information/data associated with a third serviceable point. The third address may be different from the first and second serviceable points. In response to determining that a distance and/or a travel time between the first and third serviceable points fail to satisfy the configurable time and configurable distance thresholds, the process may, optionally, continue without storing information/data associated with the serviceable address profile corresponding to the first serviceable point that the third serviceable point is considered a nearby address. In such instances, shipments/items scheduled to be delivered to the third serviceable point would not be considered stop creator shipments/items that may be utilized for synchronized delivery of shipments/items to be delivered to the first service point.

As discussed herein, the carrier server 100 may be configured to identify nearby serviceable points satisfying one or more time and/or distance thresholds in real time and/or after receiving information/data indicative of a shipment/item scheduled to be delivered to a particular destination serviceable point, or information/data indicative of nearby serviceable points, including those serviceable points satisfying one or more time and/or distance thresholds with the destination serviceable point, may be stored in a serviceable point profile associated with the destination serviceable point.

In various embodiments, the carrier server 100 may be configured to store data indicative of a plurality of serviceable points satisfying time and/or distance thresholds relative to one another in association with one or more cluster profiles. Each cluster profile may be stored (e.g., in a database in communication with the carrier server 100) and may comprise data identifying those serviceable points satisfying time and/or distance thresholds relative to one another. For example, all those serviceable points determined to satisfy one or more time and/or distance thresholds may be identified to be within a single cluster associated with a corresponding cluster profile. In such embodiments, upon receipt of shipping information corresponding to one or more shipments/items, the carrier server 100 may be configured to compare the destination serviceable point associated with the shipment/item against data stored in association with one or more cluster profiles to identify other serviceable points associated with a common cluster as the destination serviceable point. Upon identifying a cluster comprising the destination serviceable point, the carrier server 100 may identify other serviceable points associated with the cluster, and may determine whether stop creator shipments/items are scheduled to be delivered to these other serviceable points, as described herein.

In some implementations, the process may, optionally, receive information/data specifying a method of travel between the first and second serviceable points during deliveries, wherein identifying the second threshold is further based on the received information/data. As described above, the process may receive information/data specifying a method of travel between the first and second serviceable points. In some implementations, the received information/data may be used to determine the configurable time and configurable distance thresholds. For example, as described with reference to step and FIG. 9, the received information/data may be used to determine a method of travel used by the delivery personnel and, in turn, identify a threshold based on the determined method of travel. In some implementations, the method of travel may be determined using a location-determining device used by the delivery personnel. In other implementations, the method of travel may be determined using a location-determining device positioned on a delivery vehicle used by the delivery personnel.

Moreover, in various embodiments, the system may additionally be configured to identify one or more optimal park positions for servicing one or more serviceable points. In various embodiments, the optimal park position may be based upon a determination that a particular vehicle operator is scheduled to visit two or more associated serviceable points on a single day. Such configuration may be particularly useful in instances in which determined nearby serviceable points are within a predetermined distance threshold determined to be within "walking distance" (e.g., within 10 meters, within 30 meters, within 50 meters, and/or the like). Upon determining that a delivery vehicle operator is scheduled to visit two or more associated serviceable points within walking distance of one another, the system may identify an optimal park position for parking the vehicle in order to service all of the grouped serviceable points without needing to move the vehicle. In such embodiments, the optimal park position may be identified with consideration of the amount of estimated cost involved in moving the vehicle to separate park positions to service each of the associated serviceable points (e.g., the cost in fuel to start and move the vehicle; the cost of the vehicle operator's time to get into the vehicle, buckle his or her seat belt, turn on the vehicle, drive the vehicle; and/or the like); and the estimated cost of having the vehicle operator walk between serviceable points (e.g., the cost of the drivers' time to walk from the vehicle, to each serviceable point, and to return to the vehicle). Accordingly, in various embodiments, the system may identify an optimal park position from which all of the associated serviceable points are within the predefined walking distance from the vehicle. In various embodiments, the optimal park position may be determined based on historical telematics data obtained during historical vehicle trips. The carrier system 100 may then inform the driver (e.g., via a message sent to the driver's portable computing device) where the optimal park position is located. In certain embodiments, the carrier system 100 may be configured to inform the driver (e.g., via a message sent to the driver's portable computing device) in advance of the driver arriving at a location to deliver shipments/items to the identified serviceable points. For example, the carrier system 100 may provide an advance alert to the driver upon the driver being within a predefined distance threshold of the stop, within a predefined time threshold of reaching the stop, within a predefined number of stop prior to arriving at the stop, and/or the like. For example, the carrier server 100 may be configured to generate and transmit an alert to the driver when the driver is less than 1 minute away from reaching the stop to service multiple serviceable points from an optimal park position. In various embodiments, the alert provides an indication of the location of the determined optimal park position. In various embodiments, the indication of the location of the determined optimal park position may be given in reference to one or more landmarks (e.g., park next to the mailbox of 123 Main St.), GPS coordinates, or relative to the location of the vehicle (e.g., advance forward 50 feet and right 10 feet).

In various embodiments, the carrier system 100 may be configured to provide an alert to the driver indicating that multiple shipments/items are scheduled to be delivered to multiple nearby serviceable points that may be accessed without moving a delivery vehicle. The alert may not indicate an optimal park position, but may instead provide the driver with advance notice to seek out an optimal park position to minimize the amount of out-of-vehicle (e.g., walking) travel necessary to reach each of the multiple serviceable points without moving the vehicle.

5. Synchronizing Delivery of Nearby Shipments/Items within Areas Satisfying Delivery Density Thresholds Shipments/items scheduled to be delivered to an area satisfying a delivery density threshold (e.g., areas having a low delivery density) may be synchronized to minimize the distance travelled by a delivery vehicle in delivering the shipments. Accordingly, the one or more carrier servers 100 may be configured to identify areas and/or streets having a delivery-density satisfying a threshold (e.g., below a threshold value), such that shipments/items scheduled to be delivered within the identified delivery-density areas and/or along the identified delivery-density streets may be synchronized. Such determinations may be based at least in part on an analysis of historical information/data indicative of historical delivery stops occurring within a particular area. In various embodiments, the delivery density threshold may comprise a maximum delivery density (e.g., a maximum average number of deliveries per week), a minimum delivery density (e.g., a minimum average number of deliveries per week), a desired range of delivery density values (e.g., between a maximum and a minimum average number of deliveries per week), and/or the like.

Figure 10:
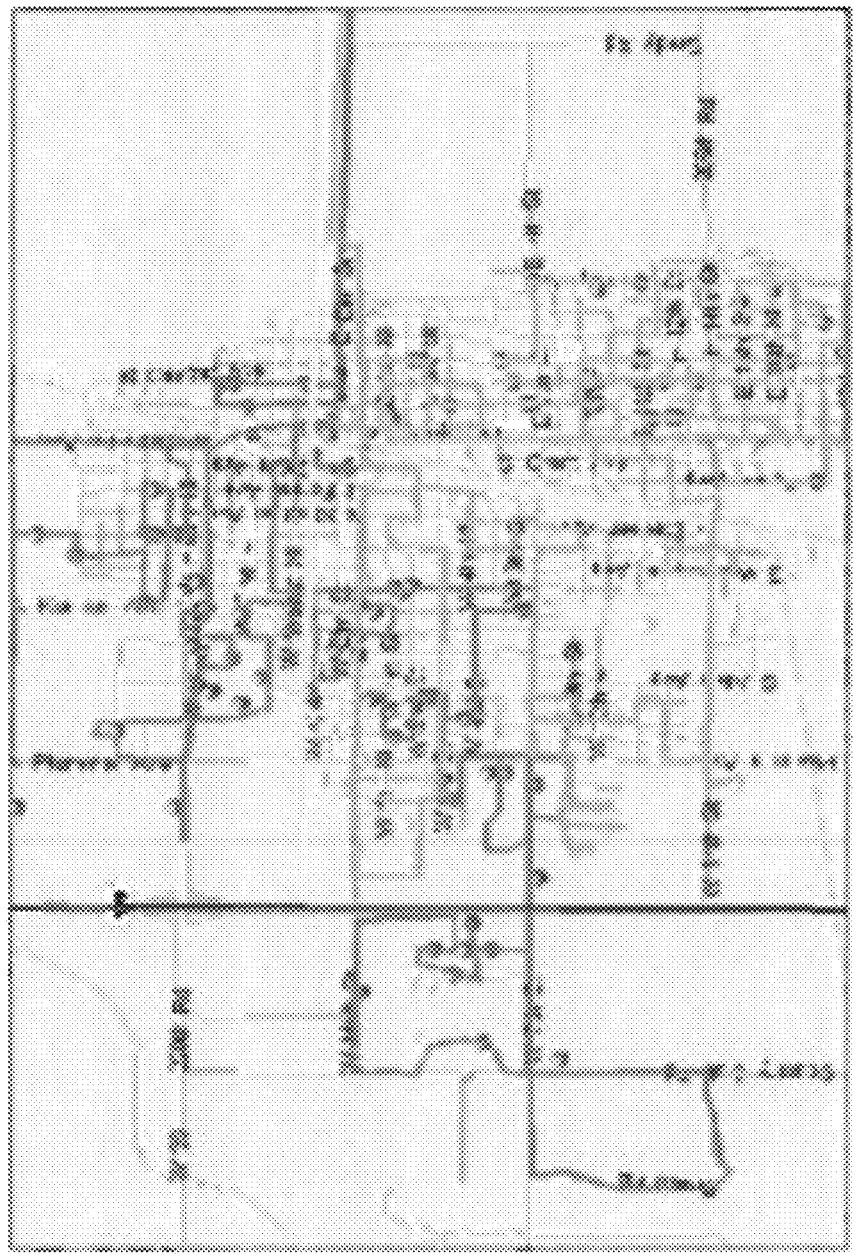
FIG. 10 is a graphical display of an example information/data set illustrating various vehicle travel paths in accordance with certain embodiments of the present invention.

With reference to FIG. 10, which illustrates a graphical map of vehicle travel paths through a particular town, certain of the street segments may not be traversed by a delivery vehicle during normal delivery operations. With information/data similar to that shown in FIG. 6 collected over a period of time, the carrier server 100 may be configured to identify those areas, street segments, and/or the like on which delivery vehicles rarely travel (e.g., less than a predefined threshold frequency, such as once per week) and/or areas, street segments, and/or the like on which delivery vehicles travel often (e.g., more than a predefined threshold frequency, such as one or more times per day). As discussed herein, the carrier server 100 may be configured to identify areas and/or street segments which a delivery vehicle travels less than a predefined threshold frequency level (e.g., less than 4 times per week). By reviewing information/data indicative of the location of historical vehicle stops (e.g., corresponding to deliveries and/or pickups at one or more serviceable points) and information/data indicative of vehicle travel paths as shown in FIG. 10, the carrier server 100 may be configured to determine a frequency with which a vehicle travels on a particular area and/or on a particular street segment.

In various embodiments, the carrier server 100 may be configured to determine the frequency with which a delivery vehicle travels to a particular area. In various embodiments, the particular area may be defined as an area within a geofenced area, a particular street, a particular street segment (e.g., within a particular street block, and/or as defined by other street segment identifiers, as discussed in greater detail herein), associated with a common geographical descriptor, and/or the like. Based at least in part on this historical data, the carrier server 100 determines the frequency with which a delivery vehicle travels to the particular area in order to classify the particular area as a "low density" area, a "medium density" area, a "high density" area, and/or the like. The frequency with which a delivery vehicle travels to a particular area may be expressed in terms of the number of instances in which one or more vehicles travels to the area over a given time period (e.g., 4 times per week; 1 time per day; and/or the like). Such classification may be made by comparing the frequency with which a particular delivery vehicle visits the particular area against a threshold density value. Upon a determination that the frequency with which a particular delivery vehicle visits the particular area satisfies the threshold density value (e.g., is below the threshold value), the carrier server 100 may be configured to classify the particular area, for example, as a "low density" area. The carrier server 100 may similarly be configured to classify areas that are visited with a frequency greater than or equal to the threshold density value as being "high density" areas. Moreover, such classification may be made generally for a particular area, and/or may be made for one or more periods of time (e.g., each month, each quarter year, and/or the like). For example, a particular area may be classified as a low density area for August, but a high density area for December.

As a non-limiting example, the threshold density value may indicate that areas for which a delivery vehicle historically travels to at least 4 times per week on average are considered high density areas, and areas for which a delivery vehicle travels to no more than 3 times per week on average are considered low density areas. Thus, for example, streets that are traveled by delivery vehicles less than 3 times per week (e.g., on three or fewer days per week) may be considered low density delivery streets, while all other streets may be considered high density delivery streets. However, it should be understood that any threshold density value may be used and that there may be more than two density classifications (e.g., a low density classification, a medium density classification, a high density classification, a very high density classification, and/or the like).

In various embodiments, the density determination may be made based on the number of times a carrier vehicle visits and/or traverses the area during a particular time period. For example, a particular street may be considered a low-density street if shipments/items are only delivered to destination serviceable points located along the particular street less than a threshold number of times each week, each month, and/or the like. However, in various embodiments, the carrier server 100 may be configured to identify a street as a high density street if one or more delivery vehicles travel along the particular street more than a predetermined number of times during a particular time period, even if no shipments/items are delivered. As a specific example, a particular delivery vehicle may travel along First Street every day when leaving from a vehicle hub facility to begin delivering shipments/items each day, but may only deliver shipments/items to addresses along First Street, on average, one time per week. Although deliveries are relatively rarely scheduled to be delivered to addresses along First Street, First Street may still be considered a high density street because the delivery vehicle travels along First Street every day.

Delivery addresses may be grouped into one or more delivery areas each having a particular density classification. For example, 123 Main St. Atlanta, Ga. 30309 may be grouped with other delivery addresses along Main St., which itself may be classified as a low density delivery street. As yet another example, several serviceable points that may be within a single neighborhood, nearby neighborhoods, along a single street, along intersecting streets, and/or the like, may be grouped within a single delivery area upon a determination that the delivery density to the area satisfy a particular threshold. In various embodiments, a determination of whether a particular delivery address is within a high density area or a low density area may be made in real time upon receipt of information/data indicating that a particular shipment/item is scheduled to be delivered to the particular delivery address, and/or may be made and stored in an address profile corresponding to each delivery address.

Upon a determination that a particular delivery address is grouped into an area satisfying various thresholds (e.g., upon determining that the delivery address is grouped into a high density delivery area), the carrier server 100 may be configured to schedule delivery of any shipments/items to the particular delivery address without attempting to synchronize delivery with other shipments/items to be delivered within the area (e.g., by offering incentives to one or more shippers/consignors). For example, because a delivery vehicle is scheduled to visit addresses within high density areas often, there may be little potential cost savings accrued from attempting to synchronize delivery with other shipments/items to be delivered within the same high density area.

Upon a determination that a particular delivery address is grouped into an area satisfying another threshold (e.g., upon a determination that the delivery address is grouped into a low density delivery area), the carrier server 100 may be configured to attempt to synchronize delivery with other shipments/items scheduled to be delivered within the same area. For example, the carrier server 100 may be configured to search (e.g., within a shipment/item level detail database) for other shipments/items (e.g., stop creator shipments) scheduled to be delivered to addresses within the same low density delivery area. Upon identifying one or more stop creator shipments/items scheduled to be delivered to an address within the same low density delivery area, the carrier server 100 may be configured to modify the delivery information/data for the particular shipment/item such that the particular shipment/item is scheduled to be delivered on the same delivery day as the stop creator shipment/item. Thus, the carrier need only make a single trip to the low density delivery area (e.g., travel down the low density delivery street) in a particular time period while delivering two shipments. Thus, the carrier may save the expenses associated with making a second trip to the low density delivery area to deliver the second shipment/item.

As discussed herein, a determination of the travel density within one or more areas may be made based at least in part on a determination of the frequency with which shipments/items are historically delivered within each or the one or more areas, and/or based at least in part on a determination of the frequency a particular vehicle travels along and/or through a particular area. Each of these determinations are discussed in greater detail in reference to FIGS. 11A-11B.

In various embodiments, the carrier server 100 may be configured to determine whether a serviceable point is within a high density or a low density area, and to identify other serviceable points within the same high density or low density area in real time and/or after receiving information/data indicative of a shipment/item scheduled to be delivered to a particular destination serviceable point, or information/data indicative of whether the particular destination serviceable point is within a high density or a low density area, and indicative of other serviceable points within the same high density or low density area may be stored in a serviceable point profile associated with the destination serviceable point.

In various embodiments, the carrier server 100 may be configured to store data indicative of a plurality of serviceable points within a single high density or low density area in association with one or more cluster profiles. Each cluster profile may be stored (e.g., in a database in communication with the carrier server 100) and may comprise data identifying those serviceable points within the area, as well as data indicating whether the area is a high density or a low density area. For example, all those serviceable points determined to be within a single low density area may be identified to be within a single cluster associated with a corresponding cluster profile which additionally indicates that the serviceable points are within a low density area. In such embodiments, upon receipt of shipping information corresponding to one or more shipments/items, the carrier server 100 may be configured to compare the destination serviceable point associated with the shipment/item against data stored in association with one or more cluster profiles to identify other serviceable points associated with a common cluster as the destination serviceable point and to determine whether the serviceable point is within a high density or a low density area. Upon identifying a cluster comprising the destination serviceable point, the carrier server 100 may identify other serviceable points associated with the cluster, and may determine whether stop creator shipments/items are scheduled to be delivered to these other serviceable points, as described herein.

1. Identifying Street Segments and/or Areas Satisfying Delivery Density Thresholds With reference initially to FIG. 11A, various embodiments are configured to identify particular street segments and/or geographical areas (e.g., particular proximity zones/areas identified in accordance with one or more of the methods described herein) satisfying one or more delivery density thresholds. In various embodiments, the carrier system 100 is configured to identify areas to which deliveries are commonly made, areas to which deliveries are rarely made, and/or the like. For example, various embodiments are configured to identify particular street segments and/or geographical areas to which deliveries or shipments/items are rarely made, such that multiple shipments/items scheduled to be delivered to a common low delivery density street segment or area may be synchronized in order to minimize the number of delivery-related trips made to the street segment and/or area.

Figure 11A:
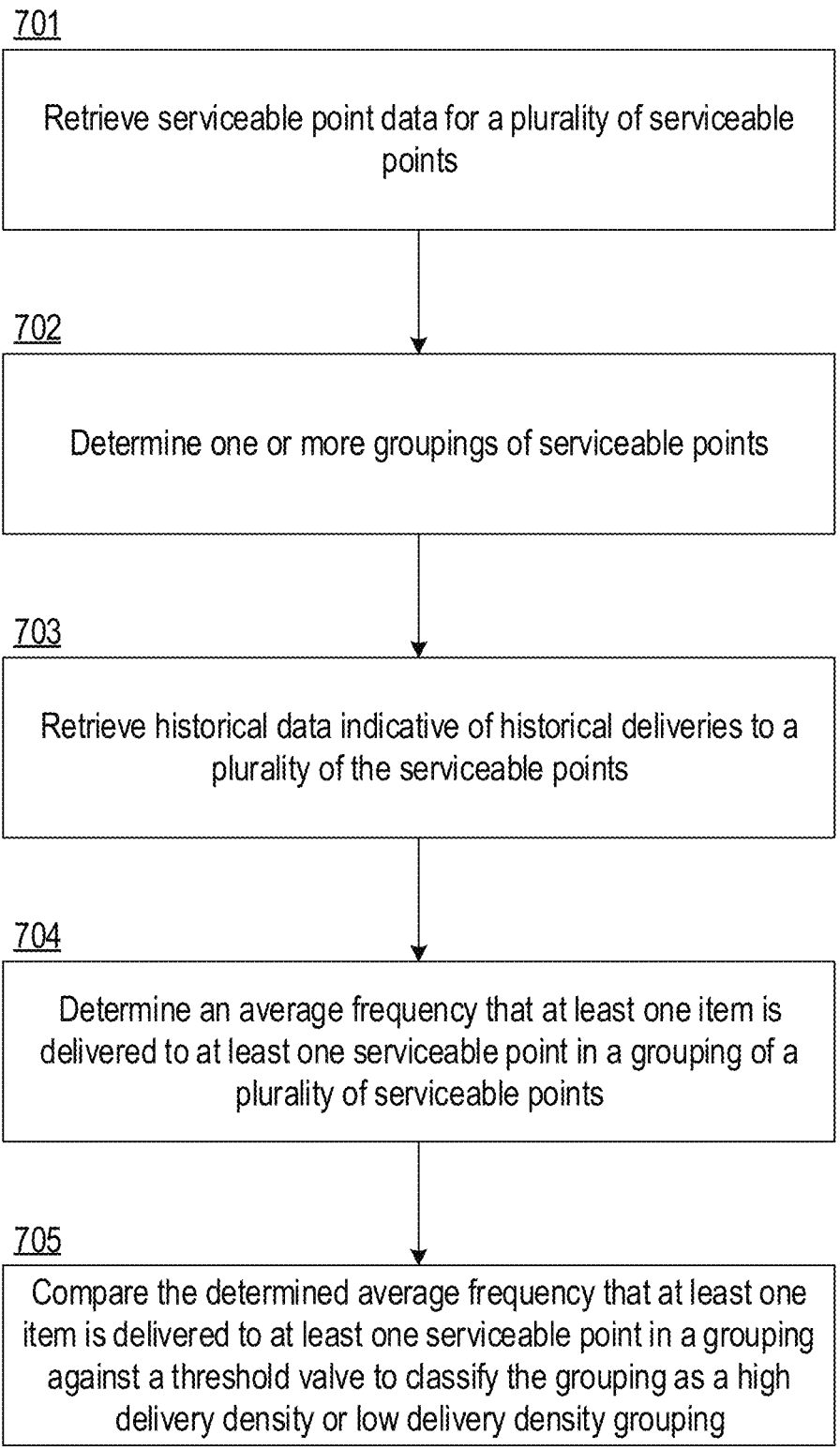
FIGS. 11A-11B are flow charts of example methods for identifying low-density areas in accordance with certain embodiments of the present invention.

As shown in FIG. 11A, the carrier server may be configured to retrieve serviceable point information/data for a plurality of serviceable points, as shown at Block 701. The serviceable point information/data for the plurality of serviceable points may be retrieved, for example, from serviceable point profiles stored within a serviceable point profile management database. In various embodiments, the retrieved serviceable point information/data may comprise information/data indicative of the location of the serviceable point (e.g., street address, city, state, zip code, neighborhood, building, and/or the like). As indicated at Block 702, the carrier server 100 may be configured to determine one or more groupings of serviceable points for which serviceable point information/data has been retrieved. In various embodiments, the groupings of serviceable points, as discussed herein, may be serviceable points indicated as "nearby" according to one or more of the methods described herein. For example, serviceable points within a defined proximity zone/area, identified as nearby based on time and/or distance between multiple serviceable points, sharing one or more common attributes, along a particular street segment, and/or the like, may be identified as grouped. In various embodiments, the nearby serviceable points may be indicated as a portion of the serviceable point information/data retrieved by the carrier server 100 (e.g., as stored in serviceable point profiles corresponding to serviceable points).

As indicated at Block 703 of FIG. 11A, the carrier server 100 may retrieve historical information/data indicative of historical deliveries of shipments/items to a plurality of the serviceable points. The historical information/data may be indicative of the dates each of a plurality of historical shipments/items were delivered, and the delivery destination of each of these historical shipments/items. The delivery destinations corresponding to each historical shipment/item correspond to serviceable points for which the carrier server 100 retrieved serviceable point data.

Based at least in part on the historical information/data and the identified groupings of serviceable points, the carrier server 100 may be configured to determine a frequency with which at least one item is delivered to at least one serviceable point of one or more groupings of serviceable points. In various embodiments, the carrier server 100 compares the historical information/data against the identified groupings of serviceable points to identify the days on which at least one shipment/item was delivered to at least one serviceable point within the grouping. The carrier server 100 may then be configured to determine an average frequency with which shipments/items are historically delivered to each grouping based on the determined number of days on which shipments/items were historically delivered to at least one serviceable point within the grouping, as shown at Block 704. For example, the carrier server 100 may identify the average number of days per given time period (e.g., average number of days per week, average number of days per month, and/or the like) on which shipments/items have been delivered to at least one serviceable point within each cluster.

As shown at Block 705, the carrier server 100 may then be configured to compare the determined frequency with which at least one shipment/item has historically been delivered to at least one serviceable point within a grouping against a threshold valve to classify the grouping as either a high delivery density grouping or a low delivery density grouping. In various embodiments, upon a determination that the determined average frequency with which at least one shipment/item is historically delivered to at least one serviceable point within the grouping is less than the threshold valve, the carrier server 100 may be configured to classify the grouping as a low delivery density grouping. Likewise, upon a determination that the determined frequency with which at least one shipment/item is delivered to at least one serviceable point within the grouping is greater than or equal to the threshold value, the carrier server 100 may be configured to classify the grouping as a high delivery density grouping. In various embodiments, more than two classifications may be provided, and accordingly the carrier server 100 may be configured to classify the grouping into one of several classifications based upon a determination that the delivery frequency satisfies one or more thresholds corresponding to each of the several classifications.

As discussed herein, the classification of a grouping (and the serviceable points associated therewith) as being either a high delivery density area or a low delivery density area may be utilized to determine whether shipments/items scheduled to be delivered to a serviceable point with the grouping are eligible for synchronized delivery. In various embodiments, the carrier server 100 may be configured to identify groupings as eligible for synchronized delivery based at least in part on the determined classification. As non-limiting examples, the carrier server 100 may be configured to identify low-delivery density areas as eligible for synchronized delivery, high-delivery density areas as eligible for synchronized delivery, medium-delivery density areas as eligible for synchronized delivery, and/or the like. In various embodiments, the carrier server 100 may be configured to determine that certain areas are excluded from eligibility for synchronized delivery based at least in part on the determine classification. As non-limiting examples, the carrier server 100 may be configured to identify high-delivery density areas as ineligible for synchronized delivery, medium-delivery density areas as ineligible for synchronized delivery, low-delivery density areas as ineligible for synchronized delivery, and/or the like. In various embodiments, the carrier server 100 may be configured to identify all areas as one of either eligible for synchronized delivery or ineligible for synchronized delivery. For example, all low-delivery density areas may be indicated as eligible for synchronized delivery while all high-delivery density areas are indicated as ineligible for synchronized delivery, or vice-versa. As a specific example, upon a determination that a grouping is classified as a high delivery density grouping, the carrier server 100 may indicate that shipments/items scheduled to be delivered to serviceable points associated with the high-delivery density grouping are not eligible for synchronized delivery.

However, upon a determination that a shipment/item is scheduled to be delivered to a serviceable point within a low-delivery density grouping, the carrier server 100 may indicate that the shipment/item is eligible for synchronized delivery. Accordingly, as discussed herein, the carrier server 100 may be configured to identify other serviceable points within the same low-delivery density grouping, and to search for stop creator shipments scheduled to be delivered to one or more of the other serviceable points within the low delivery density grouping. In various embodiments, searching for and identifying stop creator shipments scheduled to be delivered to one or more serviceable points within the low delivery density area may be identified in accordance with those methodologies described herein. Upon identifying one or more stop creator shipments, the carrier server 100 may be configured to modify shipment/item information/data associated with the shipment/item scheduled to be delivered to a serviceable point within the low delivery density area to reflect an updated delivery date to synchronize delivery of the shipment/item with the delivery of the stop creator shipment, in order to minimize the number of times a vehicle needs to visit the low delivery density area to make multiple deliveries of shipments/items.

As a specific example with reference again to FIG. 7, the carrier server 100 may retrieve historical information/data and determine that shipments/items have historically been delivered to serviceable points along Main St. between First St. and Second St. (e.g., serviceable points 1000e, 1000f, and 1000g) on average on 1.2 days per week. The carrier server 100 may compare this value against a threshold value of, for example 3 days/week in order to classify this segment of Main St. as a low delivery density street segment. Accordingly, upon receipt of a shipment/item scheduled to be delivered to a serviceable point along this identified low delivery density street segment, the carrier server 100 may identify this shipment/item as eligible for synchronized delivery, and accordingly may search for stop creator shipments with which to synchronize delivery of the received shipment/item.

Moreover, in various embodiments the above described method for identifying low delivery density areas and/or street segments may be provided for a particular time period, for a particular recurring time period (e.g., the month of July, determined annually), and/or the like. For example, the carrier server 100 may be configured to identify a particular area as a low delivery density area during certain times during the year (e.g., the month of July) and may identify the same area as a high delivery density area during other times during the year (e.g., the month of December). Accordingly, a determination of whether a particular area is considered a low delivery density area or a high delivery density area may be based at least in part on the scheduled date that the shipment/item was received and/or scheduled for delivery.

2. Identifying Street Segments and/or Areas Satisfying Travel Density Thresholds Referring now to FIG. 11B, various embodiments are configured to identify particular street segments and/or geographical areas (e.g., particular proximity zones/areas identified in accordance with one or more of the methods described herein) that satisfy one or more travel density thresholds. For example, various embodiments are configured to identify particular street segments and/or geographical areas as low travel density areas and/or high travel density areas, such that deliveries of shipments/items requiring a vehicle to travel through an area satisfying a particular threshold level (e.g., an identified low travel density area) may be consolidated to minimize the number of trips a vehicle is required to through the area.

Figure 11B:
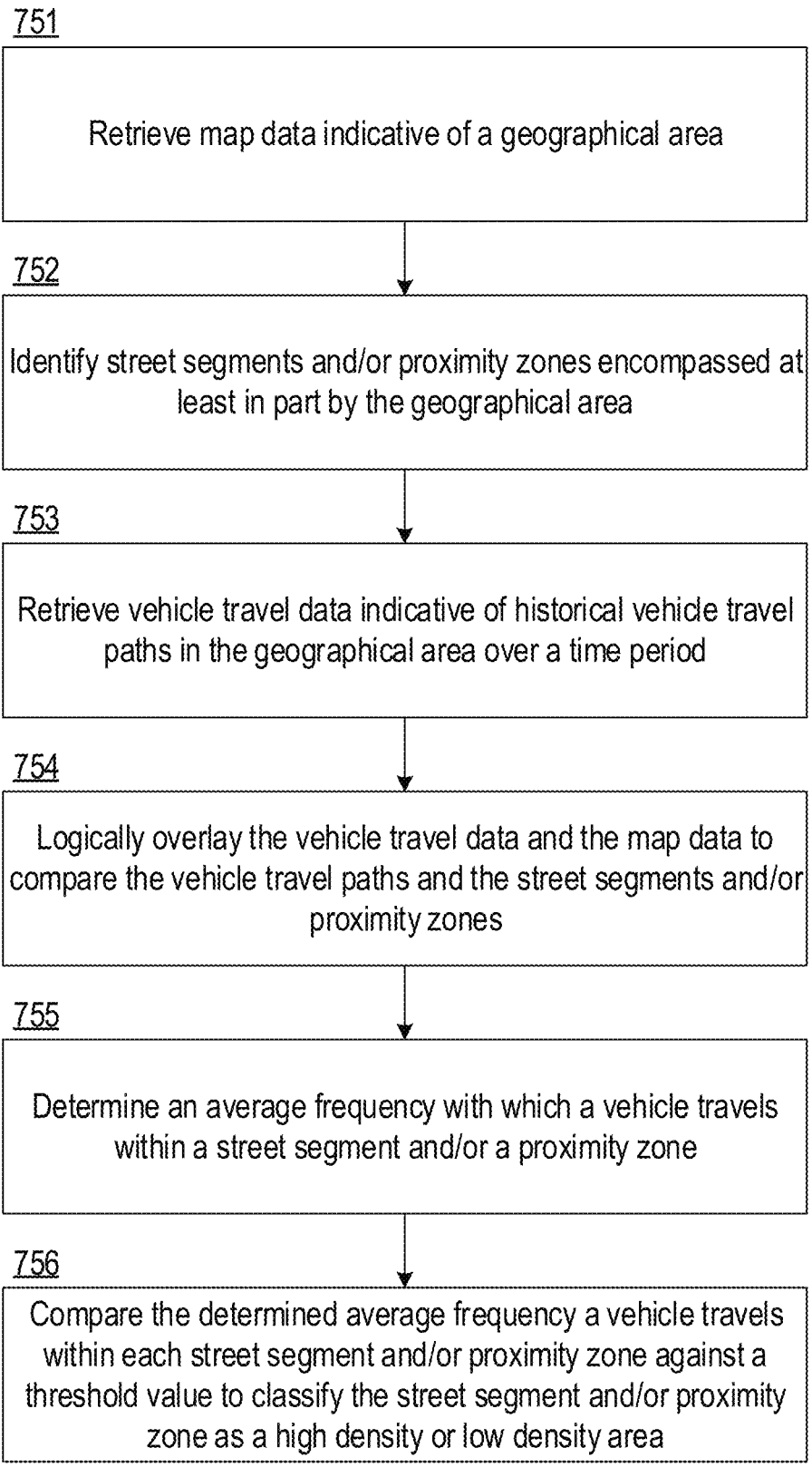

As shown in FIG. 11B, the carrier server retrieves map information/data indicative of a geographical area, as shown at Block 751. In various embodiments, the map information/data may be indicative of the locations of various streets, proximity zones/areas, serviceable points, and/or the like existing within the particular geographical area. Based at least in part on the map data, the carrier server 100 may be configured to identify one or more street segments and/or proximity zones/areas at least in part encompassed by the geographical area associated with the retrieved map data. For example, the carrier server 100 may be configured to identify the locations of particular street segments, the locations of the proximity zones/areas, and/or the like at Block 752.

The carrier server 100 may additionally be configured for retrieving vehicle travel information/data indicative of historical vehicle travel paths for one or more vehicles through the geographic area associated with the map data. In various embodiments, the vehicle travel information/data may comprise a plurality of information/data points generated while each of a plurality of vehicles were travelling along an assigned route. Each information/data point may correspond to a determined instantaneous location of the corresponding vehicle at the time the information/data point was recorded. In various embodiments, each of the plurality of information/data points may be recorded by a location determining device located on the vehicle. Each information/data point may comprise location information/data indicative of the instantaneous location of the vehicle, time stamp information/data indicative of the time the information/data point was generated, and/or vehicle identifier information/data indicative of the corresponding vehicle for which the information/data point was generated. The carrier server 100 may be configured to link consecutively generated information/data points for each vehicle to provide a trace of a historical vehicle travel path. In various embodiments, the carrier server 100 may provide a separate trace for each vehicle and for each day. Thus, each trace may be indicative of the path a particular vehicle traveled on a particular day.

At block 754, the carrier server 100 may be configured to logically overlay the vehicle travel information/data and the map information/data to compare the locations of the historical travel paths against the locations of the identified street segments and/or proximity zones/areas as shown at Block 754. As previously indicated, the vehicle travel information/data may be segmented in to a plurality of traces each indicative of a vehicle's travel path during a particular day. Thus, by logically overlaying the map information/data and the vehicle travel data, the carrier server 100 may be configured to identify common portions of vehicle travel paths existing within multiple traces, and may correlate these common portions of vehicle travel path against the map data. Similarly, the carrier server 100 may be configured to identify particular street segments and/or proximity zones/areas that are rarely and/or never visited by delivery vehicles.

As shown at Block 755, the carrier server 100 may be configured to identify a frequency with which a vehicle travels within each of a plurality of identified street segments and/or proximity zones/areas based on the logical overlay of the vehicle travel information/data and the map data. In various embodiments, the carrier server 100 may be configured to determine the number of times that a vehicle travels along at least a portion of each street segment and/or proximity zone/area based on the number of vehicle traces corresponding to the particular vehicle that are within the street segment and/or proximity zone. This determination may be made on an overall basis (e.g., the total number of times the vehicle traveled along at least a portion of the street segment and/or the proximity zone/area as reflected by the retrieved vehicle travel data) and/or may be made for various recurring and/or non-recurring time periods (e.g., the total number of times a vehicle traveled along at least a portion of the street segment and/or the proximity zone/area per week, as reflected by the retrieved vehicle travel data). Moreover, in various embodiments, the carrier server 100 may be configured to determine the number of days that the vehicle traveled along at least a portion of the street segment and/or the proximity zone/area, such that days on which the vehicle traveled along at least a portion of the street segment and/or proximity zone/area on multiple occasions are only counted as a single day on which the vehicle traveled along at least a portion of the street segment and/or proximity zone.

Based on the number of days on which the vehicle travels along at least a portion of the street segment and/or the proximity zone/area, the carrier server 100 may determine an average frequency with which the vehicle travels within the street segment and/or the proximity zone/area, as indicated at Block 755. In various embodiments, the frequency may be determined as a number of days over a given recurring time period that the vehicle historically travels within the street segment and/or the proximity zone/area (e.g., an average number of days per week that the vehicle travels within the street segment and/or proximity zone). Moreover, this frequency determination may be reflective of an overall frequency, and/or may be reflective of a frequency during one or more time periods. For example, the frequency determination may be made for various recurring annual time periods (e.g., a different frequency determination may be made for the month of December as compared to other months during the year).

Referring again to FIG. 11B, the carrier server 100 may be configured to compare the determined frequency with which the vehicle travels within the street segment and/or the proximity zone/area against a threshold value to classify the street segment and/or the proximity zone/area as a high travel density area, a low travel density area, and/or the like.

As discussed herein, the classification of a street segment and/or a proximity zone/area, for example, as a high travel density area or a low travel density area (or other classifications), may be utilized to determine whether shipments/items scheduled to be delivered to a serviceable point within the area are eligible for synchronized delivery. For example, upon a determination that the area is classified as a high travel density area, the carrier server 100 may indicate that shipments/items scheduled to be delivered to serviceable points associated with the high travel density areas are not eligible for synchronized delivery. Such determination of eligibility for synchronized delivery may be provided similar to that described above in relation to classifications based on delivery density.

However, upon a determination that a shipment/item is scheduled to be delivered to a serviceable point within a low travel density area, the carrier server 100 may indicate that the shipment/item is eligible for synchronized delivery. Accordingly, as discussed herein, the carrier server 100 may be configured to identify other serviceable points within the same low travel density area, and to search for stop creator shipments scheduled to be delivered to one or more of the other serviceable points within the low travel density area. In various embodiments, searching for and identifying stop creator shipments scheduled to be delivered to one or more serviceable points within the low travel density area may be identified in accordance with those methodologies described herein. Upon identifying one or more stop creator shipments, the carrier server 100 may be configured to modify shipment/item information/data associated with the shipment/item scheduled to be delivered to a serviceable point within the low travel density area to reflect an updated delivery date to synchronize delivery of the shipment/item with the delivery of the stop creator shipment, in order to minimize the number of times a vehicle needs to visit the low travel density area to make multiple deliveries of shipments/items.

As a specific example with reference again to FIG. 7, the carrier server 100 may retrieve historical information/data and determine that vehicles only travel along the portion of Main St. between First St. and Second St. on average, 2 days per week. The carrier server 100 may compare this value against a threshold value of, for example, 3 days/week in order to classify this segment of Main St. as a low travel density street segment. Accordingly, upon receipt of shipment/item information/data corresponding to a shipment/item scheduled to be delivered to a serviceable point along this low travel density street segment (e.g., serviceable points 1000e, 1000f, and 1000g), the carrier server 100 may identify this shipment/item as eligible for synchronized delivery, and accordingly may search for stop creator shipments with which to synchronize delivery of the received shipment/item.

Moreover, in various embodiments the above described method for identifying low travel density areas and/or street segments may be provided for a particular time period, for a particular recurring time period (e.g., the month of July, determined annually), and/or the like. For example, the carrier server 100 may be configured to identify a particular area as a low travel density area during certain times during the year (e.g., the month of July) and may identify the same area as a high travel density area during other times during the year (e.g., the month of December). Accordingly, a determination of whether a particular area is considered a low travel density area or a high travel density area may be based at least in part on the scheduled date that the shipment/item was received and/or scheduled for delivery.

c. Incentives Based on Historical Data

As noted, the one or more carrier servers 100 may analyze historical information/data related to some or all of the serviceable points serviced by a carrier. Such analysis may determine whether synchronized delivery is possible for shipments/items scheduled to be delivered to one or more serviceable points. As noted, in various embodiments, upon a determination that synchronized delivery is possible for shipments/items scheduled to be delivered to a particular serviceable point, the carrier server 100 may determine whether one or more incentives may be offered for deliveries to the specific serviceable point. In some embodiments, the one or more carrier servers 100 may populate (e.g., via the Historical Analysis Module 82) a historical incentive database to indicate whether an incentive may be offered for various serviceable points. FIG. 15 illustrates a possible structure for the historical incentive database or table. As illustrated, the historical database may include serviceable point information and an indication as to whether an incentive is available.

To create the historical incentive database, the one or more carrier servers 100 (e.g., via the Historical Analysis Module 82) may apply business rules to historical information/data associated with some or all of the serviceable points serviced by the carrier. In various embodiments, delivery serviceable point profiles may be established as discussed herein. The delivery serviceable point profile information/data may link a particular serviceable points to other nearby serviceable points (e.g., a close residential address, same neighborhood, commercial addresses within the same building, an apartment complex, duplex, along the same route, etc.) according to one or more of the methodologies for identifying nearby serviceable points discussed herein. This linking may relate to a service stop, which identifies where a service provider may stop to service one or more serviceable points. For example, a service provider may make a single stop (i.e. at a service stop) to make deliveries to multiple serviceable points (or a single serviceable point) such as an apartment complex or shopping mall. The delivery serviceable point profile may include a list of consignees receiving items at the serviceable point, frequency of deliveries to or pickups from the serviceable point and/or nearby serviceable points (e.g., average daily volume, average weekly stops), typical days of delivery and/or pickup (e.g., Monday, Tuesday, Wednesday, etc.), costs associated with making a delivery to the serviceable point and/or nearby serviceable points, whether deliveries require consignee signatures or allow driver release, delivery type (e.g., residential or commercial), and stop reputation for the associated serviceable points or nearby serviceable points. The stop reputation may include information/data regarding missed deliveries, claims, delinquencies, etc. Additional information may include business names, suite, floor, building, apartment number, and the like.

The delivery serviceable point profile may be based on information/data collected over a particular time frame such as, for example, 3 months, 6 months, 1 year or the like. In some embodiments, the delivery serviceable point profile may be adjusted based on the time of year (e.g., seasonal, holidays, etc.).

In addition to the delivery serviceable point profile, a pickup location profile may also be created. The pickup location profile may include characteristics of the fulfillment or drop ship location as well as the shipper. The pickup location profile information/data may link a particular serviceable point to other nearby serviceable points (e.g., a close residential serviceable point, commercial serviceable points within the same building, an apartment complex, duplex, along the same route, etc.). The pickup location profile may include a list of shippers/consignors sending shipments/items from the serviceable point, frequency of deliveries to or pickups from the serviceable point and/or nearby serviceable points (e.g., average daily volume, average weekly stops), typical days of delivery and/or pickup (e.g., Monday, Tuesday, Wednesday, etc.), costs associated with making a pickup from the serviceable point and/or nearby serviceable points, delivery type (e.g., residential or commercial), and stop reputation for the associated serviceable points and/or nearby serviceable points. The stop reputation may include information/data regarding missed pickups, claims, delinquencies, etc. Additional information may include business names, suite, floor, building, apartment number, and the like.

Using various business rules, the one or more carrier servers 100 (e.g., via the Historical Analysis Module 82) may indicate in the historical incentive database whether a particular serviceable point should receive an incentive. For example, the business rules may establish a threshold average daily volume or average weekly deliveries to or pickups from the address or cumulative stops to nearby serviceable points to qualify for incentives. Furthermore, the incentives may be graduated based on the different thresholds. For example, business rules may set one incentive for a given volume threshold and a different incentive for a greater volume threshold. Similarly, different incentives may be given for a threshold volume associated with a particular serviceable point versus the same cumulative volume associated with nearby serviceable points. Business rules may also deny incentives for certain serviceable points due to reputation information/data and/or provide manual override capabilities. The overrides may be positive or negative and in some embodiments take precedent over other business rules. Business rules may also be set to provide incentives to all (or none) of the serviceable points in a particular area (e.g., high crime area, limited to domestic only, limited to certain cities, regions, proximity to fulfillment centers, neighborhoods, etc.). Some business rules may allow customers (e.g., consignors and/or consignees) to "opt out" of the incentive service. In various embodiments, the business rules may use a combination of criteria to establish whether an incentive is to be offered. It should be noted that in some embodiments, the one or more carrier servers 100 may perform the historical incentive analysis in real time "on the fly" as opposed to populating a separate historical incentive database. It should be noted that business rules may be adjusted based on characteristics of the shipper/consignor or the consignee—high claims, high volume, low volume, etc. Furthermore, the business rules may have a hierarchy. Some business rules may take precedent over other business rules. For example, an incentive may be denied even if an address match is found because of a high claims rate for the address. In another example, an incentive may be provided even if a serviceable point match is not found if there is a desire to increase delivery volume in a particular area. In some embodiments characteristics of the shipment/item may also impact the incentive such as the size, weight, number of shipments/items, and the like.

d. Incentives Based on Dynamic Data

As noted, the one or more carrier servers 100 (e.g., via the Dynamic Analysis Module 84) may analyze dynamic information/data related to shipments/items forecasted for delivery to some or all of the serviceable points serviced by a carrier. In some embodiments, the one or more carrier servers 100 may populate a dynamic incentive database to indicate whether an incentive may be offered for various serviceable points and conditions that may be necessary to receive the incentive. This database may be updated continuously as new shipments/items are received and/or updated periodically (e.g., every 5 mins., 10 mins., hour, day, etc.)

To populate the dynamic incentive database, the one or more carrier servers 100 may access Shipment/item Level Detail ("PLD") information/data maintained by the carrier. As will be understood by those skilled in the art, carriers may maintain PLD information/data for each of the shipments/items that are forecasted to be delivered by the delivery network. This dynamic information/data may include information/data for each forecasted shipment/item such as a ship date, an origin serviceable point indicia, destination serviceable point indicia, service level, a forecasted delivery date, a unique identifier, and exception information. Using this information, the one or more carrier servers 100 can determine which days shipments/items are already forecasted for delivery to the various serviceable points serviced by the carrier.

The one or more carrier servers 100 (e.g., via the Dynamic Analysis Module 84) may apply business rules to the PLD information/data to determine whether an incentive may be offered for the serviceable point and what conditions would be necessary to receive the incentive. For example, the PLD information/data may indicate that existing deliveries are forecasted for the serviceable point or a nearby serviceable point (e.g., as determined based on one or more of the methodologies described herein) on one or more particular dates. Thus, if the online merchant tenders the shipment/item to the carrier with sufficient time to be delivered on one of those particular dates in which synchronization can occur, an incentive may be provided. FIG. 16 illustrates a possible structure for a PLD incentive database. In the illustrated embodiment, a serviceable point is provided and an indication as to whether an incentive is available for Day 1, Day 2, Day 3, etc. For example, delivery to "1 Aardvark Avenue" may be incentivized on Day 2 but not on Days 1 and 3. It should be noted that additional days and/or time frames (e.g., hours, morning/afternoon, week day, weekend, and/or the like) may be provided in the dynamic incentive database as desired.

In various embodiments, each "Day" indication may be a tendered date from the online merchant to the carrier, or a delivery date to the consignee. In various embodiments, separate information/data sets may be created for address matches versus nearby address matches. These separate information/data sets may be associated with different incentive amounts. It should be noted that in some embodiments, the one or more carrier servers 100 may perform the dynamic incentive analysis "on the fly" as opposed to populating a separate dynamic incentive database.

Business rules may also provide positive or negative overrides for incentive determinations based on dynamic information/data or historic or any other type of data. For example, the overrides may indicate that certain serviceable points should or should not receive incentives. In various embodiments, the override decisions may be based on some criteria such as location (e.g., postal codes, delivery segments, telematics data, latitude/longitude coordinates, suites, floors, buildings, apartments, etc.), delivery cost, consignee names, delivery days, service levels, volume on delivery lanes, time-in-transit and the like. The override business rules may be updated periodically.

e. Incentives Based on Historic and Dynamic Data

In various embodiments, the historical incentive information/data and the dynamic incentive information/data may be combined into a single incentive database. For example, the incentive database may have fields for each serviceable point indicating whether, based on historical data, an incentive is appropriate as generally described above with reference to the historical incentive database. In addition, the incentive database may also be updated based on separate dynamic information/data to determine if particular delivery days are appropriate for an incentive. In various embodiments, business rules may be applied to identify different incentives for different combinations of historical and dynamic information/data characteristics. For example, a business rule may identify incentive "A" when the historical information/data shows an incentive but the dynamic information/data shows no incentive. Alternatively, a business rule may identify incentive "B" when the historical information/data shows an incentive and certain days of the dynamic information/data are incentivized as well. Of course any combination of incentives may be provided including applying the same incentive for any positive indication.

f. Method for Determining an Incentive for a Shipment

Figure 17:
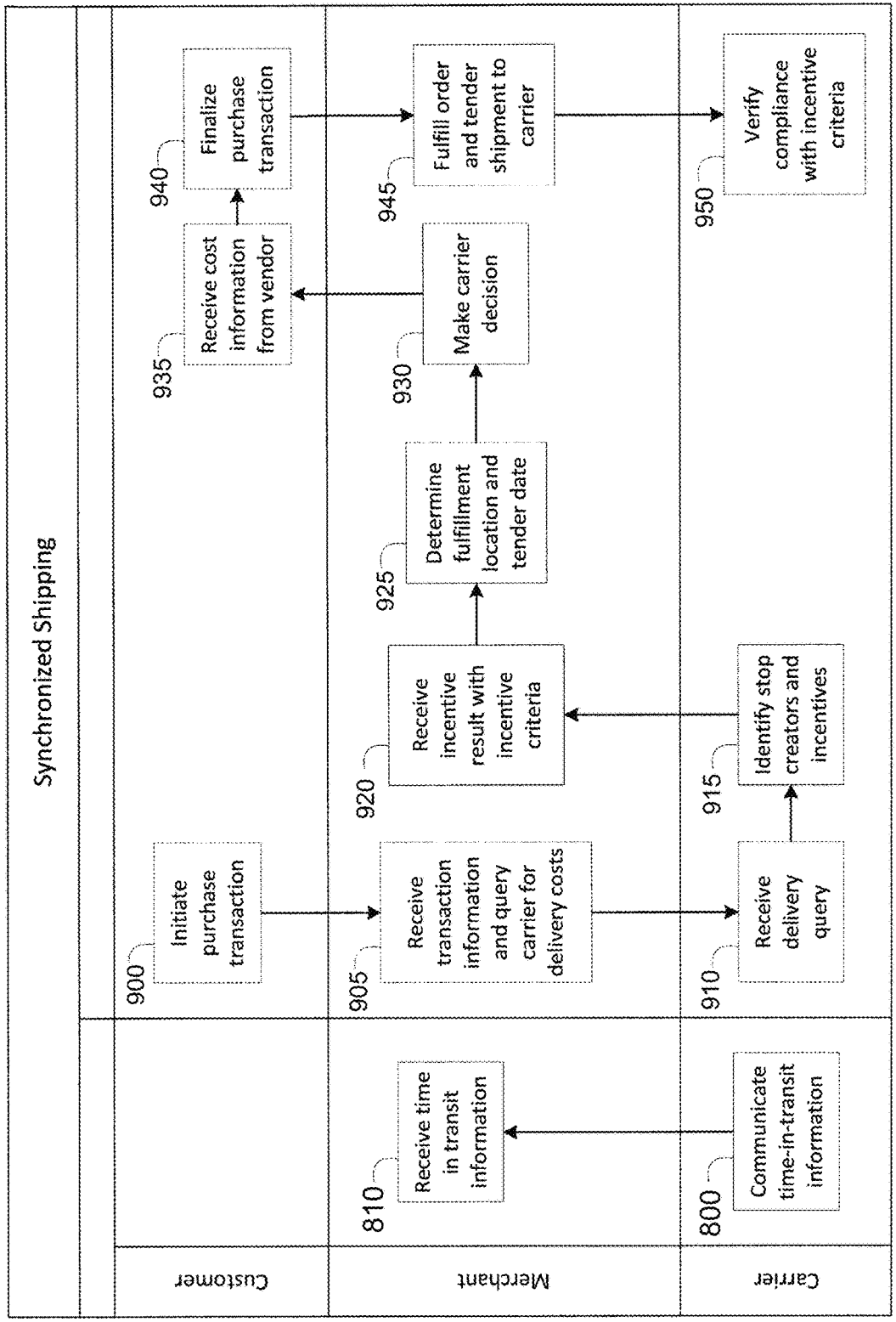
FIG. 17 is diagram illustrating tasks that may be performed by different entities in accordance with various embodiments of the present invention.

FIG. 17 is a "swim lane" diagram illustrating a delivery method according to various embodiments. The process begins at Block 800 with the carrier providing time-in-transit information to the online merchant for one or more fulfillment centers or drop-ship locations, which is received at Block 810. As will be understood by those skilled in the art, many online merchants have multiple fulfillment centers or drop-ship locations distributed throughout a geographic area from which an order may be fulfilled. A carrier may provide time-in-transit information from each fulfillment center or drop-ship location to different geographic areas (e.g., zip codes, cities, states, regions, etc.). Of course, if the online merchant has a single fulfillment center or drop-ship location, time-in-transit information would be provided for that single location. This time-in-transit information may be used by the online merchant to determine a tender date as will be discussed in greater detail below. In various embodiments, the carrier may not provide time-in-transit information for use in incentivizing certain deliveries. For example, the carrier may provide a tendered date as opposed to a delivery date and thus the time-in-transit would be included in the calculation of the tendered date as will be described in greater detail below.

To facilitate a purchase transaction, a customer (e.g., a customer of the merchant and/or a representative of the customer operating a customer computing device 108) may access a webpage or portal of an online merchant. For instance, the one or more online merchant servers 106 may transmit a webpage providing the customer with an online store front that allows the customer to browse and select items for purchase. The purchase transaction may be facilitated using a shopping cart or other technique, which allows a customer to accumulate a list of items for purchase. At Block 900, the customer may initiate a purchase transaction by indicating a desire to purchase an item(s). As part of the purchase transaction, the online merchant may request the customer to provide a destination address for the items and may allow the customer to select a delivery service level option such as next day, 2-3 business days, 5-7 business days, etc. In other embodiments, the online merchant may provide multiple delivery dates for selection by the customer.

After the delivery information is received from the customer at Block 905, the online merchant may communicate some or all of the delivery information including the destination address and the promised delivery date information to the carrier. The promised delivery date information may include an actual date or a range of delivery dates. In some embodiments, only the destination address may be provided. The destination address may be provided as a postal address, zip code, landmark identification, a retail store, a restaurant, a latitude and longitude location, a GPS enabled mobile device, or any other technique for identifying a location. The information may be communicated by the one or more online merchant servers 106 to the one or more carrier servers 100 using an Application Programming Interface ("API"), user interface, integrated software, pop-up windows or other communication protocols or paths. In other embodiments, the information may be communicated via text messages (e.g., Short Message Service (SMS) and/or Multimedia Messaging Service (MIMS), email messages, voice messages, and/or a variety of other messages in various communication formats.

At Block 910, the carrier receives the shipment/item information from the online merchant. Using the communicated information, the one or more carrier servers 100 may determine whether synchronized delivery with a stop creator shipment/item is possible (or probable) and whether to provide a delivery incentive and/or the amount of the incentive to be offered to the online merchant at Block 915.

Figure 20:
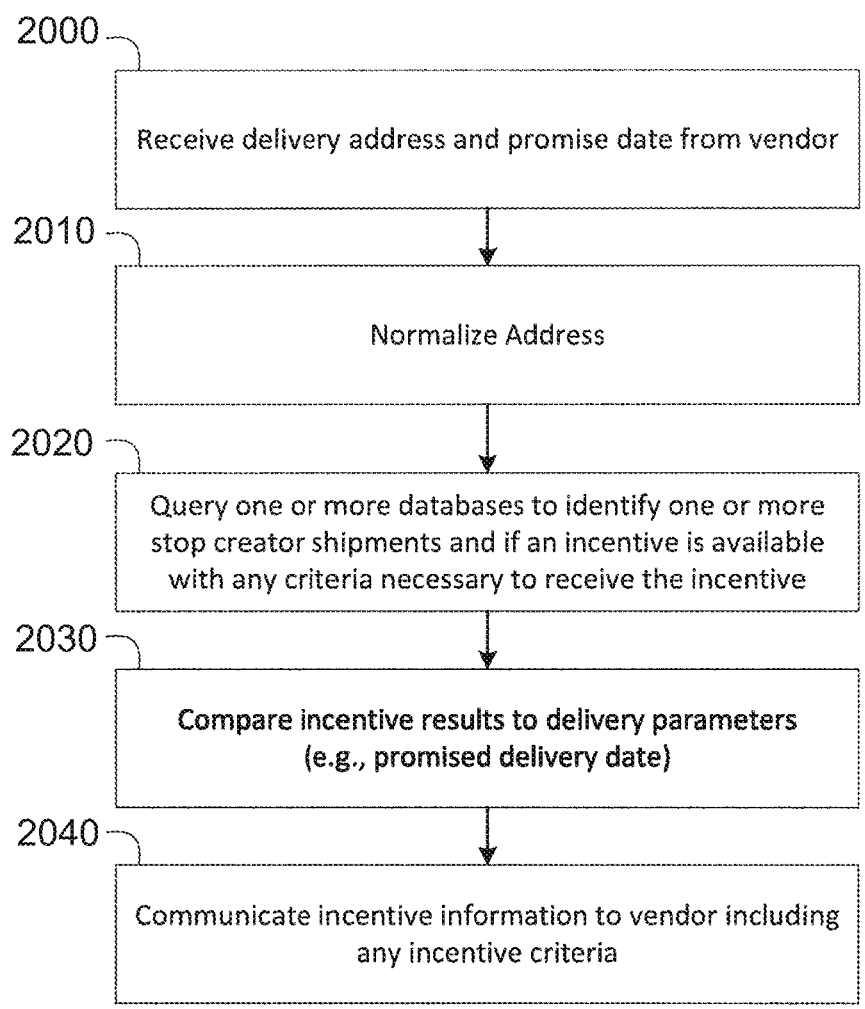
FIG. 20 is a flow diagram illustrating tasks that may be performed in accordance with various embodiments of the present invention.

FIG. 20 provides a flow diagram illustrating the steps that may be performed by the one or more carrier servers 100 to determine whether synchronized delivery with a stop creator shipment/item is possible (or probable) and whether a delivery incentive is appropriate according to various embodiments. The synchronization/incentive analysis begins at Block 2000 with the one or more carrier servers 100 receiving the delivery information/data from the one or more online merchant servers 106. At Block 2010, the one or more carrier servers 100 may normalize the destination serviceable point indicia (e.g., address). The normalization process may be implemented using software that corrects errors in the address information (e.g., spelling errors) and adds missing information (e.g., postal information) received from the online merchant. In one embodiment, the one or more carrier servers 100 may maintain a database of ways that a particular address may have been represented in previous shipments/items (e.g., incorrect capitalization, "Street" versus "St.", versus "St", misspellings). These different representations may be linked to a "normalized" address representation. The one or more carrier servers 100 may query this database with the delivery address information received from the online merchant and once a match (e.g., an address corresponding to delivery address information received from the online merchant) is found, the linked normalized address is returned.

Using the normalized serviceable point indicia, the one or more carrier servers 100 determines whether synchronized delivery with one or more stop creator shipments/items are possible (or probable) and whether an incentive is appropriate. In various embodiments, the one or more carrier servers 100 may query (a) the historical incentive database (b) the dynamic incentive database and/or (c) a combined historic and dynamic incentive database to determine if an incentive is available at Block 2020. The match may be to the actual serviceable point or a linked nearby serviceable point.

In the event that only the historic incentive database is queried, the one or more carrier servers 100 would determine if an incentive is available for the particular serviceable point. In various embodiments, the query result may indicate (a) whether an incentive is available, (b) the type of incentive—serviceable point match or nearby serviceable point match with an anticipated stop creator shipment, and/or (c) the actual incentive amount.

In the event only the dynamic incentive database is queried, the one or more carrier servers 100 may determine if synchronized delivery with one or more stop creator shipments/items are possible (or probable) and an incentive is available for the particular serviceable point. The one or more carrier servers 100 may also determine delivery criteria that may need to be met to achieve synchronized delivery with the one or more stop creator shipments/items and to receive the incentive. These delivery criteria may be based on the ability to synchronize the delivery with forecasted deliveries to the particular serviceable point or nearby serviceable points and may include specific delivery dates or ranges of dates.

In the event a combined historic and dynamic incentive database is queried, the one or more carrier servers 100 may determine if synchronized delivery with one or more stop creator shipments/items are possible (or probable) and if an incentive is available for the particular serviceable point. The one or more carrier servers 100 may also determine delivery criteria that may need to be met to achieve synchronized delivery and/or receive the incentive. If the incentive is based on historical data, there may not be any separate delivery criteria necessary to receive the incentive. Alternatively, if the dynamic information/data is relied upon to identify an incentive, the delivery criteria may be based on the ability to synchronize the delivery with forecasted deliveries to the particular serviceable point or nearby serviceable points (e.g., collectively stop creator shipment(s)) and may include specific delivery dates or ranges of dates.

Alone or in combination with the queries to a historic and dynamic incentive database, the one or more carrier servers 100 may also consider information/data received from the customer (e.g., a customer profile). This information may include vacation schedules, alternate delivery locations, requested delivery days of the week, etc. Processes that may be used in capturing and storing this type of information/data is described in Co-pending U.S. patent application Ser. No. 13/174,290, filed Jun. 30, 2011 and entitled "Customer Controlled Management of Shipments," which is incorporated by reference herein in its entirety. This application describes a registration process and operations of various customer delivery programs that may operate in conjunction with embodiments of the present invention.

It should be noted that in various embodiments, the historical incentive analysis and/or dynamic synchronization/incentive analysis may be performed in real time "on the fly" as opposed to querying existing databases. In either case, the one or more carrier servers 100 would access the appropriate raw information/data (e.g., customer profile data, historical address profile information/data and/or PLD data, etc.) and apply business rules as generally discussed above with reference to the historical incentive database and the dynamic incentive database to determine if synchronized delivery with one or more stop creator shipments/items are possible (or probable) and if an incentive is available. The one or more carrier servers 100 may also determine any criteria that must be met to receive the incentive.

Once the synchronization/incentive analysis is performed, the one or more carrier servers 100 may compare the delivery criteria against the promised delivery date(s) provided by the online merchant at Block 2030. Using this information, the one or more carrier servers 100 may filter the incentive results to meet the promised date. For example, if the promised delivery date is on or before February 1 and the delivery criteria shows possible incentives for delivery dates of January 29, January 31 and February 3. This comparison would filter out the February 3 date. In the event the delivery information received from the online merchant does not include a promised date, the one or more carrier servers 100 may not perform this step. Instead, all incentive dates identified in the analysis may be provided.

After the synchronization/incentive analysis is performed, the one or more carrier servers 100 may communicate incentive information via an indicator message to the one or more online merchant servers 106 for the received address, which is received by the online merchant at Block 2040. The indicator message may be communicated by the one using an API, user interface, integrated software, pop-up windows or other communication protocols or paths. In other embodiments, the information may be communicated via text messages (e.g., Short Message Service (SMS) and/or Multimedia Messaging Service (MMS), email messages, voice messages, and/or a variety of other messages in various communication formats.

In some embodiments, the indicator message may simply indicate an incentive is available, while in other embodiments the indicator message may include the actual incentive (e.g., discount amount, discount percentage, etc.). In further embodiments the indicator message may include delivery criteria that must be met to receive the incentive. For example, the indicator message may indicate a required delivery date or dates required to receive the incentive. The indicator message may also include information associated with the address. The additional information may include reputation information. Further information may include a confirmation of the promise date if initially provided.

In various embodiments, the indicator message may indicate the tendered date(s) and associated tender locations for the shipment/item to receive the incentive. The tender locations may be fulfillment centers or drop-ship locations for the on-line merchant, drop boxes, or other carrier pick locations. The one or more carrier servers 100 may determine which tender locations to offer based on a variety factors such as, for example, volume in delivery lanes associated with the different locations, time-in-transit, proximity to delivery address, cost associated with the pick-up and the like.

Returning to FIG. 17, the online merchant receives the incentive results from the carrier at Block 920. In the event the indicator message provides one or more delivery dates, the online merchant may then use the time-in-transit information communicated earlier by the carrier to calculate a tender date for the shipment/item for desired fulfillment centers or drop-ship locations at Block 925. For example, the one or more carrier servers 100 may communicate that a February 1 delivery date is available for an incentive. In conjunction with the time-in-transit information previously provided, the one or more online merchant servers may use the February 1 designation to (a) select a particular fulfillment center or drop-ship location and (b) determine the tender date to the carrier. The fulfillment center may be selected based at least in part on the required delivery service level necessary to meet the February 1 delivery date and the availability of the purchased items at the fulfillment center. Working backwards from the provided delivery date, the online merchant may subtract the previously provided time-in-transit to arrive at the necessary tender date. At this point the online merchant may calculate a shipping cost including the cost associated with the shipping the item from the fulfillment center pursuant to the necessary service level and associated incentive.

At Block 930, the online merchant may use the calculated cost to determine which of multiple different carriers to use for a particular shipment/item. After making this determination, the online merchant may communicate the shipping cost, among other data, to the customer in anticipation of an order confirmation. This information is received by the customer at Block 935. The customer may then consider the information and finalize the purchase transaction at Block 940.

Once the order is received by the online merchant, the online merchant will fulfill the order and tender the shipment/item to the carrier at Block 945. In various embodiments, the online merchant may repeat the incentive query after receiving the order to verify the incentive. In some cases, new stop creator shipments/items may be received between the initial determination and the receipt of the order that may result in a possible synchronization and an incentive. In addition, new stop creator shipments/items may be received between the initial determination and the determined tender date. In various embodiments, the one or more carriers 100 may periodically (e.g., hourly, daily, etc.) analyze the dynamic information/data to determine if new stop creator shipments/items are received. If a new stop creator shipment/item is identified, the one or more carriers 100 may send a second message to the online merchant indicating the availability of an incentive. In this embodiment, the merchant would not need to continually query the one or more carrier servers 100 to determine if an incentive becomes available. Typically, the one or more carrier servers 100 would periodically analyze the dynamic information/data if the initial determination was no incentive was available. In some embodiments, however, the carrier may periodically analyze the dynamic information/data independent of the initial incentive determination.

In various embodiments, the one or more carrier servers 100 may provide a token or unique identifier with the incentive communication to the online merchant for use in identifying the shipment/item as receiving an incentive. In various embodiments, separate tokens or unique identifiers may be provided for each available incentive (e.g., delivery dates). In use, the online merchant may include the unique identifier on the label, provide with the PLD information communicated to the carrier or otherwise associate the unique identifier with the shipment/item. When the shipment/item is tendered to the carrier, the carrier can then capture the unique identifier and the one or more carrier servers 100 can verify whether the shipment/item criteria has been met to receive the incentive at Block 950.

g. Incentives

In various embodiments, the carrier may provide a discount for each shipment/item that meets the incentive criteria. In other embodiments, the carrier may provide a periodic discount for meeting a threshold percentage of shipment/item criteria (e.g., monthly, quarterly, yearly, etc.). In still further embodiments, the carrier may provide a discount to the online merchant for using the program and further incentives when the threshold criteria are met.

The carrier may periodically report the resulted savings from the program. For example, the carrier may report the gallons of fuel saved, the carbon emissions avoided and the total amount of savings received. In some embodiments, the fuel savings and carbon emissions avoided may be provided for each shipment/item with the incentive communication. Therefore, the online merchant may communicate this information to the customer (e.g., electrically with the cost information, printed on the label, etc.).

In some embodiments, the incentive may be provided in the form of a rebate or other adjustment after the completion of the shipment/item. The rebate or other adjustment may be based on the actual synchronization that was achieved versus the anticipated synchronization or lack thereof when the shipment/item was tendered to the carrier. For example, the shipper/consignor may be offered an incentive based on anticipated delivery to a nearby serviceable point. Sometime after the shipment/item is tendered or the incentive is offered, the carrier then receives further shipments/items to the actual serviceable point. Thus, a higher level of match may be made (e.g., direct match with serviceable point versus nearby serviceable point match) and in this example a higher incentive may be appropriate. The carrier may provide the shipper, consignee or both a rebate or other adjustment for the difference between the incentives. In some embodiments, the rebates or other adjustments may require subscription to a particular service.

h. Merchant Facilitates Synchronized Delivery to Obtain Incentive

In various embodiments, the online merchant may take steps to increase the possibility that a synchronized delivery can be achieved and an associate incentive may be applied. For example, the online merchant may provide multiple serviceable points with the initial request. In this case, the one or more carrier servers can analyze multiple serviceable points for possible incentives. The results may include different incentives and/or incentive criteria for the different serviceable points. In addition, the online merchant may provide information to the carrier regarding other deliveries being considered for the particular serviceable point. The carrier may then provide an incentive to deliver both shipments.

As an additional example, the merchant may provide an option to a customer (e.g., a consignee of a shipment/item) allowing the customer to indicate whether a shipment/item may be held either by the merchant and/or by the carrier in order to synchronize delivery with one or more additional deliveries scheduled to be delivered to a destination serviceable point at a later date than the originally scheduled delivery. For example, on a checkout page of a merchant website (e.g., a graphically displayed user interface displayed via a display device to a customer during a checkout process), the merchant may provide an option to the customer (e.g., via a radio button, a check box, a comments box, and/or the like) permitting the customer to provide permission to the merchant and/or the carrier to delay delivery of a shipment/item in order to facilitate synchronization of delivery with other shipments/items to the same and/or nearby serviceable points.

In various embodiments, the graphical user interface provided by the merchant website may permit customers to select one or more items for purchase via the merchant website. Once the customer is ready to purchase the selected items, the merchant website may receive customer information, including shipping information identifying a destination serviceable point to which the items should be shipped. In various embodiments, the merchant website may then determine whether synchronized delivery is permitted to the identified destination location (e.g., by transmitting at least a portion of the customer information and/or data identifying the items selected for purchase to the carrier server 100, for example, via an Application Program Interface, which determines whether synchronized delivery is permitted to the identified destination serviceable point). Upon a determination that synchronized delivery is permitted to the destination serviceable point, the merchant website may be configured to display a graphical user interface permitting the customer to select one or more shipping service options to be applied to the shipment/item as it is transported to the destination serviceable point. In various embodiments, the generated and displayed graphical user interface comprises one or more options permitting the customer to grant permission to the merchant and/or the carrier to modify delivery of the shipment/item to synchronize delivery with other stop creator shipments scheduled to be delivered to the same and/or nearby serviceable points.

In some embodiments, an interface (e.g., browser, dashboard, application from a carrier and/or retailer) in communication with the carrier system 100 and/or a retailer system/third party system can be used to provide one or more options for the customer to identify whether a purchased item may be eligible for synchronized delivery. Such interface may provide the customer information identifying one or more incentives that may be offered to the customer if the customer permits synchronized delivery. For example, a customer (e.g., a customer or customer representative operating a consignee computing entity or consignor computing entity) may access the interface (e.g., browser, dashboard, application from a carrier and/or retailer) in communication with the carrier system 100 and/or retailer system/third party system, while for example, shopping online via the retailer's website, application, and/or the like, to view an item. In order to be provided with, one or more expected, estimated, confirmed, and/or guaranteed incentives for permitting synchronized delivery for the item the customer may additionally access an interface (e.g., browser, dashboard, application from a carrier and/or retailer) in communication with the carrier system 100 without having to sign in, provide additional verification, credentials, usernames, passwords, and/or the like.

Figure 18:
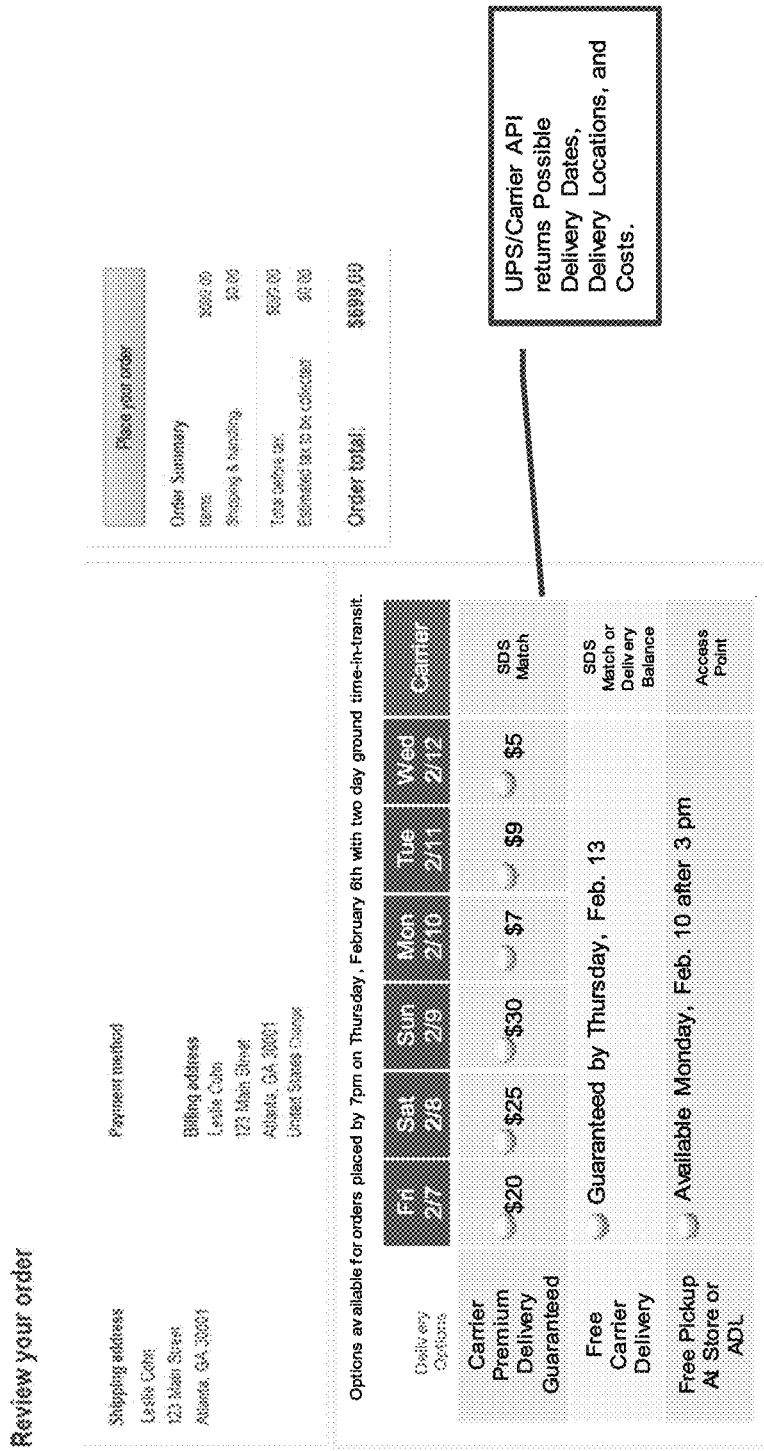
FIG. 18 is an example graphical user interface providing example shipping options including synchronized delivery options to a customer.

FIG. 18 provides an example graphical user interface that may be generated and presented via a merchant website permitting a customer to provide permission to the merchant and/or the carrier to delay delivery of a shipment/item in order to facilitate synchronization of delivery with other shipments/items to the same and/or nearby serviceable points. As shown in FIG. 18, the graphical user interface may display various estimated, confirmed and/or guaranteed pick-up or delivery dates, times, time windows, and/or associated costs for view and/or selection by customers purchasing one or more items through the merchant website. As shown in FIG. 18, a customer (e.g., operating a customer computing entity 108) can select from a plurality of delivery dates, times, time windows, and/or locations and the corresponding costs (if applicable) as part of an online shopping experience presented through the merchant's website (e.g., after adding an item to a cart, at checkout, after shipment, and/or the like), and responsive to a selection, the carrier server 100 and/or retailer system can provide confirmation of the selection and update and/or generate shipping information indicative of delivery of the shipment/item at the specified date, time, and/or location with the corresponding cost. In various embodiments, a graphical display providing customers with one or more shipment and/or delivery options may be presented by the merchant website and/or by the carrier server 100 (e.g., via an API configured to permit the merchant's website to display graphical user interfaces generated at least in part by the carrier server 100).

Figure 19:
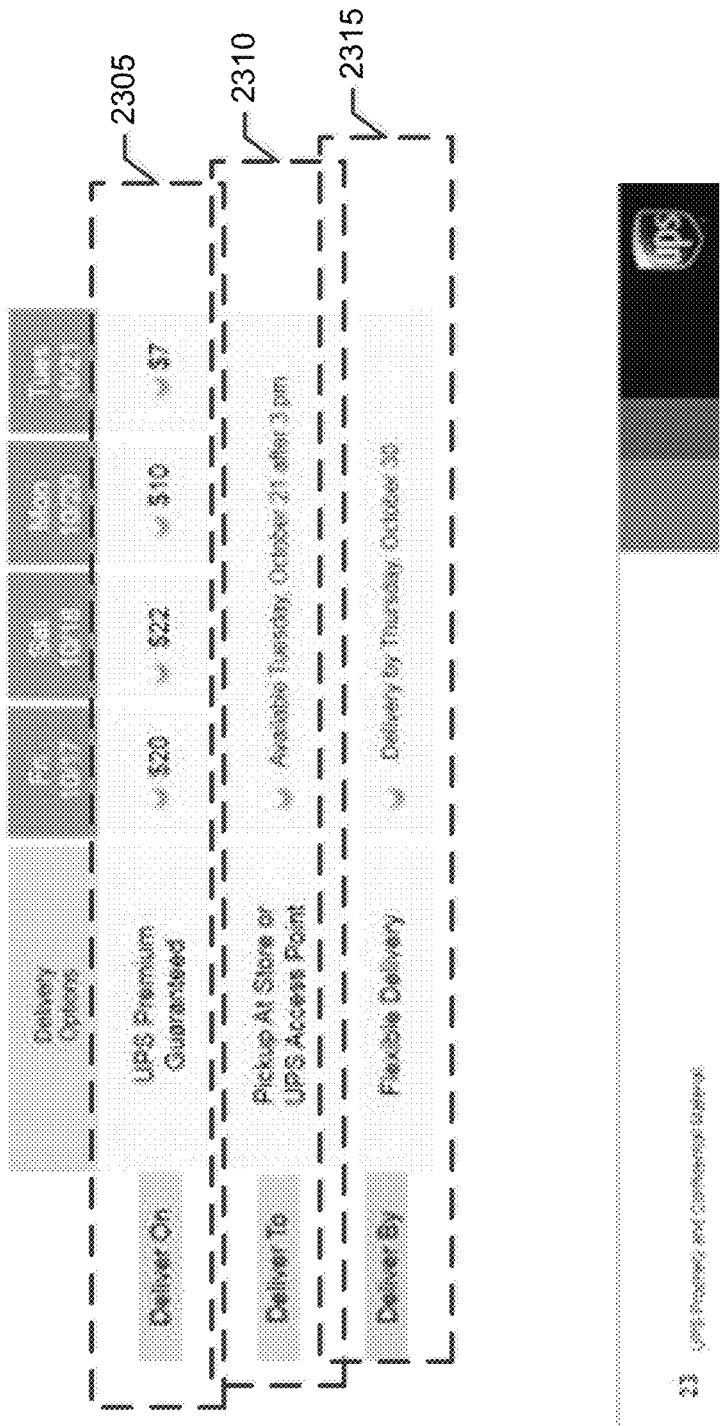
FIG. 19 is an example graphical user interface providing example shipping options and costs to a customer.

FIG. 19 provides an additional example graphical user interface that may be provided to a customer (e.g., a consignee operating a customer computing entity 108) communicating various pickup and/or delivery information/data after the carrier server 100 and/or merchant server performs a synchronized delivery cost analysis to provide appropriate shipping cost options to the customer for various shipping options. For example, a customer (e.g., operating customer computing entities 108) may be provided with options available for selection including one or more delivery times/windows and, in some embodiments, the corresponding costs (if applicable) as part of an online shopping experience (e.g., after adding an item to a cart, at checkout, after shipment, and/or the like). Specifically, display portion 2305 shows one or more customer-selectable delivery windows (e.g., Fri 10/17, Sat 10/18, Mon 10/20, and Tues 10/21), which may be the result of results returned from querying the historical database and/or the dynamic database. That is, the costs shown associated with the selection of each of the four delivery windows may be the result of one or both of determining if costs are available for the customer's serviceable point or area and/or the corresponding dates, times, and/or time windows and determining if synchronized delivery with one or more stop creator items is possible or probable and the costs for the customer's serviceable point or area, the costs, in some embodiments, acting to increase or decrease density and/or influence delivery parameter selections.

Display portion 2310 may, in some embodiments, be provided to the customer in addition to, or in some embodiments, alone, in the event that a customer does not wish to pay for expedited delivery options but does not want to wait for delivery to the customer's serviceable point. Display portion 2315 may be provided to the customer in addition to, or in some embodiments, alone, in the event that a customer does not wish to pay for expedited delivery options and is willing to wait for normal and/or synchronized delivery with other stop creator shipments scheduled to be delivered to the customer's serviceable point and/or nearby serviceable points.

In some embodiments, the pick-up and/or delivery information/data may simply indicate costs, dates, times, and/or time windows, while in other embodiments the pick-up and/or delivery information/data may include the actual costs including discount amounts, discount percentages, and/or the like. In further embodiments, the pick-up and/or delivery information/data may include delivery criteria that must be met to receive the determined/identified cost. For example, the pick-up and/or delivery information/data may indicate a required tender date to receive the cost. As will be recognized, a variety of other techniques and approaches can be used to adapt to various needs and circumstances.

In various embodiments, the pick-up and/or delivery information/data may indicate the tendered date and associated tender locations for the shipment to receive the cost. The tender locations may be fulfillment centers or drop-ship locations for the on-line retailer, drop boxes, or other carrier pick locations. The carrier system 100 and/or retailer system/third party system 125 may include means for determining which tender locations to offer based on a variety factors such as, for example, volume in delivery lanes associated with the different locations, time-in-transit, proximity to delivery address, cost associated with the pick-up, and/or the like.

i. Customer Facilitates Synchronized Delivery to Obtain Incentive

In various embodiments, the customer (e.g., the consignee) may take steps to increase the possibility that a synchronized delivery can be achieved and an associated incentive may be applied. For example, the customer may have an agreement with the carrier to receive shipments/items on certain days or at alternative locations. This service may also allow a customer to provide calendar information noting vacation schedules or unavailable dates such that deliveries can be delayed to accommodate the customer's schedule and ability to receive the shipment/item. Co-pending U.S. patent application Ser. No. 13/174,290, filed Jun. 30, 2011 and entitled "Customer Controlled Management of Shipments," which is incorporated by reference above, describes various systems that allow a customer to designate delivery preferences that may be used in conjunction with embodiments of the present invention. In some embodiments, the customer may pre-authorize the carrier to alter service levels to facilitate delivery on the identified days. For example, the customer may pre-authorize the carrier to alter an overnight delivery service level to a different service level that coincides with delivery of a shipment/item on a particular day. In some embodiments, rebates may be issued for this change. The one or more carrier servers 100 may use the calendar information and alternative delivery location information in the synchronization/incentive evaluations noted above. The incentives may be in the form of reduced shipping price or a rebate of a portion of the shipping price. The incentives could be provided to the customer, the online merchant or both.

In some embodiments, the alternate delivery locations may be a landmark, a retail store (affiliated or unaffiliated with the merchant), restaurant, a latitude longitude location, or a GPS location for a customer's car or cellular telephone. Under these circumstances, the carrier may use historic or dynamic information/data to determine if synchronization with other shipments/items is possible.

In some embodiments, the carrier may notify the customer that shipments/items are already en route to their address and provide an incentive to the customer to schedule other shipments/items for delivery on the same day. In further embodiments, the carrier may provide a list of merchants in which the incentive may apply. In some embodiments, the merchants may pay a subscription to be offered to the customers under this type of scenario, the merchants may be frequent shippers/consignors to the consignee or the list may be constructed using other criteria.

It should also be noted that the customer may elect not to participate in the incentive program and thus "opt-out" of the type of incentive services described herein.

In various embodiments, the carrier server 100 may be configured to generate one or more graphical user interfaces configured to receive user input from a customer indicative of one or more instructions in order to facilitate synchronized delivery. In various embodiments the one or more graphical user interfaces may be presented as at least a portion of graphical user interfaces presented as a customer profile accessible to the customer. In various embodiments, the carrier server 100 may be configured to store (e.g., in one or more databases in communication with the carrier server 100) a plurality of customer profiles corresponding to a plurality of individual customers. In such embodiments, the carrier server 100 may be configured to receive identifying information corresponding to a customer (e.g., as user input provided to the carrier server 100) that may be utilized to identify and retrieve the customer profile corresponding to the customer. For example, the carrier server 100 may be configured to present a log-in graphical user interface to the customer configured to receive user input identifying the customer. In various embodiments, the log-in graphical user interface may comprise a fillable form comprising information/data fields corresponding to a customer identifier and a password, however, any of a variety of log-in graphical user interfaces that may be utilized to receive identifying information from the customer may be utilized. Upon receipt of the identifying information for the customer, the carrier server 100 may be configured to retrieve information/data associated with the customer profile corresponding to the customer, and may present one or more graphical user interfaces comprising at least a portion of the retrieved information/data to the customer. Such features are described in greater detail in the referenced, co-pending U.S. patent application Ser. No. 13/174,290 noted above.

In various embodiments, one or more of the graphical user interfaces presented to the customer (e.g., the consignee) may comprise information/data indicative of one or more customer preferences regarding the delivery of one or more shipments/items. For example, as shown in FIG. 12, the carrier server 100 may be configured to generate a graphical user interface configured to receive user input from a customer regarding one or more shipment/item delivery preferences for the customer. In various embodiments, the carrier server 100 is configured to receive updates to the customer's preferences upon receipt of user input regarding the same, and to store the customer's preferences in a database in association with a customer profile corresponding to the customer. Upon the customer requesting information regarding their stored preferences, the carrier server 100 may be configured to retrieve information/data from the customer profile, and to provide a graphical user interface such as that shown in FIG. 12.

In accordance with the example graphical user interface shown in FIG. 12, the carrier server 100 may be configured to store information/data regarding, inter alia, a customer's preferences for receiving delivery alerts (e.g., messages transmitted to the customer to notify the customer of an impending delivery), standing delivery instructions (e.g., a specific location to deliver an item at a destination location), days on which a customer does not want to receive packages (e.g., scheduled vacation days for the customer), and/or the like. Although not specifically indicated in the example graphical user interface shown in FIG. 12, the carrier server 100 may be configured to receive and store customer preferences regarding whether the customer desires to opt in and/or opt out of synchronized delivery services, as described herein. Moreover, in various embodiments, the carrier server 100 may be configured to store information/data indicative of a standing customer preference requesting and/or permitting the carrier to modify a shipment/item service level under various circumstances. For example, the carrier server 100 may store information/data indicating that a customer permits the carrier to modify the delivery service level of a shipment/item in order to synchronize delivery of the shipment/item with a stop creator shipment, as discussed in greater detail herein.

Moreover, in various embodiments, the carrier server 100 may be configured to permit users to provide shipment/item-specific delivery instructions and/or preferences regarding individual shipments/items scheduled to be delivered to the customer. As shown in FIG. 13, the carrier server 100 may be configured to generate a graphical user interface providing information/data regarding one or more shipments/items scheduled to be delivered to the customer and to receive user input regarding one or more shipment/item specific delivery instructions for one or more of the shipments/items referenced on the graphical display. For example, the carrier server 100 may be configured to receive user input indicating that a carrier is instructed and/or permitted to modify an estimated delivery date and/or a delivery service level for one or more shipments/items indicated by the customer in order to synchronize delivery with one or more stop creator shipments as described herein. Upon receipt of such user input, the carrier server 100 may be configured to modify information/data stored in the shipment/item level detail database to reflect the customer preferences regarding the identified one or more shipments/items. In various embodiments, the carrier server 100 may be configured to modify the information/data displayed via the graphical user interface to reflect the updated customer preferences for the one or more identified shipments/items.

Figures 14A, 14B:
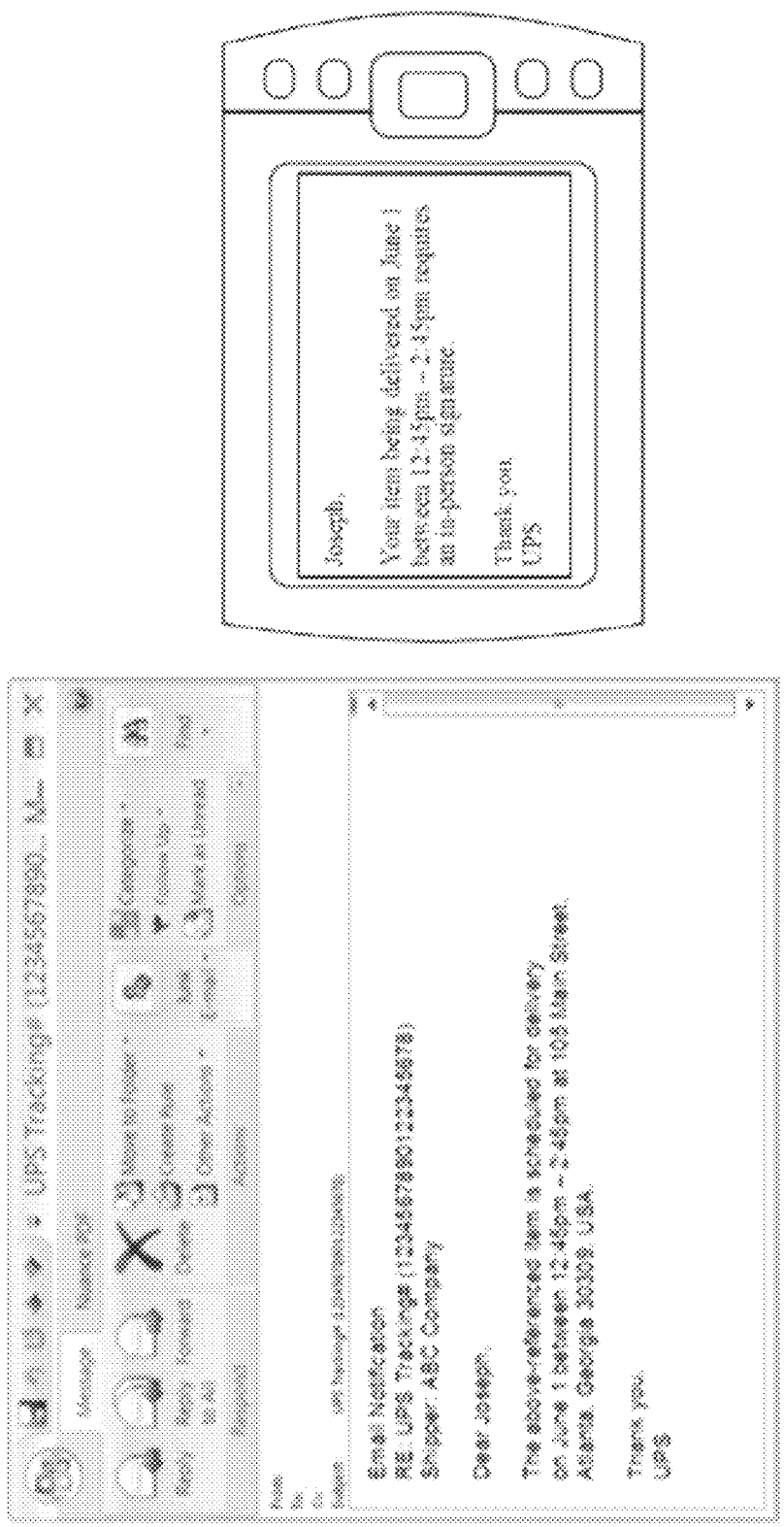
FIGS. 14A-14B are example alerts indicative of impending delivery of a shipment/item in accordance with certain embodiments of the present invention.

In accordance with at least a portion of the customer preferences discussed herein, the carrier server 100 may be configured to generate and transmit one or more delivery alerts to the customer to provide a notification of one or more impending deliveries. FIGS. 14A-14B provide example screenshots of alerts that may be generated and transmitted to the customer regarding an impending delivery of a shipment/item. Co-pending U.S. patent application Ser. No. 13/174,290 provides a detailed description of the configuration of a carrier server 100 for generating and transmitting notifications in accordance with one or more customer preferences. For example, as described therein, the carrier server 100 may be configured to identify a customer preference regarding the time when one or more alerts should be sent regarding impending deliveries, and/or may identify one or more preferences regarding a preferred notification format (e.g., SMS, email, phone call, and/or the like), and may generate and transmit alerts in accordance with the one or more customer preferences. In addition to complying with one or more customer preferences regarding the time when one or more alerts should be transmitted and the format for transmitting one or more alerts, the carrier server may be configured to customize the content of the alerts based at least in part upon a determination of whether the shipment/item is eligible for synchronized delivery.

Accordingly, in various embodiments, the carrier server 100 may be configured to determine whether the customer has opted out of synchronized delivery services. Upon a determination that the customer has opted out of the synchronized delivery services, the carrier server 100 may be configured to generate and transmit an alert indicative of the impending delivery of one or more shipments/items. However, upon a determination that the customer has not opted out of the synchronized delivery services (e.g., upon a review of information/data indicative of customer preferences), the carrier server 100 may be configured to generate and transmit an alert indicative of the impending delivery of a shipment/item and including an inquiry of whether the customer is willing to permit the carrier to modify the estimated delivery date in order to synchronize delivery of the shipment/item with a stop creator shipment. In various embodiments, the carrier server 100 may be configured to include an inquiry regarding whether the customer is willing to permit the modification of an estimated delivery date prior to determining whether any stop creator shipments are available with which delivery may be synchronized. In such embodiments, the carrier server 100 may be configured to receive a response from the customer indicative of whether the customer is willing to permit the carrier to modify the estimated delivery of the shipment/item prior to searching for potential stop creator shipments with which to synchronize delivery. However, in various embodiments, the carrier server 100 may be configured to determine whether any stop creator shipments are available for synchronizing delivery prior to transmitting the alert of the impending delivery of the shipments/items. In such embodiments, the carrier server 100 may include the inquiry regarding synchronized delivery to be included in the alert upon the identification of one or more stop creator shipments. As a non-limiting example, the carrier server 100 may determine that a shipment/item is scheduled to be delivered to a serviceable point associated with the customer on the day following the scheduled delivery for the shipment, and accordingly may indicate that delivery synchronization is available for the shipment/item.

In various embodiments, upon a customer being notified of an impending delivery of a shipment (e.g., via an alert generated and transmitted by the carrier server 100), the customer may be provided with the option of permitting synchronized delivery of the shipment/item by the carrier. For example, the customer may be permitted to respond to the notification (e.g., via email, by selecting one or more hyperlinks, and/or the like) indicating whether the customer will permit the carrier to synchronize the delivery of the shipment/item with one or more other shipments/items scheduled to be delivered to the same and/or nearby service points.

Accordingly, the notification indicating that an impending delivery is scheduled to be delivered to the customer may include an indication of whether synchronized delivery is available for the shipment/item and/or may provide one or more instructions to the customer for responding to permit and/or deny synchronized delivery of the shipment/item. In various embodiments, the notification may additionally include information indicating one or more incentives that may be available to the customer in exchange for permitting synchronized delivery. In various embodiments, such incentives may only be available for a subset of customers (e.g., customers who have registered with a carrier system). Moreover, in various embodiments, the notification may provide a time limit by which the customer must indicate whether the shipment/item should be available for synchronized delivery. For example, the notification may indicate that the user has 24 hours to determine whether to permit synchronized delivery of the shipment/item.

Upon the user authorizing synchronized delivery (e.g., by responding to the notification indicating that synchronized delivery may be permitted), the carrier server 100 may be configured to update shipment/item information/data associated with the shipment/item to flag the shipment/item as eligible for synchronized delivery. For example, the carrier server 100 may be configured to receive response information/data indicative of the customer's response, and may update the shipment/item information/data as eligible for synchronized delivery based on the response data. Upon flagging the shipment/item as eligible for synchronized delivery, the carrier server 100 may additionally identify the one or more stop creator shipments/items with which delivery of the shipment/item is to be synchronized, and may flag the shipment/item with information to hold (and/or accelerate) the shipment/item such that delivery may be synchronized with the identified stop creator shipment/item. For example, the carrier server 100 may be configured to modify a service level associated with the shipment/item such that the scheduled delivery date and/or delivery time is consistent with the identified stop creator shipment/item. As discussed herein, modifying a service level associated with the shipment/item may comprise steps for updating shipment/item information/data associated with the shipment/item to reflect a change in the delivery service level for the shipment/item as described herein.

As discussed herein, customers may be permitted to make a selection permitting synchronized delivery a default preference, such that the carrier server 100 flags all shipment/item scheduled to be delivered to the customer as eligible for synchronized delivery unless the customer indicates otherwise.

j. Synchronize Pickups for Returns

Under certain circumstances, a customer may seek to return a product to an online merchant. Often this requires the customer to access the one or more online merchant servers 106 to obtain a return authorization number. Various embodiments of the present invention may be used to provide incentives to synchronize the pickup of the return item with either a predicted delivery based on historical information/data or forecasted delivery based on dynamic data. The historic information/data may include some or all of the delivery serviceable point profile information/data discussed above. The dynamic information/data may include information/data for each forecasted shipment/item such as a ship date, an origin serviceable point, destination serviceable point, service level, a forecasted delivery date, a unique identifier, and exception information. Using this information, the one or more carrier servers 100 can determine which days a shipment may be anticipated or already forecasted for delivery to the various addresses serviced by the carrier. The online merchant may send a query to the one or more carrier servers 100 to determine if synchronization is possible and whether an incentive is available as noted above. The one or more carrier servers 100 would then analyze the information and provide an indication as to whether an incentive is available.

In further embodiments, returns themselves may be synchronized. Using various information/data including historic and dynamic data, the one or more carrier servers 100 may determine that the online merchant already has returns forecasted for delivery to a returns center and provide an incentive to synchronize the delivery along with criteria that may be necessary to achieve the synchronization.

k. Carrier Initiated Synchronized Delivery

In various embodiments, the carrier may initiate synchronized delivery methodologies without actions initiated on behalf of the customer and/or the shipper. For example, for shipments/items that arrive at a particular carrier location prior to a scheduled time, the carrier may determine whether delivery of the shipments/items may be synchronized with delivery of other shipments/items scheduled to be delivered to the same and/or nearby serviceable points (as determined based on the various methodologies described herein) such that the shipments/items are delivered in compliance with a scheduled delivery date and/or delivery time.

In one embodiment, the carrier server 100 may be configured to change a delivery service level for a shipment/item in order to synchronize delivery with a stop creator shipment/item. For example, the carrier server 100 may determine that a particular shipment/item is eligible for synchronized delivery, and may determine (e.g., based at least in part on shipment/item detail stored in the PLD database associated with the shipment) that the carrier has authorization to change the delivery service level of the shipment/item in order to synchronize delivery with one or more shipments/items scheduled to be delivered to the same or nearby service points.

Upon determining that the carrier server 100 may change the delivery service level for a shipment/item in order to synchronize delivery with one or more additional shipments, the carrier server 100 may be configured to flag the shipment/item (e.g., by changing the shipment/item level detail associated with the shipment) to indicate the updated delivery service level. For example, the carrier server 100 may change the delivery service level from SurePost to Ground, from Ground to 2nd Day Air, from 2nd Day Air to Next Day Air, from 2nd Day Air to Ground, and/or the like. Thus, the delivery service level can be changed from a first delivery service level with which it was originally shipped to a second delivery service level (after the item has been shipped but) prior to the first delivery attempt of the item. In one embodiment, this may allow for the item to be delivered earlier or later than initially indicated (e.g., both date and time) such that delivery of the shipment/item may be synchronized with delivery of a stop creator shipment/item scheduled to be delivered to the same or a nearby address.

In one embodiment, to change the delivery service level, the carrier server 100 can update the shipping information/data for the shipment/item to reflect that the item should be delivered in accordance with the second (e.g., changed) delivery service level, which may automatically change the delivery date and/or cost associated with delivering the item.

In one embodiment, the change in the delivery service level may require applying a new item/shipment/item identifier and/or label. For example, as described, the updated shipping information/data (or at least a portion of updated shipping data) corresponding to shipments/items to be delivered can be transmitted regularly, periodically, continuously, and/or on demand by the carrier server 100 to the appropriate computing entities to carry out the change in service level.

In one embodiment, the appropriate computing entities can receive the updated shipping information/data (or at least a portion of updated shipping data) corresponding to shipments/items to be delivered. Thus, carrier personnel sorting items or loading delivery vehicles can scan an item/shipment/item identifier (e.g., using a handheld device) on an item to view information about the delivery of the item, and the updated shipping information/data (or at least a portion of updated shipping data) can be displayed. The updated shipping information may indicate that a new label (and/or item/shipment/item identifier) needs to be affixed to the item (e.g., the new label may indicate the new delivery service level). The item can then be transported and delivered with the new label by the carrier in accordance with the second (e.g., changed) delivery service level.

1. Early Arrival Synchronized Delivery

In various embodiments, a carrier may initiate synchronized delivery for shipments/items that arrive at a carrier operated facility before a scheduled arrival time (e.g., a shipment/item that arrives at a final sort location before being placed on a delivery vehicle for delivery to a destination serviceable point). In various embodiments, the carrier server 100 may be configured to receive information/data indicating that a shipment/item has arrived at a carrier operated facility prior to a scheduled arrival time (e.g., a scheduled arrival day). For example, the carrier server 100 may receive information/data indicative of the arrival of a shipment/item at a carrier operated facility, and may be configured to compare the time of arrival of the shipment/item against information/data indicative of a scheduled arrival time stored in a database (e.g., a shipment/item level detail database). Upon determining that the shipment/item has arrived prior to a scheduled arrival time, the carrier server 100 is configured to logically flag the shipment/item as eligible for synchronized delivery. By logically flagging the shipment/item as eligible for synchronized delivery, the carrier server 100 may be configured to update the shipment/item information/data corresponding to the shipment/item to indicate that the shipment/item is eligible for synchronized delivery. In various embodiments, upon a particular shipment/item being flagged as eligible for synchronized delivery, the carrier server 100 may be configured to retrieve additional information regarding the shipment/item to identify one or more parameters and/or limitations on the synchronized delivery that may be utilized to limit a search for potential stop creator shipments with which to synchronize delivery. For example, the carrier server 100 may be configured to identify an original estimated delivery date for the shipment/item based on the shipment/item data, and may indicate that the original estimated delivery date defines the latest date on which the shipment/item may be delivered. Thus, when searching for potential stop creator shipments, the carrier server 100 may be configured to identify stop creator shipments scheduled to be delivered no later than the original estimated delivery date for the shipment/item. Moreover, in various embodiments, the carrier server 100 may be configured to identify a delivery destination for the shipment/item in order to identify serviceable points to which stop creator shipments may be destined. In various embodiments, the carrier server 100 may be configured to identify stop creator shipments as those destined to be delivered to the same serviceable point as the shipment/item and/or nearby serviceable points to the destination location (e.g., within the same proximity zone/area, along the same street segment, within a time and/or distance threshold of the delivery destination, and/or the like). Accordingly, the carrier server 100 may be configured to identify various parameters of the shipment/item based at least in part on the received shipment/item information/data in order to define the time frame during which potential stop creator shipments are scheduled to be delivered and one or more locations to which potential stop creator shipments are scheduled to be delivered.

The carrier server 100 may then be configured to search for other shipments/items scheduled to be delivered to the same or nearby addresses as the shipment/item marked eligible for synchronized delivery (e.g., by querying the PLD database). In various embodiments, the carrier server 100 may search for shipment/item information/data corresponding to other shipments/items scheduled to be delivered to the same or nearby addresses prior to a scheduled delivery date of the shipment/item marked eligible for synchronized delivery. Upon identifying another shipment/item (e.g., a stop-creator shipment) scheduled to be delivered to the same or a nearby address as the shipment/item marked eligible for synchronized delivery, the carrier server 100 may be configured to flag the synchronized delivery eligible shipment/item to inform carrier personnel that the shipment/item should be delivered synchronously with the stop-creator shipment/item. In various embodiments, the carrier server 100 may be configured to modify the shipment/item information/data corresponding to the shipment/item to reflect the updated delivery date to coincide with the scheduled delivery date of the identified stop creator shipment. In various embodiments, because updating the shipment/item information/data corresponding to the shipment/item to reflect an updated delivery date may require that the shipment/item be required to be temporarily removed from a stream of shipments/items in order to delay delivery of the shipment/item (e.g., if, according to the regular stream of shipments/items, the shipment/item would be delivered prior to the updated delivery date), the carrier server 100 may additionally update the shipment/item information/data to comprise an alert that may be displayed to personnel handling the shipment/item. For example, the carrier server 100 may be configured to update the shipment/item information/data to comprise an alert such that when a handheld computing device is utilized to scan an indicia (e.g., a bar code, Maxicode, QR Code, RFID tag, and/or the like) on the shipment/item, and the handheld computing device queries the carrier server 100 for information/data corresponding to the shipment/item, the carrier server 100 may be configured to transmit the alert to the handheld computing device and to cause the handheld device to display the alert (e.g., via a display device) to the personnel to inform the personnel that the shipment/item should be removed from the stream of shipments/items temporarily. As a non-limiting example, the carrier server 100 may cause the handheld computing device to display an alert indicating "Delivery of this shipment has been delayed, do not place this shipment onto a delivery vehicle."

Accordingly, if the stop-creator shipment/item is scheduled to be delivered on a day after the synchronized delivery eligible shipment would be delivered without delaying delivery of the shipment/item, the synchronized delivery eligible shipment/item may be held at a carrier facility until the day on which the stop creator shipment/item is scheduled to be delivered. In various embodiments, the carrier server 100 may be configured to permit synchronized delivery only if the stop creator shipment/item is scheduled to be delivered within a threshold time of the scheduled delivery of the shipment/item eligible for synchronized delivery. For example, the carrier server 100 may be configured to permit synchronized delivery only if the stop creator shipment/item is scheduled to be delivered within 2 days (e.g., 2 days after) the scheduled delivery date of the shipment/item eligible for synchronized delivery.

However, if no stop creator shipments/items are identified prior to the scheduled delivery day for the synchronized delivery eligible shipment, the synchronized delivery eligible shipment/item is delivered according to a traditional flow of shipments/items through the carrier-operated facility. Accordingly, the synchronized delivery eligible shipment/item may not be held at a carrier facility for any period of time, and may instead continue through a regular shipment/item flow through the carrier's delivery network, which may result in the shipment/item being delivered prior to a scheduled delivery time (because the shipment/item arrived at the final sort facility prior to the scheduled arrival time).

2. Shipper/Consignor Selected Volume

In various embodiments, the carrier server 100 may be configured to flag certain shipments/items as eligible for synchronized delivery as soon as they are received by the carrier. Such shipments/items may be identified by a shipper/consignor as being eligible for synchronized delivery (e.g., via a contractual relationship between the shipper/consignor and the carrier) and accordingly the carrier server 100 may be configured to identify and flag these shipments/items as eligible for synchronized delivery. In various embodiments, the carrier server 100 may receive shipment/item information/data indicative of one or more shipment/item characteristics, such as the identity of the shipper, the identity of a destination location, a service level for the shipment, a shipper/consignor provided identifier (e.g., a numeric and/or alphanumeric code identifying the shipment), and/or the like. The shipment/item characteristics may include an indication regarding whether a shipper/consignor has selected the shipment/item as eligible for synchronized delivery. For example, the shipper/consignor may indicate that all shipments/items from the shipper/consignor are eligible for synchronized delivery, and accordingly the carrier server 100 may be configured to flag all shipments/items from a particular shipper/consignor as eligible for synchronized delivery based at least in part on the shipment/item characteristics identifying the shipper. In various embodiments, the shipper/consignor may indicate that only a subset of shipments/items provided by the shipper/consignor are eligible for synchronized delivery, and accordingly the shipper/consignor may provide one or more eligibility criteria that may be utilized by the carrier server 100 to identify shipments/items to be flagged as eligible for synchronized delivery. Accordingly, the carrier server 100 may compare shipment/item information/data for each shipment/item against the eligibility criteria provided by the shipper/consignor to identify shipments/items that satisfy the eligibility criteria. Upon identifying one or more shipments/items that satisfy the eligibility criteria, the carrier server 100 may be configured to flag the identified shipments/items as eligible for synchronized delivery. For example, a shipper/consignor may indicate that all shipments/items having a particular service level (e.g., ground shipping) are eligible for synchronized delivery, and accordingly the carrier server 100 may be configured to identify those shipments/items having associated shipment/item information/data indicating that the shipment/item originates from the shipper/consignor and is to be delivered according to the particular service level, and to flag these identified shipments/items as eligible for synchronized delivery. In various embodiments, the eligibility criteria provided by a particular shipper/consignor may have one or more criteria that must be satisfied for the shipment/item to be eligible for synchronized delivery. The above example, in which a shipper/consignor provided a single criterion that must be satisfied (e.g., all shipments/items having a particular shipping service level) is but one of many possible examples. As an additional example, a shipper/consignor may provide that only shipments/items shipped according to a particular service level (e.g., ground) and having a particular shipper-provided identifier (e.g., shipments/items physically labeled as "ELIGIBLE" shipments) are eligible for synchronized delivery. In accordance with such example criteria provided by a shipper, the carrier server 100 may be configured to identify shipments/items having associated shipment/item information/data indicating that (1) the shipment/item originates from the shipper, (2) that the shipment/item is to be delivered in accordance with the identified service level, and (3) that the shipment/item is identified with the particular shipper-provided identifier. Such identified shipments/items may then be flagged by the carrier server 100 as eligible for synchronized delivery.

In various embodiments, the carrier and/or the shipper/consignor may additionally provide information/data indicative of the length of time a particular shipment/item may remain eligible for synchronized delivery, and such information/data may be stored and accessible to the carrier server 100. Accordingly, the carrier server 100 may utilize this information/data indicative of the length of time that a particular shipment/item may remain eligible for synchronized delivery in searching for other shipments/items (e.g., stop creator shipments) scheduled to be delivered to the same or nearby addresses during the period of time that the shipment/item is eligible for synchronized delivery. For example, the information/data may indicate that a particular shipment/item may be held for one day beyond an originally scheduled delivery day to accommodate potential synchronized delivery. Accordingly, the length of time that a particular shipment/item is eligible for synchronized delivery defines the amount of time that a particular shipment/item may be held by the carrier in order to deliver the shipment/item synchronously with another shipment/item (e.g., a stop-creator shipment) scheduled to be delivered to the same address or a nearby address during the length of time that the shipment/item may be held to facilitate synchronized delivery.

As discussed above in reference to the early arrivals synchronized delivery, upon flagging one or more shipments/items as eligible for synchronized delivery, the carrier server 100 may be configured to search for other shipments/items scheduled to be delivered to the same or nearby addresses as the shipment/item marked eligible for synchronized delivery. In various embodiments, the carrier server 100 may search for other shipments/items scheduled to be delivered to the same or nearby addresses during the period of time during which the shipment/item may be held to facilitate synchronized delivery. Upon identifying another shipment/item (e.g., a stop-creator shipment) scheduled to be delivered to the same or a nearby address as the shipment/item marked eligible for synchronized delivery, the carrier server 100 may be configured to flag the synchronized delivery eligible shipment/item to inform carrier personnel that the shipment/item should be delivered synchronously with the stop-creator shipment/item. Accordingly, if the stop-creator shipment/item is scheduled to be delivered on a day after the synchronized delivery eligible shipment, the synchronized delivery eligible shipment/item may be held at a carrier facility until the day on which the stop creator shipment/item is scheduled to be delivered.

However, if no stop creator shipments/items are identified as scheduled to be delivered prior to the scheduled delivery day for the synchronized delivery eligible shipment, the synchronized delivery eligible shipment/item is delivered according to a traditional flow of shipments/items through the carrier-operated facility. Accordingly, the synchronized delivery eligible shipment/item may be delivered prior to a scheduled delivery time (e.g., if the shipment/item arrives at a final sort location prior to a scheduled arrival date and/or time).

1. Potential Exclusions

In various embodiments shipments/items may be ineligible for synchronized delivery due to one or more characteristics of the shipment/item. Exceptions from synchronized delivery may be established based on historical information/data and/or dynamic data, and may be identified by the carrier, the shipper, and/or the recipient of the shipment/item. Accordingly, the carrier server 100 may be configured to review shipment/item information/data associated with one or more shipments/items to determine whether the shipment/item falls within a particular an identified exclusion. Upon a determination that a shipment/item qualifies under a particular exclusion, the carrier server 100 may be configured to flag the shipment/item as ineligible for synchronized delivery and/or the carrier server 100 may refrain from flagging the shipment/item as eligible for synchronized delivery if the shipment/item would otherwise be determined eligible.

As noted herein, exclusions from synchronized delivery may be based on various shipment/item characteristics, such as characteristics of the shipment/item itself, characteristics of the destination location of the shipment/item, characteristics of the origin and/or shipper/consignor of the shipment/item, and/or characteristics of the timing during which the shipment/item is shipped.

In various embodiments, a shipment/item may be excluded from eligibility for synchronized delivery based on the size of the shipment/item (e.g., length, width, and/or height), the weight of the shipment/item, and/or the contents of the shipment/item. For example, shipments/items that exceed a particular size threshold (e.g., a dimensional weight threshold) and/or a particular weight threshold may be determined to be ineligible for synchronized delivery. Moreover, shipments/items may be excluded from eligibility for synchronized delivery based at least in part on the contents and/or configuration of the shipment/item. For example, shipments/items containing hazardous materials, dry ice, irregularly shaped items, fragile items, and/or the like may be identified as excluded from eligibility for synchronized delivery.

Moreover, in various embodiments, the carrier server 100 may be configured to refrain from labeling shipments/items shipped according to certain delivery service levels (e.g., Next Day delivery, Two-Day delivery, and/or the like) as eligible for synchronized delivery. Because such shipments/items may be time-dependent shipments, the carrier server 100 may be configured to ensure that the shipments/items flow through the carrier's delivery network unimpeded by potential synchronized delivery considerations.

In various embodiments, a shipment/item may be excluded from eligibility for synchronized delivery based on characteristics of the destination for the shipment/item. For example, the carrier server 100 may identify certain specific serviceable points that are ineligible for synchronized delivery, postal codes that are ineligible for synchronized delivery, certain carrier hubs which are ineligible for synchronized delivery, certain neighborhoods that are ineligible for synchronized delivery, and/or the like. Certain locations may be determined as ineligible for synchronized delivery based on characteristics of the location. For example, high delivery-volume locations (e.g., malls, high-rise buildings, and/or the like) may be indicated as ineligible locations for synchronized delivery, because deliveries are made to these locations regularly.

In various embodiments, certain locations may be identified as ineligible for synchronized delivery only temporarily, however, certain locations may be identified as permanently ineligible for synchronized delivery. For example, one or more postal codes may be indicated as ineligible for synchronized delivery due to inclement weather in the area of the postal code. Thus, the carrier sever 100 may be configured to refrain from flagging shipments/items scheduled to be delivered to serviceable points within the postal code as eligible for synchronized delivery until the inclement weather passes.

Moreover, in various embodiments, a shipment/item may be excluded from eligibility for synchronized delivery based on characteristics of the origin for the shipment/item. For example, shipments/items originating from certain locations (e.g., cities, towns, warehouses, buildings, and/or the like) may be identified as ineligible for synchronized delivery. Moreover, shipments/items originating from certain identified shippers/consignors may be identified as ineligible for synchronized delivery. For example, one or more shippers/consignors may have indicated that shipments/items originating from that shipper/consignor should be identified as eligible for synchronized delivery.

In yet other embodiments, a shipment/item may be excluded from eligibility for synchronized delivery based on the timing during which the shipment/item is shipped and/or scheduled to be delivered. For example, the carrier may indicate that additional shipments/items should be not loaded onto shipment/item vehicles on certain days of the week (e.g., Mondays) according to the synchronized delivery methodologies described herein, due to anticipated volume scheduled to be delivered on those days. Such days may be indicated on a regular (e.g., weekly, monthly, yearly, and/or the like) or irregular (e.g., on an ad hoc basis upon estimated that a particular day is scheduled to have a high volume) basis. Accordingly, the carrier server 100 may be configured to determine that delivery of a particular shipment/item may not be moved to an ineligible synchronized delivery day, and accordingly may be configured to avoid synchronizing delivery of a particular shipment/item with another shipment/item (e.g., a stop-creator shipment) scheduled to be delivered on an excluded day.

Moreover, shipments/items may be excluded from synchronized delivery based on the timing of when the shipment/item was shipped. For example shipments/items shipped during heavy-volume periods may be excluded from eligibility for synchronized delivery. Such heavy volume periods may be identified based on a determination of a shipment/item volume exceeding a predetermined threshold, or may be identified based on one or more previously scheduled dates (e.g., during the period of time between Thanksgiving and Christmas holidays).

Accordingly, the carrier server 100 may be configured to compare shipment/item characteristics identified in the shipment/item information/data against exclusion criteria to determine whether the characteristics of the shipment/item render the shipment/item ineligible for synchronized delivery. For example, upon a determination that the shipment/item exceeds a size and/or weight threshold, the carrier server 100 may be configured to identify the shipment/item as ineligible for synchronized delivery.

However, in various embodiments, certain shipments/items indicated as ineligible for synchronized delivery may serve as stop-creator shipments/items for other shipments/items that are eligible for synchronized delivery. For example, irregularly shaped shipments, oversized shipments, hazardous material shipments, shipments/items from certain shippers/consignors, shipments/items shipped according to certain delivery service levels, and/or the like, may be ineligible for synchronized delivery (such that the delivery date and/or time of these items cannot be changed), however such shipments/items may be considered stop creator shipments/items for other shipments/items that are eligible for synchronized delivery, such that delivery of these other shipments/items may be synchronized with the delivery of the synchronized delivery ineligible shipments.

m. Multi-Carrier Synchronized Delivery

In various embodiments, synchronized delivery may be facilitated across multiple carriers. For example, multiple carriers may communicate regarding planned deliveries to remote locations, and may synchronize delivery such that only a single carrier vehicle operated by one of the multiple carriers may be required to visit the remote area to deliver shipments/items for a plurality of the multiple carriers. For example, multiple carriers may communication via a coordinator entity which matches carriers having available space with carriers requesting that an additional carrier provide additional services. For example, the coordinator entity may be associated with a coordinator server (e.g., having a configuration similar to the carrier server 100 described herein) configured to receive and transmit data to and from carrier server 100 associated with multiple carriers. Accordingly, the coordinator server may be configured to make determinations of shipments eligible for synchronized delivery in accordance with one or more considerations described in detail herein, considering shipments scheduled to be delivered by each of a plurality of carriers. Upon a determination that a particular shipment scheduled to be delivered by a first carrier is eligible for synchronized delivery with a stop creator shipment scheduled to be delivered by a second carrier (in accordance with one or more methodologies described herein for matching shipments to the same serviceable point or nearby serviceable points), the coordinator entity may be configured to contact one or both of the first carrier and the second carrier to coordinate synchronized delivery such that both shipments are delivered by a single delivery vehicle operated by one of first carrier or the second carrier.

Accordingly, upon identifying a shipment/item scheduled to be delivered to a particular serviceable point, the receiving carrier may communicate information identifying the serviceable address to other carriers (e.g., through a coordination entity) to determine whether any of the other carriers are scheduled to deliver a shipment/item to the serviceable address or a nearby address (as determined based on any of the criteria described above). Upon a determination that one or more carriers are scheduled to deliver another shipment/item to the same or nearby serviceable point, the receiving carrier may provide the shipment/item to one of the carriers scheduled to visit the serviceable point and/or the identified nearby serviceable point such that the other carrier may deliver the shipment/item. In various embodiments, the receiving carrier may pay a fee to the other carrier to make the delivery. For example, upon identifying a shipment/item scheduled to be delivered to a remote area, a carrier may communicate with other carriers to determine whether the other carriers are scheduled to travel to the remote area to delivery one or more shipments.

In various embodiments, the receiving carrier may first determine whether the receiving carrier is scheduled to delivery additional shipments/items to the serviceable point and/or a nearby serviceable point before contacting other carriers. Accordingly, the receiving carrier may first determine whether synchronized delivery may be possible with any of shipments/items within the receiving carrier's network of shipments/items. Moreover, in various embodiments, the receiving carrier may determine the estimated cost to deliver the shipment/item by the receiving carrier before requesting that another carrier deliver the shipment/item. In various embodiments, the receiving carrier may request that another carrier deliver the shipment/item upon a determination that the cost, schedule (timing), equipment and/or personnel to deliver the shipment/item satisfies one or more criteria. For example, a receiving carrier may request that another carrier deliver the shipment/item upon a determination that the cost for the receiving carrier to deliver the shipment/item is more than a predefined threshold amount. Thus, in various embodiments, the receiving carrier may only request that another carrier deliver the shipment/item if the shipments/items are in remote locations in which delivery to these locations is prohibitively expensive.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
receiving, over a computer network, shipping data for a first shipment and a second shipment, the shipping data comprising a final destination for each of the first shipment and the second shipment that is a destination other than a shipping hub;
identifying, using a GPS device and historical shipping data, a distance or travel time between a first final destination and a second final destination, the first final destination associated with the first shipment to be delivered and the second final destination associated with the second shipment;
determining, via a processor, that the distance or the travel time between the first final destination and the second final destination satisfies a threshold;
based on the distance or the travel time satisfying the threshold, clustering the first final destination and the second final destination into a proximity zone that is a larger area relative to the first final destination and the second final destination, the proximity zone determined using a plurality of GPS coordinates to collectively enclose the larger area; and
providing, over the computer network and to a computing entity, an indication that the first shipment and the second shipment are available for synchronized delivery within the proximity zone.

2. The method of claim 1 further comprising:
determining, via the processor, that the distance or the travel time between the first final destination and a third final destination satisfies the threshold;
determining that the third final destination is within the proximity zone;
identifying an item for delivery to the third final destination for synchronized delivery within the proximity zone; and
providing, over the computer network and to the computing entity, another indication that the item is available for the synchronized delivery.

3. The method of claim 1 further comprising determining an average frequency of items previously delivered within the proximity zone based on the historical shipping data.

4. The method of claim 1 further comprising:
providing an incentive for the synchronized delivery of the first shipment and the second shipment in response to the providing the indication that the first shipment and the second shipment are eligible for synchronized delivery within the proximity zone;
based on the distance or the travel time between a third final destination and a fourth final destination satisfying the threshold, clustering the third final destination and the fourth final destination into a second proximity zone having a second larger area relative to the third final destination and the fourth final destination, the second proximity zone determined using the plurality of GPS coordinates to collectively enclose the second larger area; and
determining an average frequency of items previously delivered within the proximity zone and the second proximity zone based on the historical shipping data.

5. The method of claim 1 further comprising determining that a first geographic descriptor of the first final destination and a second geographic descriptor of the second final destination are included in the proximity zone, wherein a geographic descriptor is a street name and a neighborhood name.

6. The method of claim 1, wherein the first geographic descriptor further comprises a county, a city, or a zip code, and wherein the first geographic descriptor and the second geographic descriptor are used for determining the larger area of the proximity zone.

7. The method of claim 2, wherein the item of the first shipment is being transported by a first carrier and the item of the second shipment is being transported by a second carrier, and wherein the proximity zone has a single entrance point and a single exit point.

8. A system comprising one or more memory storage areas and one or more computer processors, the system configured to:
receive shipping data for a first shipment and a second shipment, the shipping data comprising a final destination for each of the first shipment and the second shipment that is a destination other than a shipping hub;

determine, via the one or more computer processors, that a distance between a third final destination and a plurality of final destinations associated with shipments satisfies a threshold;

based on determining the distance satisfies the threshold, cluster the third final destination and the plurality of final destinations into a proximity zone, wherein the proximity zone is an area that is larger than each of the third final destination and the plurality of final destinations, the proximity zone determined using a plurality of GPS coordinates to collectively enclose the area;

determine, via the one or more computer processors, that a travel time between the third final destination and a second plurality of final destinations associated with the shipments satisfy a second threshold;

based on the travel time satisfying the second threshold, cluster the third final destination and the second plurality of final destinations into a second proximity zone that is a larger area than each of the second plurality of final destinations, the second proximity zone determined using the plurality of GPS coordinates to collectively enclose the larger area;

determine that the final destination for each of the first shipment and the second shipment are located within one of the proximity zone and the second proximity zone;

determine, based on the shipping data for the first shipment and the second shipment, that a first delivery time for the first shipment and a second delivery time for the second shipment are within a predetermined time window; and based on determining that the first delivery time and the second delivery time are within the predetermined time window and based on determining that the final destination for each of the first shipment and the second shipment are located within the one of the proximity zone and the second proximity zone, provide an indication that the first shipment and the second shipment are available for synchronized delivery.

9. The system of claim 8, wherein the system is further configured to:
    determine that a new estimated delivery time corresponding to the first delivery time for the first shipment has been updated;
    determine that the new estimated delivery time and the second delivery time are within the predetermined time window; and
    provide a second indication that the first shipment and the second shipment are still available for synchronized delivery.

10. The system of claim 8, wherein the system is further configured to electronically modify the shipping data for the second shipment to modify a delivery service level for the second shipment.

11. The system of claim 10, wherein the system is further configured to provide an incentive for the synchronized delivery of the first shipment and the second shipment and to generate a logical flag associated with the second shipment that indicates the modification to the delivery service level for the second shipment.

12. The system of claim 8, wherein the system is further configured to, responsive to determining that a fourth shipment and a fifth shipment are not included in the same proximity zone, provide an indication that the fourth shipment and the fifth shipment are not available for synchronized delivery.

13. The system of claim 8, wherein a first geographic descriptor corresponding to the first shipment is selected from a group consisting of a zip code, a street name, a neighborhood name, and a geographic area, and wherein the first geographic descriptor is used for determining that the final destination for each of the first shipment and the second shipment are located within the proximity zone.

14. The system of claim 8, wherein the first shipment is being transported by a first carrier and the second shipment is being transported by a second carrier.

15. A computer program product comprising at least one non-transitory computer-readable storage medium having computer-readable program code portions stored therein, the computer-readable program code portions comprising:
    an executable portion configured to receive electronic shipping data for a first shipment and a second shipment, the electronic shipping data comprising a final destination for each of the first shipment and the second shipment that is a destination other than a shipping hub;
    an executable portion configured to identify, using a GPS device and historical shipping data, a distance or travel time between a first final destination of the first shipment and a second final destination of the second shipment;
    an executable portion configured to determine that the distance or the travel time between the first final destination and the second final destination satisfies a threshold;
    an executable portion configured to, based on the distance or the travel time satisfying the threshold, cluster the first final destination and the second final destination into a proximity zone that is a larger area relative to the first final destination and the second final destination, the proximity zone determined using a plurality of GPS coordinates to collectively enclose the area; and
    an executable portion configured to provide an indication that the first shipment and the second shipment are available for the synchronized delivery within the proximity zone.

16. The computer program product of claim 15 further comprising an executable portion configured to determine an average number of times a vehicle traverses a street along a route towards the proximity zone over a period of time.

17. The computer program product of claim 16 further comprising an executable portion configured to determine that the street is a high density street.

18. The computer program product of claim 15 further comprising an executable portion configured to provide an incentive for the synchronized delivery of the first shipment and the second shipment, and to further identify at least two items for the synchronized delivery to the first final destination and the second final destination within the proximity zone.

19. The computer program product of claim 15 further comprising an executable portion configured to determine that the first final destination and the second final destination have a same geographic descriptor.

20. The computer program product of claim 19, wherein the same geographic descriptor is selected from a group consisting of a zip code, a street name, a neighborhood name, and a geographic area.

* * * * *

UNITED STATES PATENT AND TRADEMARK OFFICE
CERTIFICATE OF CORRECTION

Page 1 of 1

PATENT NO. : 11,164,141 B1
APPLICATION NO. : 14/988545
DATED : November 2, 2021
INVENTOR(S) : Chris Bolton et al.

It is certified that error appears in the above-identified patent and that said Letters Patent is hereby corrected as shown below:

In the Specification

In Column 71, Line 67, delete "(MIMS)," and insert -- (MMS), --.

Signed and Sealed this
First Day of March, 2022

Drew Hirshfeld
*Performing the Functions and Duties of the
Under Secretary of Commerce for Intellectual Property and
Director of the United States Patent and Trademark Office*